US008369628B2

(12) United States Patent
Suzuki et al.

(10) Patent No.: US 8,369,628 B2
(45) Date of Patent: Feb. 5, 2013

(54) VIDEO ENCODING DEVICE, VIDEO ENCODING METHOD, VIDEO ENCODING PROGRAM, VIDEO DECODING DEVICE, VIDEO DECODING METHOD, AND VIDEO DECODING PROGRAM

(75) Inventors: Yoshinori Suzuki, Saitama (JP); Choong Seng Boon, Yokohama (JP); Mitsuru Kobayashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1062 days.

(21) Appl. No.: 11/994,712

(22) PCT Filed: Jul. 5, 2006

(86) PCT No.: PCT/JP2006/313416
§ 371 (c)(1),
(2), (4) Date: Jun. 18, 2008

(87) PCT Pub. No.: WO2007/004678
PCT Pub. Date: Jan. 11, 2007

(65) Prior Publication Data
US 2009/0116759 A1    May 7, 2009

(30) Foreign Application Priority Data

Jul. 5, 2005    (JP) ............................... P2005-196351
Mar. 30, 2006  (JP) ............................... P2006-094391

(51) Int. Cl.
*G06K 9/36* (2006.01)
(52) U.S. Cl. ..................................................... 382/232
(58) Field of Classification Search .......... 382/232–251; 375/240.01–240.29
See application file for complete search history.

(56) References Cited

U.S. PATENT DOCUMENTS
5,768,438 A *  6/1998  Etoh ............................ 382/251
(Continued)

FOREIGN PATENT DOCUMENTS
JP   02-062180   3/1990
JP   2001-028756 1/2001
(Continued)

OTHER PUBLICATIONS

Kakuno, et al., "Impress Standard Textbook Series", H.264/AVC Texbook, Impress Net Business Company, 2004, pp. 18-27, 106-119, and 128-135 (with English Translation).

(Continued)

*Primary Examiner* — Ishrat I Sherali
(74) *Attorney, Agent, or Firm* — Oblon, Spivak, McClelland, Maier & Neustadt, L.L.P.

(57) ABSTRACT

A video encoding device including a region division section for dividing a frame image constituting video data into a plurality of regions as encoding target regions, an encoding section for encoding an image of each region, an inverse transformation section and an addition section for generating reproduced image of the encoded image, a storage section for storing reproduced images, a prediction generation section for searching a region which is highly correlated to a reproduced image of a template region, which is adjacent to the region of the encoding target image in a predetermined positional relationship and is a part of the reproduced image, from the reproduced image, and determining a prediction signal based on the searched region and the above-mentioned positional relationship, and a subtraction section for generating a difference signal between the prediction signal and the encoding target image as a signal for encoding.

24 Claims, 37 Drawing Sheets

U.S. PATENT DOCUMENTS

| | | | |
|---|---|---|---|
| 6,052,417 A * | 4/2000 | Fujiwara et al. | 375/240.12 |
| 6,233,279 B1 * | 5/2001 | Boon | 375/240.08 |
| 6,289,052 B1 | 9/2001 | Faryar et al. | |
| 6,408,099 B2 * | 6/2002 | Tan | 382/232 |
| 6,625,215 B1 | 9/2003 | Faryar et al. | |
| 6,766,061 B2 | 7/2004 | Boon | |
| 7,236,634 B2 * | 6/2007 | Miyakoshi et al. | 382/236 |
| 7,643,690 B2 * | 1/2010 | Suzuki et al. | 382/236 |

FOREIGN PATENT DOCUMENTS

| | | |
|---|---|---|
| JP | 2002-118849 | 4/2002 |
| JP | 2003-179761 | 6/2003 |
| RU | 2 093 968 C1 | 10/1997 |
| SU | 1730724 A1 | 4/1992 |

OTHER PUBLICATIONS

T. Wiegand, et al., "Rate-Constrained Coder Control and Comparison of Video Coding Standards", IEEE Transactions on Circuits and Systems for Video Technology, vol. 13, No. 7, Jul. 2003, pp. 688-703.

K. Sugimoto, et al., Inter Frame Coding With Template Matching Spatio-Temporal Prediction, 2004 International Conference on Image Processing (ICIP), vol. 1, Oct. 24, 2004, pp. 465-768.

Iain E.G. Richardson, "H. 264 and MPEG-4 Video Compression Video Coding for Next-Generation Multimedia", John Wiley & Sons Ltd., 2003, pp. 67-69, 101, 231-234 with English translation.

Iain E. G. Richardson. "H.264 and MPEG-4 Video Compression: Video Coding for Next-generation Multimedia." John Wiley & Sons Ltd., Section 3.4.1 and 6.4.5.3, 2002, pp. 44, 45, 175, 176 and 177.

Extended European Search Report issued May 13, 2011, in Patent Application No. 06780792.5.

Siu-Leong Yu, et al., "New Intra Prediction using Intra-Macroblock Motion Compensation", ITU Study Group 16—Video Coding Experts Group ISO/IEC, XP 30005267, May 6-10, 2002, 10 pages.

Chinese Office Action issued Apr. 9, 2012, in Patent Application No. 200680024625.5 (with English-language translation).

Office Action issued Aug. 1, 2011, in Korean Patent Application No. 10-2009-7027156 (with English-language translation).

Office Action (with English translation) issued on May 16, 2012, in counterpart Korean Application No. 10-2012-7002838 (9 pages).

Office Action issued on Jun. 11, 2012, in counterpart European Application No. 11 192 765.3 (3 pages).

Office Action issued Aug. 23, 2011, in Japanese Patent Application No. 2006-094391 with English translation.

Chinese Office Action issued Sep. 14, 2012 in CN Application No. 2006800246525.5 with English translation, 59 pages.

Search Report issued on Oct. 9, 2012, in counterpart European Application No. 11 19 2765 (9 pages).

* cited by examiner

Fig. 12
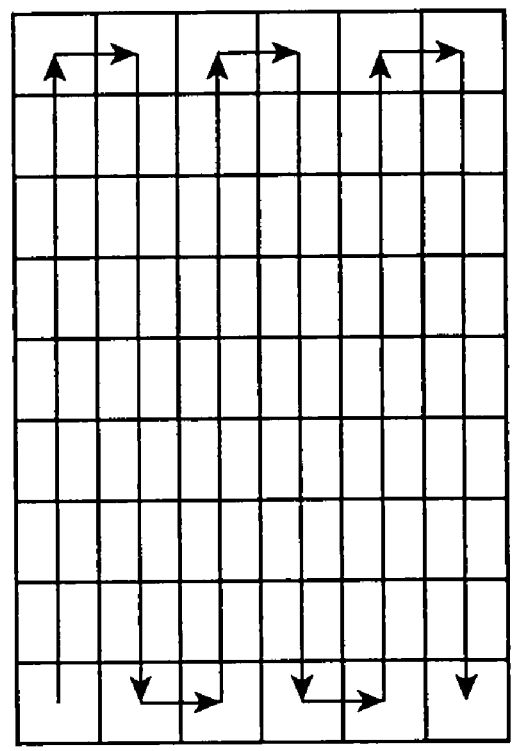
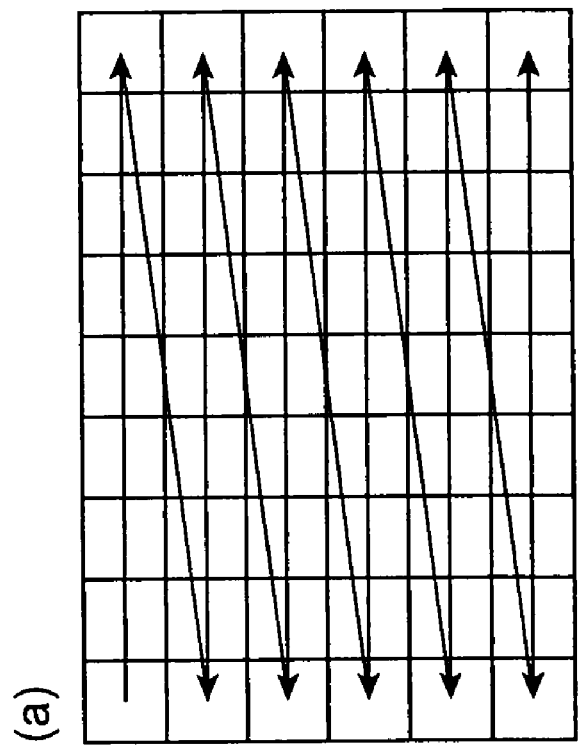

*Fig.14*
(a) 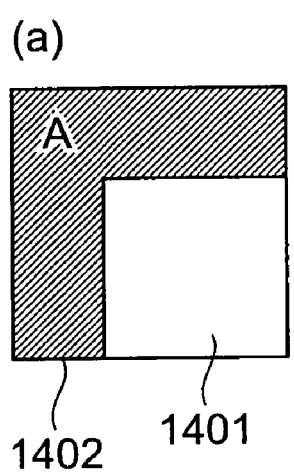
(b) 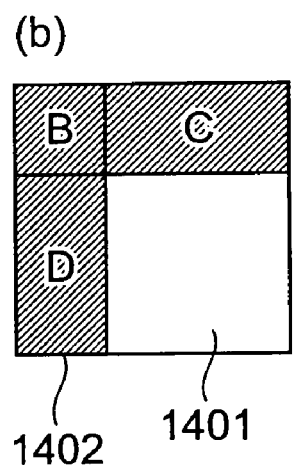
(c) 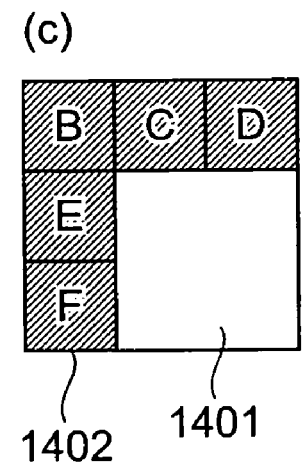

VIDEO ENCODING DEVICE, VIDEO ENCODING METHOD, VIDEO ENCODING PROGRAM, VIDEO DECODING DEVICE, VIDEO DECODING METHOD, AND VIDEO DECODING PROGRAM

TECHNICAL FIELD

The present invention relates to a video encoding device, video encoding method, video encoding program, video decoding device, video decoding method and video decoding program.

BACKGROUND ART

For encoding of video data, the H.264 video encoding method, which is an ITU-T (International Telecommunication Union-Telecommunications Standards Section) recommended international standard, for example, is used. A technology based on the H.264 video encoding method is described in the following Non-patent Document 1, for example.

In the above-mentioned H.264 video encoding method, redundancy of video frames is decreased and information volume is decreased by compensating motion and encoding motion vectors. According to this method, a region of which one motion vector can compensate is decreased, so as to support subtle motion and increase prediction accuracy of inter-frame prediction. On the other hand, since the number of motion vectors increases and information volume becomes enormous, this increase must be suppressed. As a method for increasing prediction accuracy while decreasing the number of motion vectors, a method disclosed in the following Patent Document 1 has been proposed.

Patent Document 1: Japanese Patent Application Laid-Open No. H2-62180

Non-patent Document 1: Kakuno et al, "H.264/AVC Textbook Impress Standard Textbook Series", Impress Net Business Company, 2004

DISCLOSURE OF THE INVENTION

Problem to be Solved by the Invention

However, even in the method disclosed in the above-mentioned Patent Document 1, motion vectors are still required and encoding of motion vectors is unavoidable. Under this condition, a video data encoding method, which further improves compression efficiency, has been demanded.

With the foregoing in view, it is an object of the present invention to provide a video encoding device, video encoding method, video encoding program, video decoding device, video decoding method and video decoding program, which enable more effective encoding than the case of performing encoding by inter-frame prediction using motion vectors.

Means for Solving the Problem

A video encoding device according to the present invention is a video encoding device for encoding video data in block units, comprising: division means for dividing a frame image constituting the video data into a plurality of encoding target blocks; encoding means for encoding the encoding target block; reproduced image generation means for generating a decoded block which is a reproduced signal of the encoding target block; storage means for storing reproduced video data generated from the reproduced signal; and prediction signal generation means for generating a prediction block, which is a prediction signal of the encoding target block, using a template generated from a reproduced signal, which is adjacent to the encoding target block in a predetermined positional relationship and belongs to the reproduced video data stored in the storage means, characterized in that the encoding means generates a difference block, which is a difference signal of the encoding target block, by subtracting the prediction block from the encoding target block in pixel units, and encodes the difference block, and the reproduced image generation means generates a decoded difference block, which is a reproduced signal of the difference block encoded by the encoding means, and generates a decoding block by adding the decoded difference block and the prediction block in pixel units.

In the video encoding device according to the present invention, the prediction block, which is a prediction signal of an encoding target block, is generated using a template generated from a reproduced signal which is adjacent to the encoding target block in a predetermined positional relationship and belongs to the reproduced video data. Encoding is performed using this prediction block. In other words, according to the video encoding device of the present invention, a prediction block, which is a prediction signal, can be generated without using a motion vector, and efficient encoding can be implemented.

A video encoding device according to the present invention is a video encoding device for encoding video data in block units, comprising: division means for dividing a frame image constituting the video data into a plurality of encoding target blocks; encoding means for encoding the encoding target block; reproduced image generation means for generating a decoding block which is a reproduced signal of the encoding target block; storage means for storing reproduced video data generated from the reproduced signal; search means for searching a pixel group, which is highly correlated to a template generated from a reproduced signal, which is adjacent to the encoding target block in a predetermined positional relationship and belongs to the reproduced video data stored in the storage means, from the reproduced video data stored in the storage means; and prediction signal determination means for determining a prediction block which is a prediction signal of the encoding target block, from the reproduced video data stored in the storage means, based on the pixel group searched by the search means and the predetermined positional relationship, characterized in that the encoding means generates a difference block, which is a difference signal of the encoding target block, by subtracting the prediction block from the encoding target block in pixel units, and encodes the difference block, and the reproduced image generation means generates a decoded difference block, which is a reproduced signal of the difference block encoded by the encoding means, and generates a decoded block by adding the decoded difference block and the prediction block in pixel units. According to this configuration, a pixel group, which is highly correlated to the template, is searched from the reproduced video data, and a prediction block is determined based on the searched pixel group and the above-mentioned predetermined positional relationship. Therefore a prediction block can be determined without fail, so the present invention can be implemented with certainty.

It is preferable that the motion encoding device further comprises estimation means for comparing the template and the reproduced video data stored in the storage means, to estimate a spatial continuity of an image of the encoding target block based on the comparison result; and setting means for further dividing the encoding target block and setting the encoding target block obtained by division as a new encoding target block, based on the spatial continuity of the image estimated by the estimation means, and setting a template for the new encoding target block. According to this configuration, the size of the prediction block can be appropriately selected based on the spatial continuity of the reproduced image data. So encoding efficiency improves even in encoding of video data of which change of motion amount is major. Moreover, the prediction performance of the prediction signal improves by changing the shapes and sizes of the template region and the prediction region according to the characteristics of the signal.

A video decoding device according to the present invention is a video decoding device for reproducing encoded data of video data into reproduced video data in block units, comprising: decoding means for decoding encoded data required for reproducing a decoding target block to be decoded; reproduced image generation means for generating a decoded block, which is a reproduced signal of the decoding target block, from the encoded data decoded by the decoding means; storage means for storing reproduced video data generated from the reproduced signal; and prediction signal generation means for generating a prediction block, which is a prediction signal of the decoding target block, using a template generated from a reproduced signal, which is adjacent to the decoding target block in a predetermined positional relationship and belongs to the reproduced video data stored in the storage means, characterized in that the decoding means generates a decoded difference block, which is a difference signal of the decoding target block, and the reproduced image generation means generates a decoded block by adding the decoded difference block and the prediction block in pixel units.

In the video decoding device according to the present invention, the prediction block is generated and the video is decoded, just like the above-mentioned video encoding device. In other words, according to the video decoding device of the present invention, video data efficiently encoded by the above-mentioned video encoding device can be correctly decoded.

A video decoding device according to the present invention is a video decoding device for reproducing encoded data of video data into reproduced video data in block units, comprising: decoding means for decoding encoded data required for reproducing a decoding target block to be decoded; reproduced image generation means for generating a decoded block, which is a reproduced signal of the decoding target block, from the encoded data decoded by the decoding means; storage means for storing reproduced video data generated from the reproduced signal; search means for searching a pixel group, which is highly correlated to a template generated from a reproduced signal, which is adjacent to the decoding target block in a predetermined positional relationship and belongs to the reproduced video data stored in the storage means, from the reproduced video data stored in the storage means; and prediction signal determination means for determining a prediction block, which is a prediction signal of the decoding target block, from the reproduced video data stored in the storage means, based on the pixel group searched by the search means and the predetermined positional relationship, characterized in that the decoding means generates a decoded difference block, which is a difference signal of the decoding target block, and the reproducing image generation means generates a decoding block by adding the decoded difference block and the prediction block in pixel units. According to this configuration, video data encoded by the above-mentioned video encoding device can be correctly decoded.

It is preferable that the video decoding device further comprises estimation means for comparing the template and the reproduced video data stored in the storage means, to estimate a spatial continuity of images of the decoding target block based on the comparison result; and setting means for further dividing the decoding target block and setting the decoding target block obtained by division as a new decoding target block, based on the spatial continuity of the image estimated by the estimation means, and setting a template for the new decoding target block. According to this configuration, video data encoded by the above-mentioned video encoding device can be correctly decoded.

It is preferable that the encoding means generates a reduced difference block, of which number of pixels is smaller than the difference block, by a reduction processing which decreases the number of pixels of the difference block by a predetermined method, and encodes the reduced difference block, and the reproduced image generation means generates a decoded reduced difference block, which is a reproduced signal of the reduced difference block, and generates a decoded block from the decoded reduced difference block by an enlargement processing which increases the number of pixels by a predetermined method. According to this configuration, the number of pixels of the encoding target reduced difference block can be decreased, so amount of coding bits of the prediction signal for a flat region, where prediction performance for a region having distinct characteristics is low, can be efficiently decreased without dropping image quality.

It is preferable that the decoding means generates a decoded reduced difference block, of which number of pixels is smaller than the difference block, by decoding the encoded data, and the reproduced image generation means generates a decoded block from the decoded reduced difference block by an enlargement processing which increases the number of pixels by the predetermined method. According to this configuration, video data encoded by the above-mentioned video encoding device can be correctly decoded.

A video encoding device according to the present invention is a video encoding device for encoding video data in block units, comprising: division means for dividing a frame image constituting said video data into a plurality of encoding target blocks as a target region of the encoding; encoding means for encoding the encoding target block; reproduced image generation means for generating a decoded block which is a reproduced signal of the encoding target block;

storage means for storing reproduced video data generated from the reproduced signal; and prediction signal generation means for generating a prediction block, which is a prediction signal of the encoding target block, using a predetermined method, from a reproduced signal, which is adjacent to the encoding target block in a predetermined positional relationship and belongs to the reproduced video data stored in the storage means, characterized in that the encoding means generates a reduced difference block, of which number of pixels is smaller than a difference block, which is a difference signal of the encoding target block obtained by subtracting the prediction block from the encoding target block in pixel units, using a reduction processing, which decreases the number of pixels of the difference block by a predetermined method, and encodes the reduced difference block, and the reproduced image generation means generates a decoded reduced difference block, which is a reproduced signal of the reduced difference block, and generates a decoded block from the decoded reduced difference block using an enlargement processing, which increases the number of pixels by a predetermined method.

In the video encoding device of the present invention, the prediction block, which is a prediction signal of the encoding target block, is generated from the reproduced signal, which is adjacent to the encoding target block in a predetermined position relationship and belongs to the reproduced video data. Moreover, the encoding target reduced difference block, of which number of pixels is smaller than the difference block, is generated from the prediction block. In other words, according to the video encoding device of the present invention, the number of pixels of the encoding target reduced difference block can be decreased, so amount of coding bits of the prediction signal, for a flat region where prediction performance for a region having distinct characteristics is low, can be efficiently decreased without dropping image quality.

A video decoding device according to the present invention is a video decoding device for reproducing encoded data of video data into reproduced video data in block units, comprising: decoding means for decoding encoded data required for reproducing a decoding target block to be decoded; reproduced image generation means for generating a decoded block, which is a reproduced signal of the decoding target block, from encoded data decoded by the decoding means; storage means for storing the reproduced video data generated from the reproduced signal; and prediction signal generation means for generating a prediction block, which is a prediction signal of the decoding target block, using a predetermined method, from a reproduced signal belonging to the reproduced video data, which is adjacent to the decoding target block in a predetermined positional relationship and is stored in the storage means; characterized in that the decoding means generates a decoded reduced difference block, of which number of pixels is smaller than a difference block, which is a difference signal of the decoding target block, by decoding the encoded data, and the reproduced image generation means generates a decoded block from the decoded reduced difference block using an enlargement processing, which increases the number of pixels by a predetermined method. According to this configuration, video data encoded by the above-mentioned video encoding device can be correctly decoded.

It is preferable that the encoding means applies the reduction processing to the encoding target block and the prediction block respectively to generate a reduced block and a reduced prediction block, and generates a reduced difference block by subtracting the reduced prediction block from the reduced block, and the reproduced image generation means generates a decoded reduced difference block which is a reproduced signal of the reduced difference block encoded by the encoding means, generates a decoded reduced block by adding the decoded reduced difference block and the reduced prediction block in pixel units, and applies the enlargement processing to the decoded reduced block to generate a decoded block. According to this configuration, the reduced difference block to be the encoding target can be generated without fail, so the present invention can be implemented with certainty.

It is preferable that the encoding means generates a reduced difference block by applying the reduction processing to the difference block, and the reproduced image generation means generates a decoded block by generating a decoded reduced block, which is a reproduced signal of the reduced difference block encoded by the encoding means, generating a decoded difference block by applying the enlargement processing to the decoded reduced block, and adding the decoded difference block and the prediction block in pixel units. According to this configuration, the reduced difference block to be the encoding target can be generated without fail, so the present invention can be implemented with certainty.

It is preferable that the reproduced image generation means generates a decoded block by generating a reduced prediction block by applying the reduction processing to the prediction block, generating a decoded reduced block by adding the decoded reduced difference block and the reduced prediction block in pixel units, and applying the enlargement processing to the decoded reduced block. According to this configuration, video data encoded by the above-mentioned video encoding device can be correctly decoded.

It is preferable that the reproduced image generation means generates a decoded block by generating a decoded difference block by applying the enlargement processing to the decoded reduced difference block, and adding the decoded difference block and the prediction block in pixel units. According to this configuration, video data encoded by the above-mentioned video encoding device can be correctly decoded.

It is preferable that the prediction signal determination means selects one template out of the plurality of templates having different shapes. According to this configuration, the prediction block can be efficiently generated, and efficiency of the encoding processing can be improved.

It is preferable that the prediction signal determination means selects the one template by referring to a reproduced signal of the reproduced video data stored in the storage means or information on the reproduced signal. According to this configuration, a template can be selected appropriately.

It is preferable that the encoding means encodes information for specifying the template selected by the prediction signal determination means. According to this configuration, selection of a template in the video decoding device becomes easier, and more efficient decoding can be performed.

It is preferable that the prediction signal determination means selects one template out of the plurality of templates having different shapes. According to this configuration, video data encoded by the above-mentioned video encoding device can be correctly decoded.

It is preferable that the prediction signal determination means selects the one template by referring to a reproduced signal of the reproduced video data stored in the storage means or information on the reproduced signal. According to this configuration, video data encoded by the above-mentioned video encoding device can be correctly decoded.

It is preferable that the decoding means decodes the information for specifying the selected template, and the prediction signal determination means selects one template out of the plurality of templates having different shapes by referring to the information for specifying the selected template decoded by the decoding means. According to this configuration, video data encoded by the above-mentioned video encoding device can be correctly decoded.

Besides describing the present invention as an invention of the video encoding device and the video decoding device, as mentioned above, the present invention can be described as an invention of a video encoding method, video encoding program, video decoding method and video decoding program. These inventions are essentially the same invention only are in different categories, and implement the same functions and have the same effects.

A video encoding method according to the present invention is a video encoding method for a video encoding device for encoding video data in block units, comprising: a division step of dividing a frame image constituting the video data into a plurality of encoding target blocks; an encoding step of encoding the encoding target block; a reproduced image generation step of generating a decoded block which is a reproduced signal of the encoding target block; a storage step of storing reproduced video data generated from the reproduced signal; and a prediction signal generation step of generating a prediction block which is a prediction signal of the encoding target block using a template generated from a reproduced signal, which is adjacent to the encoding target block in a predetermined positional relationship and belongs to the reproduced video data stored in the storage step, characterized in that in said encoding step, a difference block, which is a difference signal of the encoding target block, is generated by subtracting the prediction block from the encoding target block in pixel units, and the difference block is encoded, and in the reproduced image generation step, a decoded difference block, which is a reproduced signal of the difference block encoded in the encoding step, is generated, and a decoded block is generated by adding the decoded difference block and the prediction block in pixel units.

A video encoding method according to the present invention is a video encoding method for a video encoding device for encoding video data in block units, comprising: a division step of dividing a frame image constituting the video data into a plurality of encoding target blocks; an encoding step of encoding the encoding target block; a reproduced image generation step of generating a decoded block which is a reproduced signal of the encoding target block; a storage step of storing reproduced video data generated from the reproduced signal; a search step of searching a pixel group, which is highly correlated to a template generated from a reproduced signal, which is adjacent to the encoding target block in a predetermined positional relationship and belongs to the reproduced video data stored in the storage step, from the reproduced video data stored in the storage step; and a prediction signal determination step of determining a prediction block, which is a prediction signal of the encoding target block, from the reproduced video data stored in the storage step, based on the pixel group searched in the search step and the predetermined positional relationship, characterized in that in the encoding step, a difference block, which is a difference signal of the encoding target block, is generated by subtracting the prediction block from the encoding target block in pixel units, and the difference block is encoded, and in said reproduced image generation step, a decoded difference block, which is a reproduced signal of the difference block encoded in the encoding step, is generated, and a decoded block is generated by adding the decoded difference block and the prediction block in pixel units.

A video decoding method according to the present invention is a video decoding method for a video decoding device for reproducing encoded data of video data into reproduced video data in block units, comprising: a decoding step of decoding encoded data required for reproducing a decoding target block to be decoded; a reproduced image generation step of generating a decoded block, which is a reproduced signal of the decoding target block, from the encoded data decoded in the decoding step; a storage step of storing reproduced video data generated from the reproduced signal; and a prediction signal generation step of generating a prediction block, which is a prediction signal of the decoding target block, using a template generated from a reproduced signal, which is adjacent to the decoding target block in a predetermined positional relationship and belongs to the reproduced video data stored in the storage step, characterized in that in the decoding step, a decoded difference block, which is a difference signal of the decoding target block, is generated, and in the reproduced image generation step, a decoding block is generated by adding the decoded difference block and the prediction block in pixel units.

A video decoding method according to the present invention is a video decoding method for a video decoding device for reproducing encoded data of video data into reproduced video data in block units, comprising: a decoding step of decoding encoded data required for reproducing a decoding target block to be decoded; a reproduced image generation step of generating a decoded block, which is a reproduced signal of the decoding target block, from the encoded data decoded in the decoding step; a storage step of storing reproduced video data generated from the reproduced signal; a search step of searching a pixel group, which is highly correlated to a template generated from a reproduced signal, which is adjacent to the decoding target block in a predetermined positional relationship and belongs to the reproduced video data stored in the storage step, from the reproduced video data stored in the storage step; and a prediction signal determination step of determining a prediction block, which is a prediction signal of the decoding target block, from the reproduced video data stored in the storage step, based on the pixel group searched in the search step and the predetermined positional relationship, characterized in that in the decoding step, a decoded difference block, which is a difference signal of the decoding target block, is generated, and in the reproduced image generation step, a decoded block is generated by adding the decoded difference block and the prediction block in pixel units.

A video encoding method according to the present invention is a video encoding method for a video encoding device for encoding video data in block units, comprising: a division step of dividing a frame image constituting the video data into a plurality of encoding target blocks as a target region of the encoding; an encoding step of encoding the encoding target block; a reproduced image generation step of generating a decoded block which is a reproduced signal of the encoding target block; a storage step of storing reproduced video data generated from the reproduced signal; and a prediction signal generation step of generating a prediction block, which is a prediction signal of the encoding target block, using a predetermined method, from a reproduced signal, which is adjacent to the encoding target block in a predetermined positional relationship and belongs to the reproduced video data stored in the storage step, characterized in that in the encoding step, a reduced difference block, of which number of pixels is smaller than a difference block, which is a difference signal of the encoding target block obtained by subtracting the prediction block from the encoding target block in pixel units, is generated using a reduction processing which decreases the number of pixels of the difference block by a predetermined method, and the reduced difference block is encoded, and in the reproduced image generation step, a decoded reduced difference block, which is a reproduced signal of the reduced difference block, is generated, and a decoded block is generated from the decoded reduced difference block using an enlargement processing which increases the number of pixels by a predetermined method.

A video decoding method according to the present invention is a video decoding method for a video decoding device for reproducing encoded data of video data into reproduced video data in block units, comprising: a decoding step of decoding encoded data required for reproducing a decoding target block to be decoded; a reproduced image generation step of generating a decoded block, which is a reproduced signal of the decoding target block, from encoded data decoded in the decoding step; a storage step of storing the reproduced video data generated from the reproduced signal; and
a prediction signal generation step of generating a prediction block, which is a prediction signal of the decoding target block, using a predetermined method, from a reproduced signal, which is adjacent to the decoding target block in a predetermined positional relationship and belongs to the reproduced video data stored in the storage step, characterized in that in the decoding step, a decoded reduced difference block, of which number of pixels is smaller than a difference block, which is a difference signal of the decoding target block, is generated by decoding the encoded data, and in the reproduced image generation step, a decoded block is generated from the decoded reduced difference block using an enlargement processing, which increases the number of pixels by a predetermined method.

A video encoding program according to the present invention is a video encoding program for controlling a video encoding device for encoding video data in block units, the program causing the video encoding device to function as: division means for dividing a frame image constituting the video data into a plurality of encoding target blocks; encoding means for encoding the encoding target block; reproduced image generation means for generating a decoded block which is a reproduced signal of the encoding target block; storage means for storing reproduced video data generated from the reproduced signal; and prediction signal generation means for generating a prediction block, which is a prediction signal of the encoding target block using a template generated from a reproduced signal, which is adjacent to the encoding target block in a predetermined positional relationship and belongs to the reproduced video data stored in the storage means, characterized in that the encoding means generates a difference block, which is a difference signal of the encoding target block, by subtracting the prediction block from the encoding target block in pixel units, and encodes the difference block, and the reproduced image generation means generates a decoded difference block, which is a reproduced signal of the difference block encoded by the encoding means, and generates a decoded block by adding the decoded difference block and the prediction block in pixel units.

A video encoding program according to the present invention is a video encoding program for controlling a video encoding device for encoding video data in block units, the program causing the video encoding device to function as: division means for dividing a frame image constituting the video data into a plurality of encoding target blocks; encoding means for encoding the encoding target block; reproduced image generation means for generating a decoded block which is a reproduced signal of the encoding target block; storage means for storing reproduced video data generated from the reproduced signal; search means for searching a pixel group, which is highly correlated to a template generated from a reproduced signal, which is adjacent to the encoding target block in a predetermined positional relationship and belongs to the reproduced video data stored in the storage means, from the reproduced video data stored in the storage means; and prediction signal determination means for determining a prediction block, which is a prediction signal of the encoding target block, from the reproduced video data stored in the storage means, based on the pixel group searched by the search means and the predetermined positional relationship, characterized in that the encoding means generates a difference block, which is a difference signal of the encoding target block, by subtracting the prediction block from the encoding target block in pixel units, and encodes the difference block, and the reproduced image generation means generates a decoded difference block, which is a reproduced signal of the difference block encoded by the encoding means, and generates a decoded block by adding the decoded difference block and the prediction block in pixel units.

A video decoding program according to the present invention is a video decoding program for controlling a video decoding device for reproducing encoded data of video data into reproduced video data in block units, the program causing the video decoding device to function as: decoding means for decoding encoded data required for reproducing a decoding target block to be decoded; reproduced image generation means for generating a decoded block, which is a reproduced signal of the decoding target block, from the encoded data decoded by the decoding means; storage means for storing reproduced video data generated from the reproduced signal; and prediction signal generation means for generating a prediction block, which is a prediction signal of the decoding target block, using a template generated from a reproduced signal, which is adjacent to the decoding target block in a predetermined positional relationship and belongs to the reproduced video data stored in the storage means, characterized in that the decoding means generates a decoded difference block, which is a difference signal of the decoding target block, and the reproduced image generation means generates a decoded block by adding the decoded difference block and the prediction block in pixel units.

A video decoding program according to the present invention is a video decoding program for controlling a video decoding device for reproducing encoded data of video data into reproduced video data in block units, the program causing the video decoding device to function as: decoding means for decoding encoded data required for reproducing a decoding target block to be decoded; reproduced image generation means for generating a decoded block, which is a reproduced signal of the decoding target block, from the encoded data decoded by the decoding means; storage means for storing reproduced video data generated from the reproduced signal; search means for searching a pixel group, which is highly correlated to a template generated from a reproduced signal, which is adjacent to the decoding target block in a predetermined positional relationship and belongs to the reproduced video data stored in the storage means, from the reproduced video data stored in the storage means; and prediction signal determination means for determining a prediction block, which is a prediction signal of the decoding target block, from the reproduced video data stored in the storage means, based on the pixel group searched by the search means and the predetermined positional relationship, characterized in that the decoding means generates a decoded difference block, which is a difference signal of the decoding target block, and the reproducing image generation means generates a decoded block by adding the decoded difference block and the prediction block in pixel units.

A video encoding program according to the present invention is a video encoding program for controlling a video encoding device for encoding video data in block units, the program causing the video encoding device to function as: division means for dividing a frame image constituting the video data into a plurality of encoding target blocks as a target region of the encoding; encoding means for encoding the encoding target block; reproduced image generation means for generating a decoded block which is a reproduced signal of the encoding target block; storage means for storing the reproduced video data generated from the reproduced signal; and prediction signal generation means for generating a prediction block, which is a prediction signal of the encoding target block, using a predetermined method, from a reproduced signal, which is adjacent to the encoding target block in a predetermined positional relationship and belongs to the reproduced video data stored in the storage means, characterized in that the encoding means generates a reduced difference block, of which the number of pixels is smaller than a difference block, which is a difference signal of the encoding target block obtained by subtracting the prediction block from the encoding target block in pixel units, using a reduction processing, which decreases the number of pixels of the difference block by a predetermined method, and encodes the reduced difference block, and the reproduced image generation means generates a decoded reduced difference block, which is a reproduced signal of the reduced difference block, and generates a decoded block from the decoded reduced difference block using an enlargement processing, which increases the number of pixels by a predetermined method.

A video decoding program according to the present invention is a video decoding program for controlling a video decoding device for reproducing encoded data of video data into reproduced video data in block units, the program causing the video decoding device to function as: decoding means for decoding encoded data required for reproducing a decoding target block to be decoded; reproduced image generation means for generating a decoded block which is a reproduced signal of the decoding target block from encoded data decoded by the decoding means; storage means for storing reproduced video data generated from the reproduced signal; and prediction signal generation means for generating a prediction block, which is a prediction signal of the decoding target block, using a predetermined method, from a reproduced signal, which is adjacent to the decoding target block in a predetermined positional relationship and belongs to the reproduced video data stored in the storage means, characterized in that the decoding means generates a decoded reduced difference block, of which number of pixels is smaller than a difference block, which is a difference signal of the decoding target block, by decoding the encoded data, and the reproduced image generation means generates a decoded block from the decoded reduced difference block using an enlargement processing, which increases the number of pixels by a predetermined method.

A video encoding device according to the present invention is a video encoding device for encoding video data, comprising: division means for dividing a frame image constituting the video data into a plurality of regions as encoding target regions; encoding means for encoding an image of each of the regions obtained by division by the division means; reproduced image generation means for generating a reproduced image of the image encoded by the encoding means; storage means for storing reproduced image generated by the reproduced image generation means; search means for searching a region of an image highly correlated to a reproduced image in a template region, which is adjacent to a region of an encoding target image by the encoding means in a predetermined positional relationship and is a part of the reproduced image stored in the storage means, from the reproduced image stored in the storage means; and prediction signal determination means for determining a prediction signal in the region to be encoded from the reproduced image stored in the storage means, based on the region searched by the search means and the predetermined positional relationship, characterized in that the encoding means generates a difference signal between the prediction signal determined by the prediction signal determination means and the image of the region to be encoded, and encodes the difference signal.

In the video encoding device according to the present invention, a region of an image highly correlated with a reproduced image of a template region, which is adjacent to a region of an encoding target image in a predetermined positional relationship, is searched from the reproduced image. Then based on the searched region and the above-mentioned predetermined positional relationship, a prediction signal of the encoding target region is determined from the reproduced image. Encoding is performed using this prediction signal. In other words, according to the video encoding device of the present invention, the prediction signal can be determined without using a motion vector, and efficient encoding can be implemented.

A video decoding device according to the present invention is a video decoding device for decoding video data in which a frame image divided into a plurality of regions is encoded, comprising: decoding means for decoding the encoded data in each of the regions; reproduced image generation means for generating reproduced image from the image decoded by the decoding means; storage means for storing the image generated by the reproduced image generation means; search means for searching a region of an image highly correlated to a reproducing image in a template region, which is adjacent to an region of a decoding target image by the decoding means in a predetermined positional relationship and which is a part of the reproduced image stored in the storage means, from the reproduced image stored in the storage means; and prediction signal determination means for determining a prediction signal in the region to be decoded from the reproduced image stored in the storage means, based on the region searched by the search means and the predetermined positional relationship, characterized in that the reproduced image generation means generates a sum signal of the prediction signal determined by the prediction signal determination means and the image decoded by the decoding means to generate a reproduced image.

In the video decoding device according to the present invention, a prediction signal is determined in the same manner as the above-mentioned video encoding device, and the video can be decoded. In other words, according to the video decoding device of the present invention, video data efficiently encoded by the above-mentioned video encoding device can be correctly decoded.

It is preferable that the video encoding device further comprises estimation means for comparing the reproduced image of the template and the reproduced image stored in the storage means, to estimate a spatial continuity of an image of the encoding target region based on the comparison result; and setting means for further dividing the encoding target region and setting the region obtained by division as a new encoding target region, based on the spatial continuity of the image estimated by the estimation means, and setting a template region for the new encoding target region. According to this configuration, the size of the prediction signal region can be appropriately selected based on the spatial continuity, so encoding efficiency improves even when encoding video data of which change of motion amount is major.

It is preferable that the video decoding device further comprises estimation means for comparing the reproduced image of the template and the reproduced image stored in the storage means, to estimate a spatial continuity of an image of the decoding target region based on the comparison result; and setting means for further dividing the decoding target region and setting the region obtained by division as a new decoding target region, based on the spatial continuity of the image estimated by the estimation means, and setting a template region for the new decoding target region. According to this configuration, video data encoded by the above-mentioned video encoding device can be correctly decoded.

Besides describing the present invention as an invention of the video encoding device and the video decoding device, as mentioned above, the present invention can be described as an invention of a video encoding method, video encoding program, video decoding method and video decoding program. These inventions are essentially the same only in different categories, implement the same functions, and have the same effects.

A video encoding method according to the present invention is a video encoding method for a video encoding device for encoding video data, comprising: a division step of dividing a frame image constituting the video data into a plurality of regions as encoding target regions; an encoding step of encoding the image of each of the regions obtained by division in the division step; a reproduced image generation step of generating a reproduced image encoded in the encoding step; a storage step of storing the reproduced image generated in the reproduced image generation step; a search step of searching a region of an image highly correlated to a reproduced image in a template region, which is adjacent to a region of an encoding target image in the encoding step in a predetermined positional relationship and is a part of the reproduced image stored in the storage step, from the reproduced image stored in the storage step; and a prediction signal determination step of determining a prediction signal in the region to be encoded from the reproduced image stored in the storage step, based on the region searched in the search step and the predetermined positional relationship, characterized in that in the encoding step, a difference signal between the prediction signal determined in the prediction signal determination step and the image of the region to be encoded is generated, and this difference signal is encoded.

A video encoding program according to the present invention is a video encoding program for controlling a video encoding device for encoding video data, the program causing the video encoding device to function as: division means for dividing a frame image constituting the video data into a plurality of regions as encoding target regions; encoding means for encoding an image of each of the regions obtained by division by the division means; reproduced image generation means for generating a reproduced image of the image encoded by the encoding means; storage means for storing reproduced image generated by the reproduced image generation means; search means for searching a region of an image highly correlated to a reproduced image in a template region, which is adjacent to a region of an encoding target image by the encoding means in a predetermined positional relationship and is a part of the reproduced image stored in the storage means, from the reproduced image stored in the storage means; and prediction signal determination means for determining a prediction signal in the region to be encoded from the reproduced image stored in the storage means, based on the region searched by the search means and the predetermined positional relationship, characterized in that the encoding means generates a difference signal between the prediction signal determined by the prediction signal determination means and the image of the region to be encoded, and encodes the difference signal.

A video decoding method according to the present invention is a video decoding method for a video decoding device for decoding video data in which a frame image divided into a plurality of regions is encoded, comprising: a decoding step of decoding the encoded data in each of the regions; a reproduced image generation step of generating reproduced image from the image decoded in the decoding step; a storage step of storing the image generated in the reproduced image generation step; a search step of searching a regions of an image highly correlated to a reproduced image in a template region, which is adjacent to a region of a decoding target image in the decoding step in a predetermined positional relationship and is a part of the reproduced image stored in the storage step, from the reproduced image stored in the storage step; and a prediction signal determination step of determining a prediction signal in the region to be decoded from the reproduced image stored in the storage step, based on the region searched in the search step and the predetermined positional relationship, characterized in that in the reproduced image generation step, a sum signal of the prediction signal determined in the prediction signal determination step and the image decoded in the decoding step is generated to generate a reproduced image.

A video decoding program according to the present invention is a video decoding program for controlling a video decoding device for decoding video data in which a frame image divided into a plurality of regions is encoded, the program causing the video decoding device to function as: decoding means for decoding the encoded data in each of the regions; reproduced image generation means for generating reproduced image from the image decoded by the decoding means; storage means for storing the image generated by the reproduced image generation means; search means for searching a region of an image highly correlated to a reproduced image in a template region, which is adjacent to a region of a decoding target image by the decoding means in a predetermined positional relationship and is a part of the reproduced image stored in the storage means, from the reproduced image stored in the storage means; and prediction signal determination means for determining a prediction signal in the region to be decoded from the reproduced image stored in the storage means, based on the region searched by the search means and the predetermined positional relationship, characterized in that the reproduced image generation means generates a sum signal of the prediction signal determined by the prediction signal determination means and the image decoded by the decoding means to generate a reproduced image.

Effect of the Invention

According to the present invention, a reproduced region highly correlated to a template region, which is adjacent to a region of an encoding target image in a predetermined positional relationship, is searched, and a prediction signal is determined based on the searched region and the above-mentioned positional relationship, so effective encoding can be implemented without using a motion vector.

BRIEF DESCRIPTION OF THE DRAWINGS

FIG. 12 are diagrams depicting an encoding order;

FIG. 14 are diagrams depicting a function of a judgment section in the second embodiment;

Figure 1:
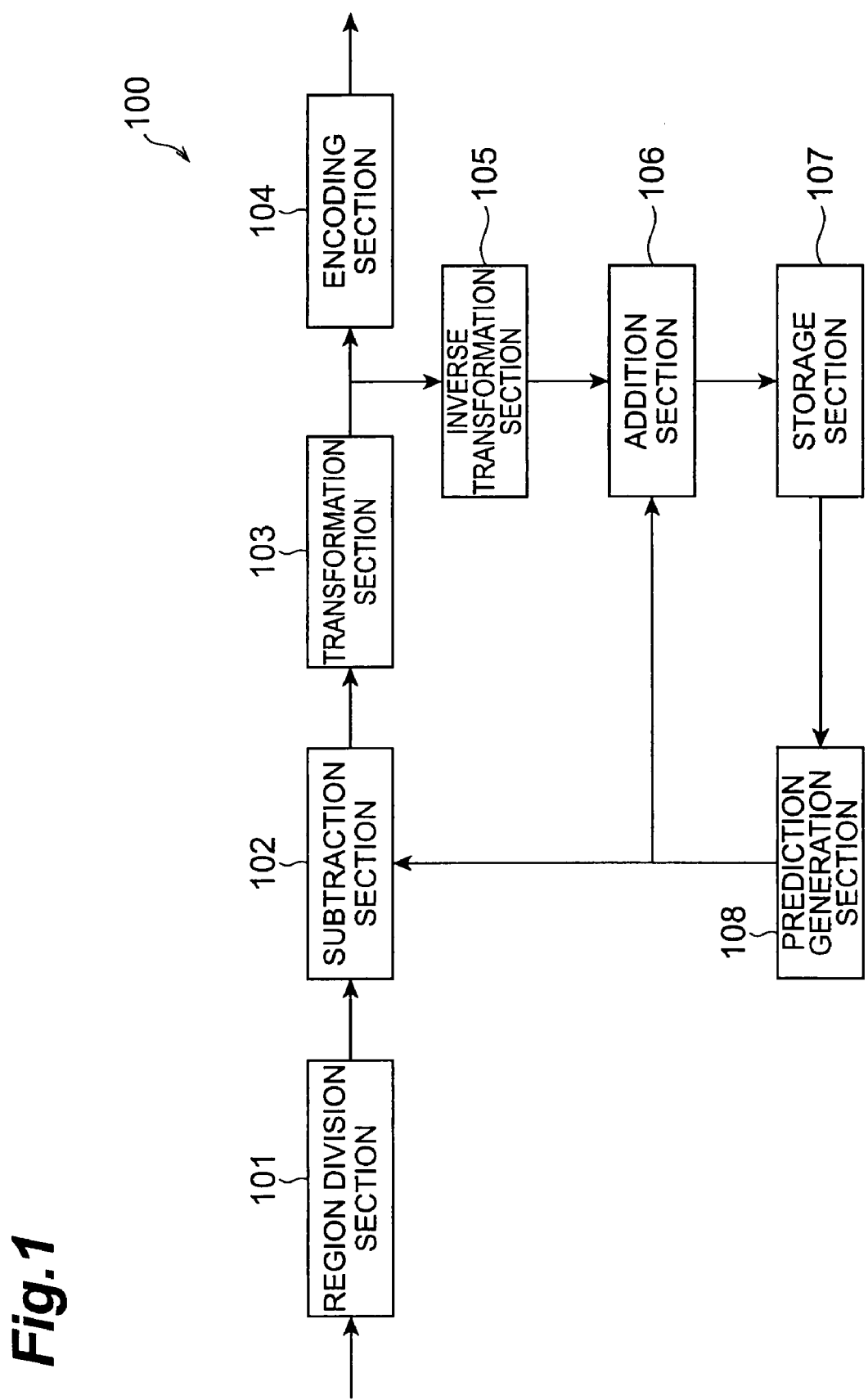
FIG. 1 is a diagram depicting a configuration of a video encoding device according to a first embodiment of the present invention.

EXPLANATION OF REFERENCE SYMBOLS 100, 1800, 2100, 2600, 3000, 3200, 3400 video encoding device
600, 1900, 2200, 2700, 3100, 3300, 3500 video decoding device
101 region division section
102, 2102 subtraction section
103, 2103 transformation section
104, 2104, 3004 encoding section
105, 602, 2105, 2202 inverse transformation section
106, 603, 2106, 2203 addition section
107, 604 storage section
108, 605, 800, 1108, 3408, 3505, 3608 prediction generation section
201, 802, 3602 template region determination section
202 matching section
203, 804, 3603 filling section
601, 2201, 3101 decoding section
801 judgment section
109, 2612, 3012 selection section
204 signal generation section
2110, 2207, 3210 reduction section
2111, 2208, 3211, 3308 enlargement section
2613, 2709, 3109 switching section
3013, 3110 switch
1600, 1700 recording media
1600a, 1700a program storage domain
1601 video encoding program
1701 video decoding program
1601a, 1701a main module
1601b region division module
1601c subtraction module
1601d transformation module
1601e encoding module
1601f, 1701c inverse transformation module
1601g, 1701d addition module
1601h, 1701e storage module
1601i, 1701f prediction generation module
1601j, 1701g template region determination module
1601k, 1701h matching module 1601*m*, 1701*i* filling module
1701*b* decoding module

BEST MODE FOR CARRYING OUT THE
INVENTION

Preferred embodiments of a video encoding device, video encoding method, video encoding program, video decoding device, video decoding method and video decoding program according to the present invention will now be described with reference to the drawings. In the description of the drawings, the same composing elements are denoted with the same reference symbol, for which redundant description is omitted.

First Embodiment

FIG. 1 shows a video encoding device 100 of the first embodiment. The video encoding device 100 is a device for encoding video data in block units. The video encoding device 100 encodes video data by inputting frame images constituting the video data, and encoding the frame images sequentially. The video encoding device 100 is implemented by such a hardware as an information processing device comprised of a CPU (Central Processing Unit), frame memory and hard disk. The video encoding device 100 implements functional composing elements to be described below by operating these hardware composing elements.

As FIG. 1 shows, the video encoding device 100 is comprised of a region division section 101, subtraction section 102, transformation section 103, encoding section 104, inverse transformation section 105, addition section 106, storage section 107 and prediction generation section 108. The function of each section will now be described.

The region division section 101 is division means for dividing the frame image constituting a video that is input into a plurality of regions as encoding target regions. In other words, the region division section 101 is division means for dividing a frame image constituting a video that is input into a plurality of encoding target blocks. Specifically, the region division section 101 divides a predetermined size of block (e.g. 8 pixels×8 pixels, encoding target block). The original image obtained by division is output in the sequence of encoding, and is input to the subtraction section 102. The output sequence may be a raster scan sequence that is from the upper left to the lower right of the frame image, as shown in (a) of FIG. 12, or may be a zigzag sequence which repeats the sequence of left end to right end of the frame, and the sequence of right end to left end thereof alternately, one step at a time, as shown in (b) of FIG. 12. The output sequence is stored in the region division section 101 in advance.

The subtraction section 102 is a composing element of encoding means for generating a difference signal between the original signal of the encoding target block and a prediction signal, which is described later, and outputting it. The difference signal is generated by subtracting the prediction signal of the encoding target block, which is output from the prediction generation section 108, from the original signal of the encoding target block, which is output from the region division section 101. The difference signal to be output is a signal to become an encoding target, and is input to the transformation section 103 for encoding.

The transformation section 103 is transformation means for transforming the difference signal, which is input from the subtraction section 102, according to a predetermined transformation method, and outputting transformation coefficient data. For the transformation, orthogonal transformation represented by DCT (Discrete Cosine Transform) can be used. Relational expression for transformation are stored in the transformation section 103 in advance. This transformation may be reversible or irreversible. This transformation is for performing encoding, which is performed after this operation, more efficiently. The transformation coefficient data, which is output, is input to the encoding section 104 and the inverse transformation section 105. To compress the information volume, the coefficient after orthogonal transformation may be quantized.

The encoding section 104 is a composing element of the encoding means for performing entropy encoding on the transformation coefficient data which is input from the transformation section 103. The encoded data becomes the output of the video encoding device 100. For the entropy encoding, a variable length encoding method, such as Huffman encoding, and an arithmetic encoding method, represented by CABAC (Context-based Adaptive Binary Arithmetic Coding), can be used. In both cases, the information volume can be compressed by changing the transformation method based on the bias of generation probability of the transformation coefficient data.

The inverse transformation section 105 is a composing element of reproduced image generation means for generating a difference signal used for generating a reproduced image. The difference signal is generated by performing inverse processing of the transformation processing performed in the transformation section 103 on the transformation coefficient data, which is input from the transformation section 103. Relational expressions for inverse transformation are stored in the inverse transformation section 105 in advance. The difference signal generated in the inverse transformation section 105 is input to the addition section 106.

The addition section 106 is a composing element of the reproduced image generation means for generating a reproduced signal, as a sum signal, by adding a prediction signal, which is output from the later mentioned prediction generation section 108 (same as a prediction signal which is input to the subtraction section 102), and the difference signal, which is generated by the inverse transformation section 105. Here the reproduced signal constituting a reproduced image. The reproduced signal generated by the addition section 106 is the same as a reproduced signal generated in a decoding device. The reproduced signal generated by the addition section 106 is input to the storage section 107.

The storage section 107 is storage means for storing the reproduced signal, which is input from the addition section 106, in a storage device in the video encoding device 100, a frame memory, for example, as reproduced video data. All the reproduced signals are stored until the encoding of all video data is completed. In this way, the reproduced video data is sequentially stored.

Figure 2:
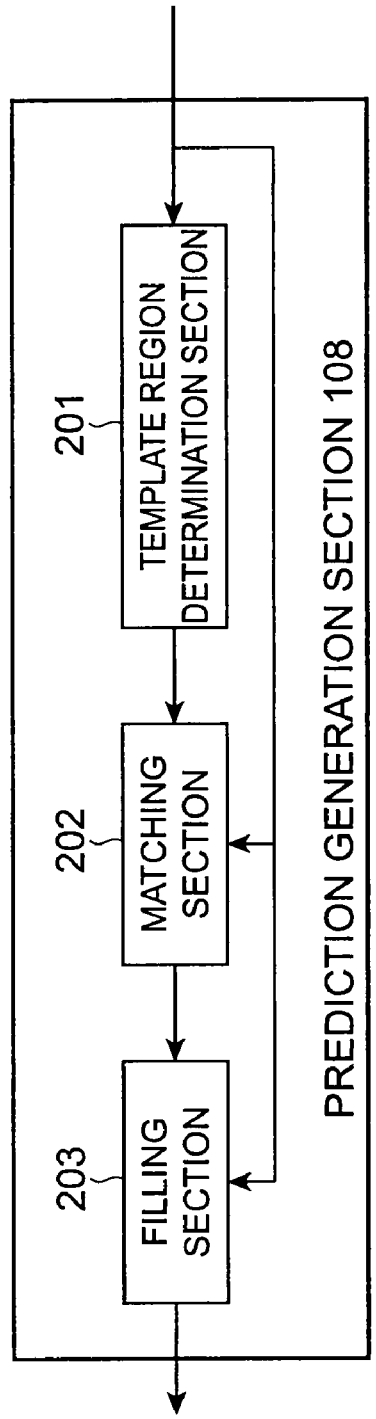
FIG. 2 is a diagram depicting a configuration of a prediction generation section of the video encoding device.

The prediction generation section 108, which is a characteristic portion of the present invention, reads the reproduced image stored in the storage section 107, and generates the prediction signal of a prediction target (encoding target) block based on the reproduced signal. Detailed operation of the prediction generation section 108 will now be described. FIG. 2 shows further detail of the functional blocks of the prediction generation section 108. As FIG. 2 shows, the prediction generation section 108 is comprised of a template region determination section 201, matching section 202 and filling section 203.

Figure 3:
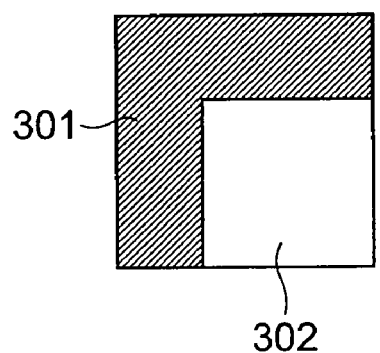
FIG. 3 is a diagram depicting a positional relationship between a template region and a prediction target region.

The template region determination section 201 is a composing element of search means for determining a template region and signal of this region (template) used for generating a prediction signal based on input from the storage section 107. In other words, the template region determination section 201 is a composing element of the search means for generating a template from a reproduced signal, which is adjacent to the encoding target block in a predetermined positional relationship and belongs to reproduced video data stored in the storage section 107. The template region determination section 201 is a composing element of prediction signal generation means for generating a prediction block, which is a prediction signal of an encoding target block, using a template. As FIG. 3 shows, a template region 301 is n region of a reproduced image which is adjacent to a region 302 of an encoding target image in a predetermined positional relationship and is stored in the storage section 107, that is, a group of pixels comprised of a reproduced signal of reproduced video data. To put it concretely, a pixel group with a predetermined size, which includes a group of pixels spatially adjacent to a prediction target block and is a reproduced region located in a same frame as the prediction target block stored in the storage section 107, is assigned to the template region. Therefore the position of the template region depends on the encoding order (order of encoding processing which is output from the region division section 101) of the block. In the template region determination section 201, the following conditions for determining the template region are stored in advance.

Figure 13:
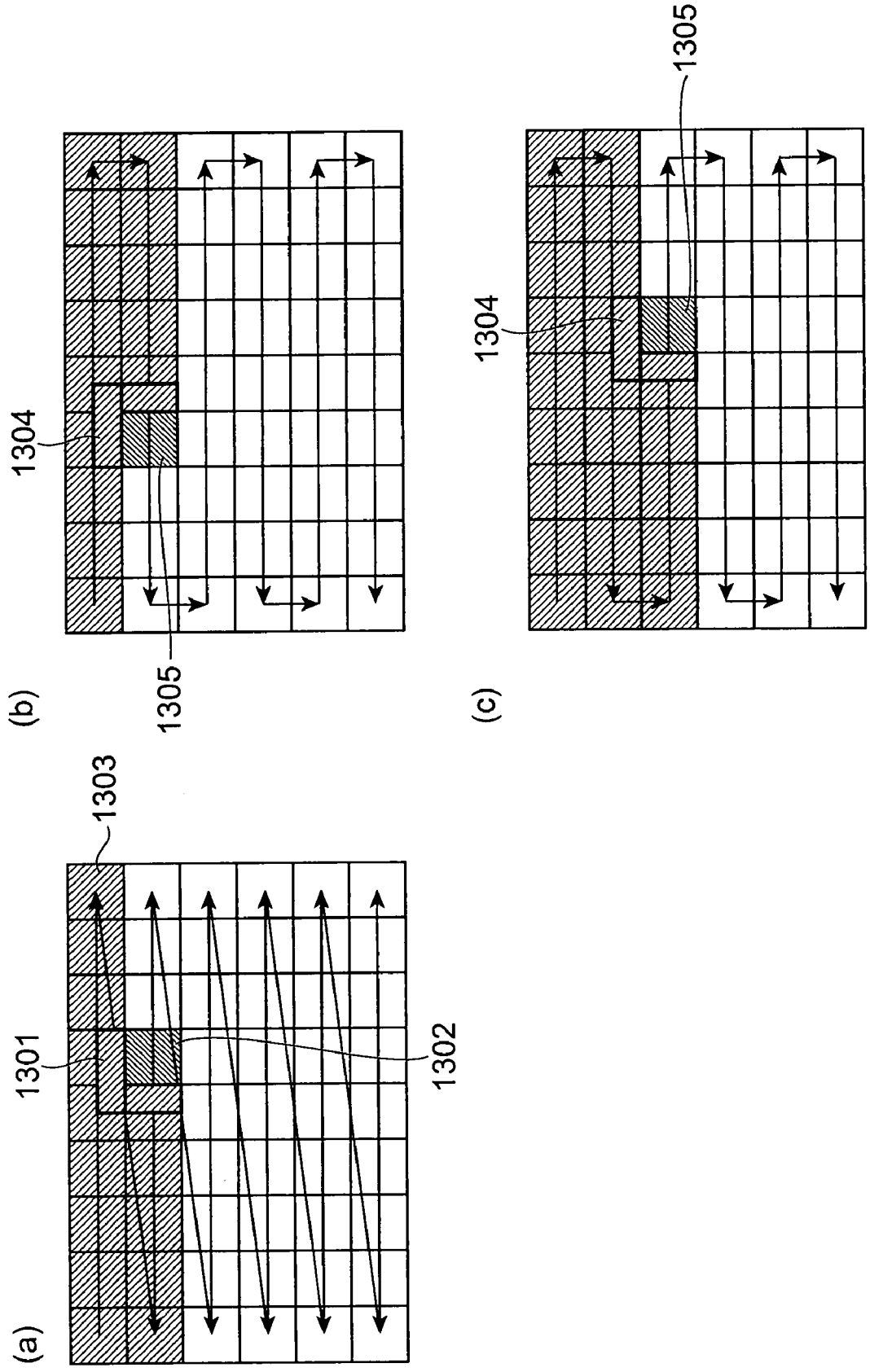
FIG. 13 are diagrams depicting an example of a positional relationship of a template region and a prediction target region according to the encoding order.

FIG. 13 shows an example of the positional relationship between the template region and the prediction target region. As (a) of FIG. 13 shows, the template region 1301 is a region positioned at the left and above the prediction target block 1302 if the encoding order is a raster scan order. As (a) of FIG. 13 shows, the region 1303 positioned at the left and above the prediction target block 1302 is a region of which reproduced image is stored in the storage section 107. If the encoding order is a zigzag order, the position of the template region changes depending on the progress of encoding. If encoding is progressing from the left to right of the screen, as shown in (b) of FIG. 13, the prediction target block 1304 is a region positioned at the right and above the prediction target block 1305. If encoding is progressing from the right to left of the screen, as shown in (c) of FIG. 13, the prediction target block 1304 is a region positioned at the left and above the prediction target block 1305.

The matching section 202 is search means for performing template matching in the reproducing image stored in the storage section 107 as a search region, using a reproduced signal of the template region determined by the template region determination section 201, and searching (detecting) a region of which correlation to the reproduced signal of the template region is highest in the search region. In other words, the matching section 202 is search means for searching a pixel group of which correlation to the template determined by the template region determination section 201 is high, from the reproduced video data stored in the storage section 107. The matching section 202 is also a composing element of prediction signal generation means for generating a prediction block, which is a prediction signal of the encoding target block, using the template. The template matching will be described later in detail.

The filling section 203 is a prediction signal determination means for setting and determining a prediction signal having the same size as the prediction target block, from the reproduced image, based on the region (high correlation region) searched by the matching section 202 and the positional relationship between the prediction target block and the template region. In other words, the filling section 203 is prediction signal determination means for determining a prediction block, which is a prediction signal of the encoding target block, from the reproduced video data stored in the storage section 107, based on the pixel group searched by the matching section 202 and the above-mentioned positional relationship. The filling section 203 is also a composing element of prediction signal generation means for generating a prediction block, which is a prediction signal of the encoding target block, using a template. The positional relationship of the searched high correlation region and the region of the image to be the prediction signal is the same as the positional relationship between the template region and the prediction target block. For example, if the encoding order of the block is a raster scan order, a region adjacent to the right and bottom part of the high correlation region is the region of the prediction signal. The determined prediction signal is output from the prediction generation section 108, and is input to the subtraction section 102 and the addition section 106.

Figure 4:
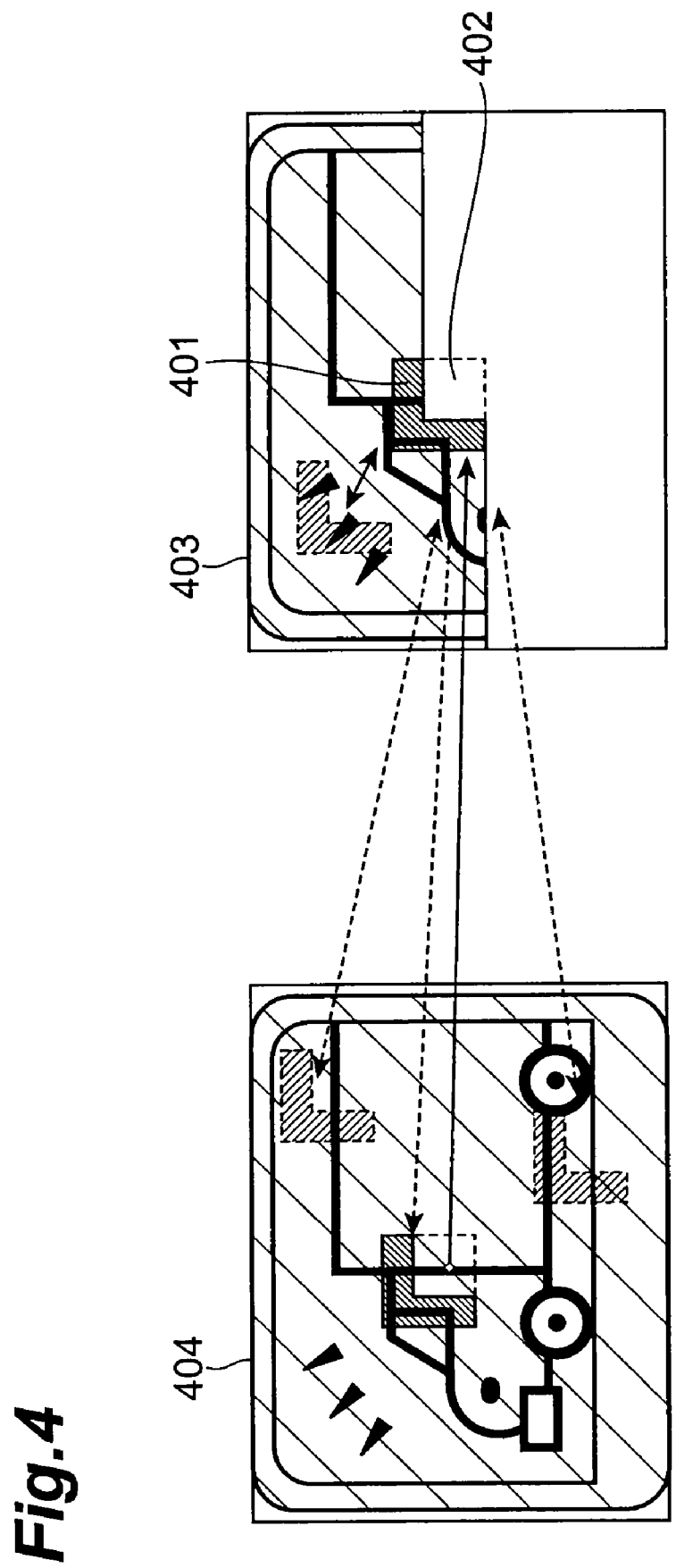
FIG. 4 is a diagram depicting a detailed operation to determine a prediction signal by template matching.

Detailed operation of determining a prediction signal by template matching in the matching section 202 and the filling section 203 will now be described with reference to FIG. 4. The matching section 202 performs template matching for searching a region similar to the image of a template region 401 from search ranges 403 and 404. The search ranges include a reproduced region 403 in a frame (prediction target frame), including the template region 401 and a prediction target region 402, and image 404 of another reproduced frame. First the correlation of a signal of the template region 401 and a signal of a pixel group having a same shape as the template region 401 at an arbitrary location in the search range is measured. For a value of evaluation criteria to indicate the correlation, SAD (Sum of Absolute Difference), which indicates the sum of absolute values of the difference signals, or MSE (Mean Square Error), which indicates a mean square error of the difference signals, for example, can be used. Correlation values of evaluation criteria for all possible pixel groups in the search range are obtained, and information (address) which indicates a pixel group of which value of evaluation criteria is smallest (the image of the template region 401 itself is excluded) is output as the search result.

The filling section 203 sets the pixel group adjacent to the high correlation region searched by the template matching as a prediction signal. In a region of which correlation to the template region is high, it is highly possible that the correlation to a region adjacent to the template region is also high, so this region can be used as a prediction signal. Because of this, the prediction method according to the present method is established.

Figure 5:
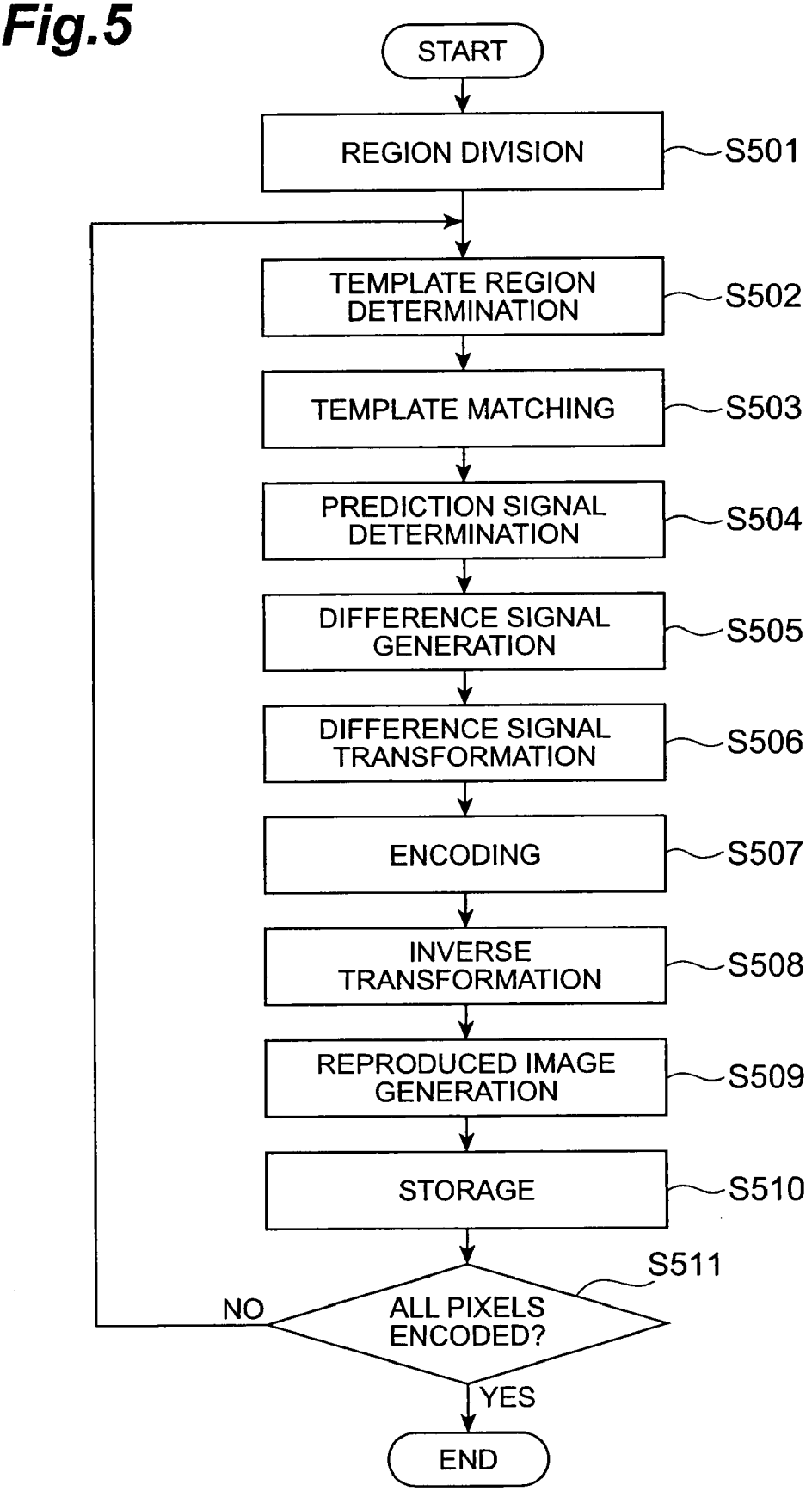
FIG. 5 is a flow chart depicting a processing executed by the video encoding device according to the first embodiment of the present invention.

Now the encoding processing (video encoding method) in the video encoding device 100 of the present embodiment will be described with reference to the flow chart in FIG. 5.

When an encoding target of video data is input to the video encoding device 100, each frame image constituting the video is input to the region division section 101. The frame image which was input is divided into a plurality of predetermined size blocks by the region division section 101 (S501 division step). Processing after this is performed in block units. A block is input to the subtraction section 102 as an image of the encoding target region.

Then a prediction signal of the encoding target block is generated by the prediction generation section 108 as follows. An encoding order of the block has been notified to the prediction generation section 108 from a controller (not illustrated) which controls the encoding processing in the video encoding device 100. Or the prediction generation section 108 stores the encoding order of the blocks in advance. First the template region determination section 201 determines a template region on a reproduced image adjacent to the block (S502 search step). Then the matching section 202 performs template matching for a reproduced image in a same or different frame from the encoding target block, and a region highly correlated to the reproduced signal of the template region is searched (S503 search step). Then the filling section 203 sets a region the same size as the encoding target block, which is adjacent to the high correlation region obtained by the template matching in a predetermined positional relationship (right and below in the case of the example in FIG. 4) as a prediction signal (S504 prediction signal determination step). The prediction signal which is set is input to the subtraction section 102 and the addition section 106.

Then the subtraction section 102 generates a difference signal by subtracting the prediction signal which was input from the prediction generation section 108 (filling section 203) from the original image which was input from the region division section 101 in the pixel domain (S505 encoding step). The generated difference signal is input to the transformation section 103, and is transformed by the transformation section 103 (S506). The transformed difference signal is input to the encoding section 104 and the inverse transformation section 105. The difference signal after transformation, which was input to the encoding section 104, is entropy-encoded by the encoding section 104, and compressed encoding data is generated (S507 encoding step).

The difference signal after transformation, which was input to the inverse transformation section 105, is inverse-transformed by the inverse transformation section 105, and a difference signal after inverse transformation is generated (S508 reproducing image generation step). The difference signal after inverse transformation is input to the addition section 106, the addition section 106 adds the difference signal and the prediction signal which was input from the prediction generation section 108 (filling section 203) to generate a sum signal, which becomes the reproduced signal (S509 reproduced image generation step). The generated reproduced signal is input to the storage section 107, and is stored in the storage section 107 at a predetermined address according to the encoding target frame in a frame memory, for example (S510 storage step).

Then it is judged whether the above processings (S502 to S510) are completed in all the blocks of the frame image (S511). If completed, processing in this frame ends, compressed encoding data after entropy encoding by the encoding section 104 is output, and processing of the next frame is started. If unprocessed blocks remain, processing of the next block is started. The above judgment may be performed by one of the above composing elements, or may be performed by a means which is set for controlling the encoding processing in the video encoding device 100.

In the above-mentioned processing, the reproduced signal stored in the storage section 107 is based on the difference signal, which was transformed by the transformation section 103, and was inverse-transformed by the inverse transformation section 105. This is based on the assumption that the encoding by the encoding section 104 is reversible, and the reproduced image to be reproduced in the decoding device is obtained in the above processing.

In the above processing, an example of performing prediction only based on a filling by template matching was shown, but other processing may be included. For example, in some cases the reproduced adjacent pixels may not exist when the top end or both borders of the frame image is encoded, and in such a case the adjacent pixels must be assumed to exist in advance to use the present method. For such portions, a conventional prediction using a motion vector may be better to efficiently encode. If encoding efficiency improves by using prediction based on a motion vector, compared with prediction based on the present method, not only in both borders of the screen but also in other cases, prediction based on a motion vector may be used. In this case, both methods can be efficiently used if information which indicate one of the present method or the method based on a motion vector was used, and the motion vector value, are added to the header of the block information.

As described above, according to the video encoding device 100 of the present embodiment, inter-frame prediction can be performed without using a motion vector, by using an encoded reproduced image when inter-frame prediction is performed, and therefore efficient encoding is enabled. In other words, in the data encoded by the video encoding device 100 of the present embodiment, only transformed difference signals are essentially encoded, and a motion vector is deleted, compared with a conventional encoding method. In addition to this, only a reproduced region up to that point is used when a prediction signal is determined, so the data can always be encoded according to the scan sequence of the video data.

Figure 6:
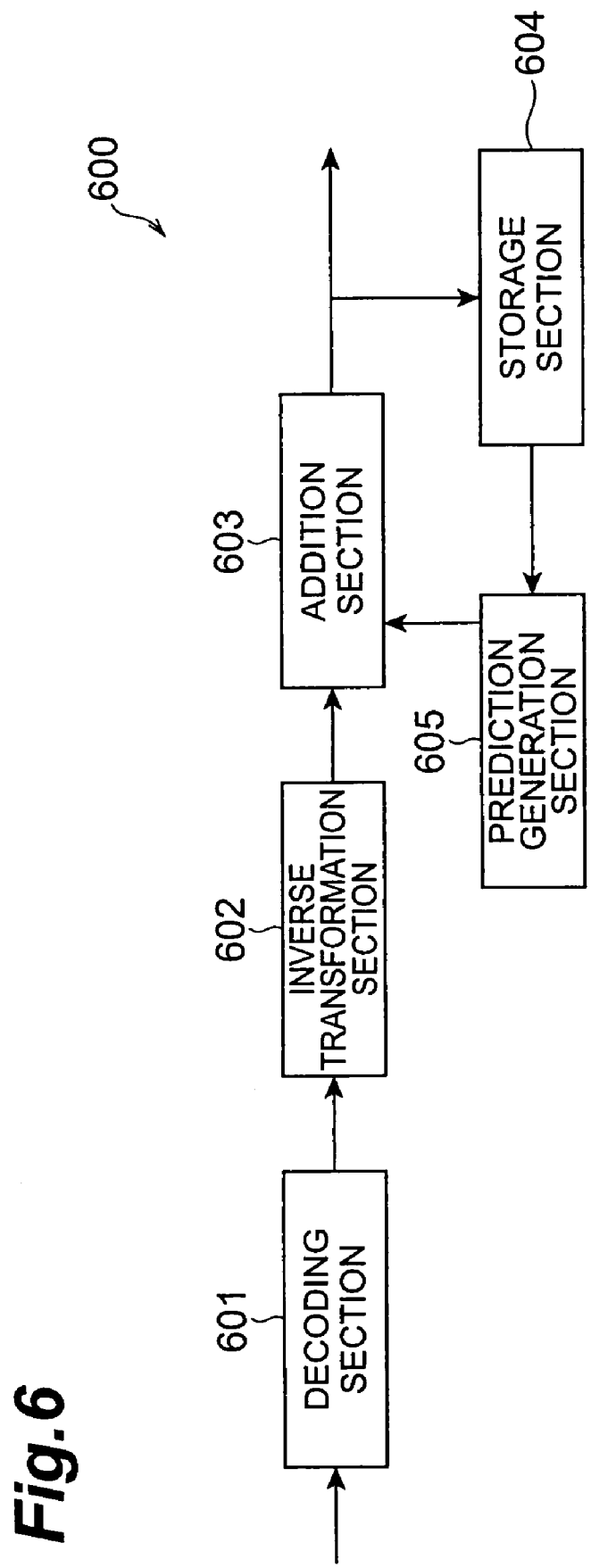
FIG. 6 is a diagram depicting a configuration of the video decoding device according to the first embodiment of the present invention.

Now a video decoding device of the present embodiment will be described. FIG. 6 shows the video decoding device 600 of the present embodiment. The video decoding device 600 is a device for decoding video data encoded by the video encoding device 100, and generating reproduced video data. The video decoding device 600 is implemented by such a hardware as an information processing device comprising a CPU (Central Processing Unit), frame memory and hard disk. The video decoding device 600 implements functional composing elements to be described below, by operating these hardware composing elements.

As FIG. 6 shows, the video decoding device 600 is comprised of a decoding section 601, inverse transformation section 602, addition section 603, storage section 604 and prediction generation section 605. The function of each section will now be described.

The decoding section 601 is decoding means for decoding compressed encoding data which is input. The compressed encoding data has been encoded by the video encoding device 100 according to the present embodiment, as mentioned above, where a frame image is divided into a plurality of regions (encoding target blocks) and encoded (decoding target blocks). The decoding method of the decoding section 601 corresponds to the entropy encoding method used by the video encoding device 100, and information for decoding is stored in the decoding section 601 in advance. Decoding and output in the decoding section 601 are performed in encoding units (block units) according to the encoding order. The decoded data is input to the inverse transformation section 602.

The inverse transformation section 602 is a composing element of reproduced image generation means for generating a difference signal used for generating reproduced image by performing inverse processing of transformation processing performed by the video encoding device 100, on the data which is input from the decoding section 601. The inverse transformation section 602 corresponds to the inverse transformation section 105 of the video encoding device 100. Relational expressions for inverse information are stored in the inverse transformation section 602 in advance. The difference signal generated in the inverse transformation section 602 is input to the addition section 603.

The addition section 603 is a composing element of the reproduced image generation means for generating a reproduced signal as a sum signal by adding a prediction signal, which is output from the later mentioned prediction generation section 605, and the difference signal, which is generated by the inverse transformation section 602. The addition section 603 corresponds to the addition section 106 of the video encoding device 100. The reproduced signal generated by the addition section 106 is input to the storage section 604, and is output to the video decoding device 600.

The storage section 604 is storage means for storing the reproduced signal, which is a decoding block (decoded encoding target block) which is input from the addition section 603, into the storage device provided in the video decoding device 600, a frame memory, for example, as reproduced video data. The storage section 604 corresponds to the storage section 107 of the video encoding device 100. All decoding blocks are stored until decoding of all video data is completed. In this way, the reproduced video data is sequentially stored.

The prediction generation section 605 reads the reproduced image stored in the storage section 604, and generates the prediction signal of a prediction target (decoding target) block based on the reproduced image. The prediction generation section 605 corresponds to the prediction generation section 108 in the video encoding device 100, and has the same functions, so description thereof is omitted here.

Figure 7:
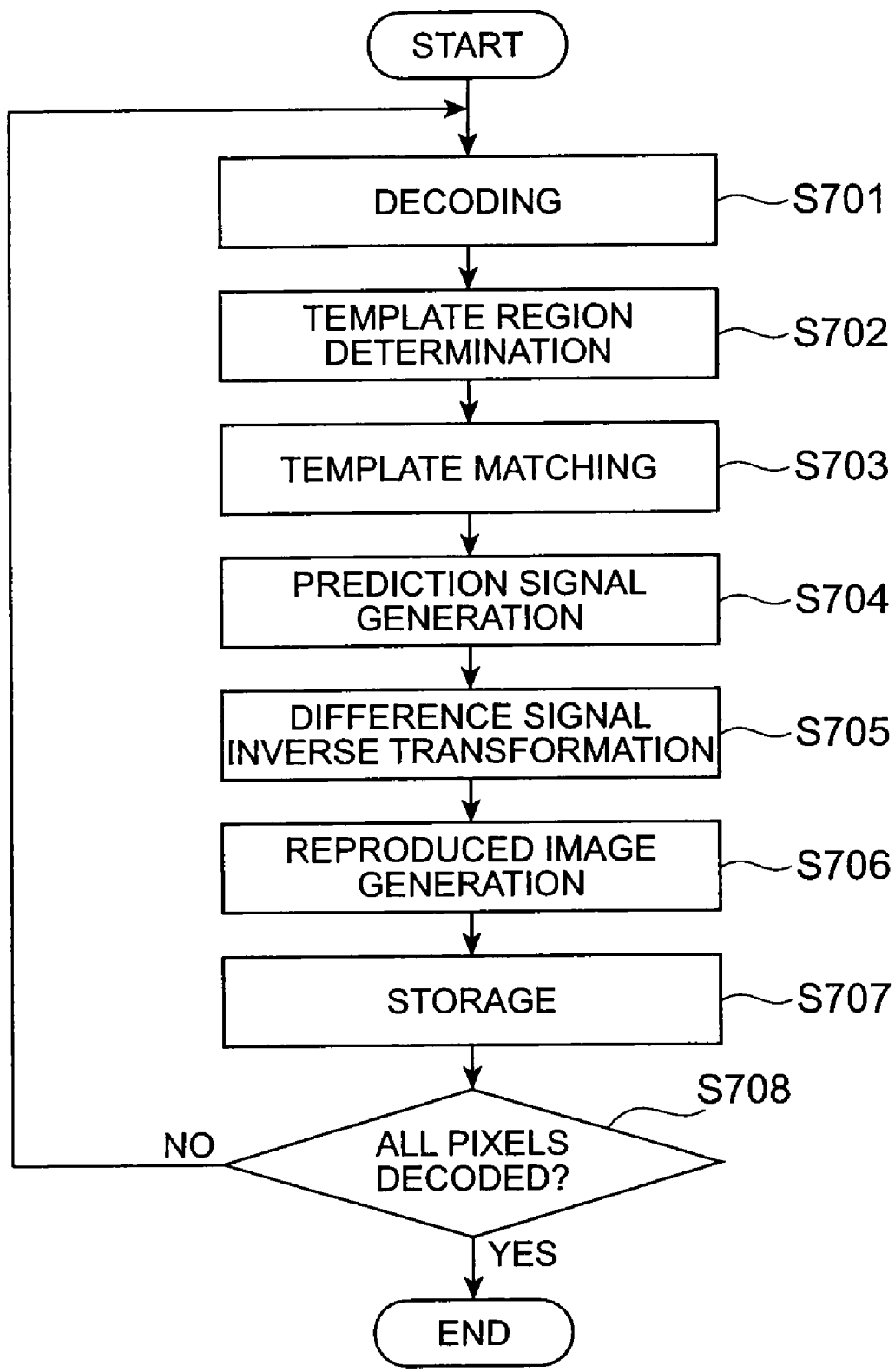
FIG. 7 is a flow chart depicting a processing executed by the video decoding device according to the first embodiment of the present invention.

Now the decoding processing (video decoding method) in the video decoding device 600 of the present embodiment will be described with reference to the flow chart in FIG. 7. It is assumed that the compressed encoding data to be decoded by the video decoding device 600 has been encoded by the video encoding device 100.

When a decoding target compressed encoding data is input to the video decoding device 600, decoding is performed by the decoding section 601 (S701 decoding step). After decoding, transformation data is output in block units. This transformation data is input to the inverse transformation section 602 by the decoding section 601. The position information in the frame of the decoding target block is input to the prediction generation section 605 from a controller (not illustrated) controlling the decoding processing in the video decoding device 600. The position of the decoding target block depends on the encoding order.

Then a prediction signal of the decoding target block is generated by the prediction generation section 605 as follows. First the template region determination section 201 sets a template region on a reproduced image adjacent to the block (S702 search step). Then the matching section 202 performs template matching for a reproduced image in a same or different frame from the encoding target block, and a region highly correlated to the reproduced signal of the template region is searched (S703 search step). Then the filling section 203 sets a region the same size as the encoding target block, which is adjacent to the high correlation region obtained by template matching in a predetermined positional relationship (right and below in the case of the example in FIG. 4) as a prediction signal (S704 prediction signal determination step). The prediction signal which is set is input to the addition section 603.

Then the inverse transformation section 602 performs inverse transformation on the transformation data which is input from the decoding section 601, and generates the difference signal (S705 reproduced image generation step). The series of processings in S702 to S704 and the processing in S705 can be in reverse sequence since all that is required is that these processings are performed before the processing in S706 or later, which will be described below.

Then the addition section 603 generates a sum signal by adding the difference signal, which is input from the inverse transformation section 602, and the prediction signal, which is input from the prediction generation section 605 (filling section 203), and generates a decoded block which is a reproduced signal (S706 reproduced image generation step). The generated decoded block is input to the storage section 604, and is stored in the storage section 604 at a predetermined address according to the decoding target frame of the frame memory (S707 storage step).

Then it is judged whether the above processings (S701 to S707) are completed in all the blocks of the frame image (S708). If completed and a reproduced frame image is complete, the reproduced frame image is output to such display means as a screen (not illustrated). The frame image may also be output to another display device. If unprocessed blocks remain, processing of the next block is started. The above judgment may be performed by one of the above composing elements, or may be performed by a means which is set for controlling the encoding processing in the video decoding device 600.

As described above, according to the video decoding device 600 of the present embodiment, the prediction signal is determined and the video is decoded, just like the video encoding device 100. In other words, according to the video decoding device 600 of the present embodiment, the video data effectively encoded by the video encoding device 100 can be correctly decoded to generate a reproduced image.

For the present embodiment, the following variant forms are possible. The following variant forms are variant forms of the video encoding device and video decoding device, but also can be implemented in the same manner for the video encoding processing and video decoding processing.

(1) Search Region

So far the target search region/range of the template matching is the reproduced region (403) of the encoding target frame and the reproduced image 404 of the reproduced frame, but either one may be selected in frame units. For example, if the search range is limited to the reproduced region 403, the present invention can also be applied to an intra-frame of which prediction target is only the reproduced signals in the frame. If the search range is limited to the reproduced image 404, computation amount at decoding an inter-frame including inter-frame prediction can be decreased. Providing a prediction mode, of which search target of template matching is the reproduced region 403 (intra-template matching prediction) and a prediction mode of which search target of template matching is the reproduced image 404 (inter-template matching prediction), then selecting one of the prediction modes in block units is also effective, since the computation amount at decoding can be decreased. In this case, as shown in the description in FIG. 5, the present invention can be combined with a plurality of prediction modes written in Non-patent Document 1. Making the search range within each image a small region which is preset is also effective since computation amount can be decreased.

(2) A Plurality of Frames

So far the number of reproduced frames to be a target of template matching is not specifically stated, but targeting a plurality of frames is effective to increase prediction performance. In this case, the reproduced image region within the encoding target frame may be included. Herein below, a reproduced image of a reproduced frame, which becomes a target of template matching, and a reproduced image region of an encoding target frame, are collectively called the "reference image of a reference frame". In this case, the reference image may be a high resolution image which includes not only integer pixels but also fractional pixels generated by filter processing. A method for generating fractional pixels is stated in Non-patent Document 1, for example. The reference frame number to be selected may be encoded in block units or frame units, or may be selected by such a value of evaluation criteria as SAD, without added information. If encoding is performed explicitly, an original signal of a prediction target region (in encoding target block) and a prediction signal of the prediction target region (in encoding target block) generated from reference images of a plurality of reference frames are compared, and one reference frame is selected.

Figure 18:
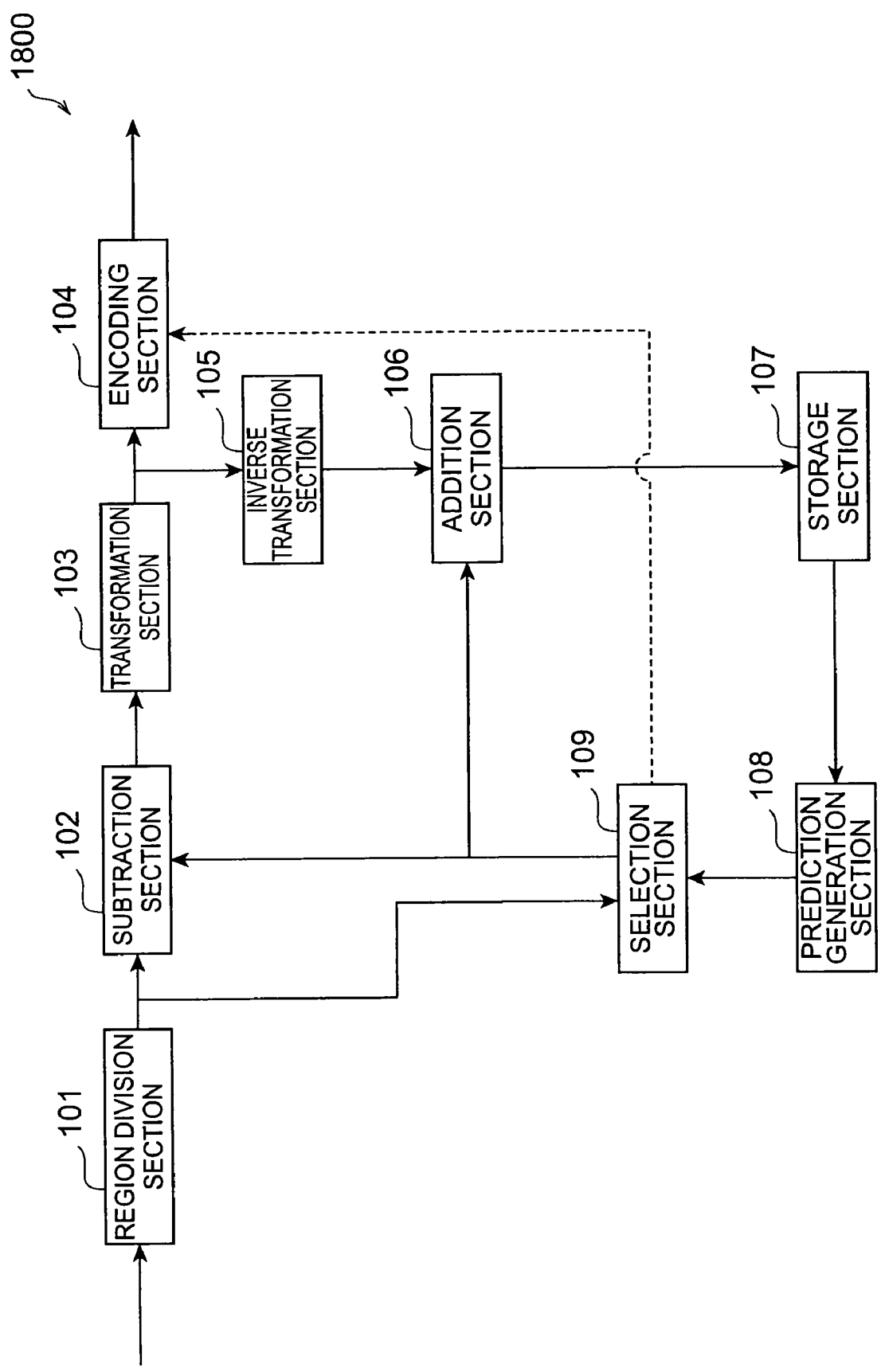
FIG. 18 is a diagram depicting a configuration of a variant form of the video encoding device according to the first embodiment.
Figure 19:
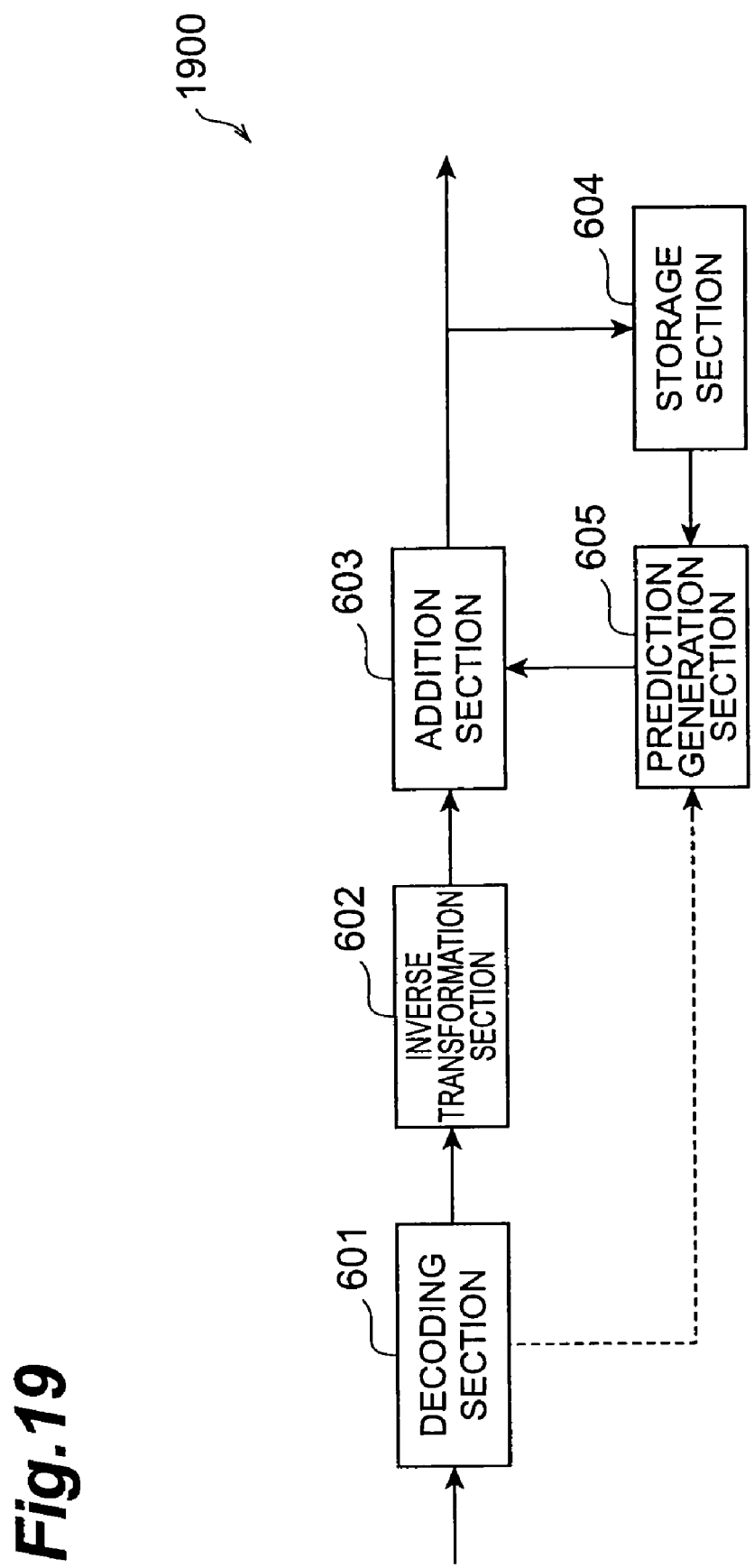
FIG. 19 is a diagram depicting a configuration of a variant form of the video decoding device according to the first embodiment.

This encoding processing can be implemented by adding a selection section 109 between the prediction generation section 108 and the subtraction section 102 in the video encoding device 100 in FIG. 1, as shown in FIG. 18. The selection section 109 calculates values of evaluation criteria (e.g. SAD, MSE) with the original signal of the encoding target block for prediction signals which the prediction generation section 108 generated targeting a plurality of reference frames, and selects a reference frame of which the value of evaluation criteria is smallest. The selected reference frame number is entropy-encoded by the encoding section 104. The present variant form can also be implemented by this configuration where processing of the selection section 109 is included in the prediction generation section 108, since the same processing result can be obtained. In the decoding processing, the prediction generation section 606 generates a prediction signal using the reference frame corresponding to the reference frame number decoded in the decoding section 601, as shown in FIG. 19.

Instead of selecting one reference frame and generating a prediction signal of the encoding target block (one frame selection processing), two reference frames may be selected so that prediction signals of the encoding target blocks, obtained from the selected reference frames, are averaged in pixel units, and a final prediction signal is calculated (averaging processing). In this case, selection candidates of the prediction signal of the encoding target block could be obtained from a same reference frame. If two prediction signals at one pixel (or ½ pixel or ¼ pixel) shifted from each other are selected from a same reference frame, the accuracy of a motion vector to be searched can be increased by interpolation processing. Smoothing processing, which has an effect of removing the noise components of prediction error signals, generally has good compatibility with transformation encoding.

In the case of selecting two reference frames, a final prediction signal of a prediction target region may be calculated by weighted averaging for each pixel (weight and averaging processing), instead of simple averaging. The weight coefficient could be a constant value within the block, or may be changed in pixel units. A method for setting a weight coefficient and an encoding method are not especially limited, but methods stated in Non-patent Document 1 can be applied.

Another method is selecting an odd number of reference frames and selecting a center value of prediction signals of the prediction target region in pixel units (center value prediction processing). Another method is selecting two center values of prediction signals of the prediction target region in pixel units from four or more even number of frames, and calculating the prediction value by averaging or weighted averaging. Such a prediction method using center values has an effect of decreasing the average prediction error.

Figure 20:
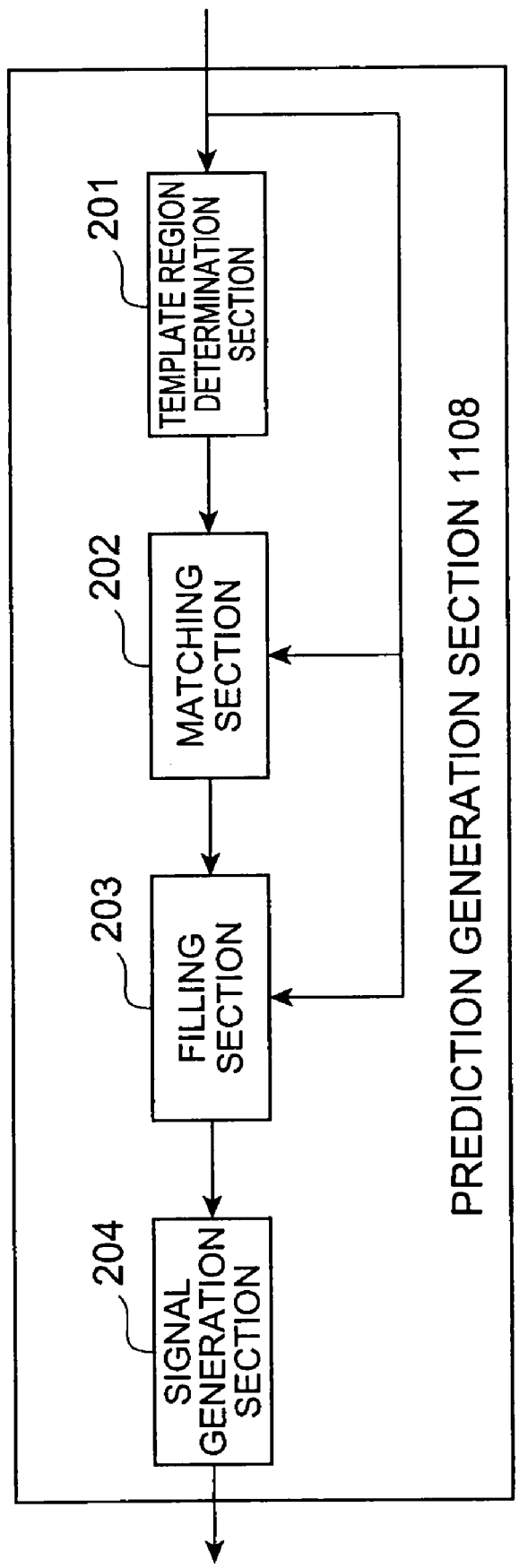
FIG. 20 is a diagram depicting a configuration of a variant form of the prediction generation section according to the first embodiment.

The averaging processing, weighted processing and center value prediction processing can be implemented by the prediction generation section 1108, where the signal generation section 204 is added to the prediction generation section 108 in FIG. 2, as shown in FIG. 20 (applicable to the prediction generation section 108 in FIG. 1 and prediction generation section 605 in FIG. 6). In the signal generation section 204, prediction signals of the prediction target regions generated by a plurality of frames are input, and a final prediction signal is generated using the above-mentioned processing method.

The processing of the signal generation section 204 can be implemented using information derived from a reproduced image or characteristic data (e.g. motion vector) belonging to the reproduced image (which is data on the reproduced image), so the same processing can be performed in the decoding side.

Another possible method is providing a plurality of processing methods, such as one frame selection processing, averaging processing weighted averaging processing and center value prediction processing, and selecting a processing method in block units or frame units. In the case of a prediction processing using a template comprised of decoding values, motion with which the value of evaluation criteria is optimum does not always minimize the prediction error signal. Therefore it is effective to select an appropriate method out of a plurality of processing methods where the characteristics of the prediction signals in the prediction target regions are different.

A possible method for selecting a processing method is the encoding side selecting a method to minimize the sum of a prediction error absolute values of a prediction target region (or sum of squares of the prediction errors) (selection section 109 in FIG. 18), and transferring it to the decoding side. This selection method can be implemented by replacing the prediction generation section 108 in FIG. 18 or the prediction generation section 606 in FIG. 19 with the prediction generation section 1108 in FIG. 20. The selection section 109 in FIG. 18 outputs the information on the selected processing method, instead of the selected reference frame number, to the encoding section 104. This method can also be implemented in a configuration where the processing of the selection section 109 is included in the prediction generation section 1108, since the result to be obtained is the same.

Another possible method is generating a prediction signal of the template region based on the respective processing method, and selecting a processing method automatically by calculating a value of evaluation criteria (e.g. SAD, MSE) with the generation signal of the template region. For example, in the case of averaging processing, a prediction signal is calculated by averaging two prediction signal candidates of the template region in pixel units, and a value of evaluation criteria is calculated between the calculated prediction signal and the reproduced signal of the template region. According to this method, a processing method can be uniquely determined using information derived from a reproduced image or characteristic data (e.g. motion vector) belonging to the reproduced data, so it is unnecessary to encode the information on the processing method.

Another possible method is setting four conditions depending on the combination of a variance value (TaV) of a signal in the template region and a variance value (EvV) of the values of evaluation criteria for a plurality of reference frames, and selecting the average processing if both TaV and EvV are smaller than a threshold, the weighted averaging processing if only TaV is smaller than a threshold, the center value prediction processing if only EvV is smaller than a threshold, and one frame selection processing if both TaV and EvV are greater than a threshold. In this case, the intensity of characteristics of the template region in the spatial direction is evaluated by the variance of the reproduced signals of the template region, and evaluates the intensity of characteristics of the template region in the time direction by variance of the values of evaluation criteria. According to this method, a processing method is selected based on the assumption that a difference of the plurality of candidates of prediction signals in the prediction target region is smaller, and the effect to remove noise of the prediction error signal by smoothing is higher as the variance value is smaller. Such an automatic selection method can be implemented by replacing the prediction generation section 108 in FIG. 18 with the prediction generation section 1108 in FIG. 20, and introducing the above-mentioned selection method to the selection section 109 in FIG. 18. In this selection method as well, a processing method can be uniquely determined using information derived from the reproduced image and characteristic data (e.g. variant value) belonging to the reproduced image, so it is not necessary to encode the information on the processing methods. Therefore output from the selection section 109 to the encoding section 104 can be omitted.

In the case of the above-mentioned selection method using the variance values, it is necessary to change the input to the selection section 109 from the original signal of the encoding target block to the reproduced signal of the template region, and to add the values of evaluation criteria of a plurality of reference frames to the input from the prediction generation section 1108 to the selection section 109. This method can also be implemented in the configuration where the processing of the selection section 109 is included in the prediction generation section 1108, since the result to be obtained is the same. The processing in the decoding side can be implemented by replacing the prediction generation section 605 in FIG. 6 with the combination of the prediction generation section 1108 in FIG. 20 and the selection section 109 in FIG. 18. The automatic selection method is not limited to the method stated here, but can be implemented if the method uses only the information derived from the reproduced image or the characteristic data belonging to the reproduced image.

(3) Configuration of Prediction Generation Section

The prediction generation section 108 is comprised of the template region determination section 201, matching section 202 and filling section 203, but the present invention is not limited to this configuration, but can be implemented in other ways. For example, if the reproduced signal of the template region is directly input from the reproduced signal of the encoding target frame according to a predetermined procedure, the template region determination section 201 is unnecessary. Or if the prediction signal of the prediction target region is simultaneously obtained when the prediction signal of the template region is obtained from the reference frame in the matching section 202, then the prediction signal can be generated without the filling section.

(4) Size of Encoding Target Block

In the present embodiment, the size of the encoding target block is 8 pixels×8 pixels, but since the present invention can be implemented by another block size, the size of the encoding target block is not limited to this size. The size of the template region is also not limited to the size stated in this embodiment. For example, instead of 8 pixels×8 pixels, various sizes can be used, such as 12 pixels×12 pixels, combining the template region and the prediction target region, or 10 pixels×10 pixels, using the size of a template region half the above size. It is also effective to change the size of the encoding target block and the size of the template region in block units or in frame units. Providing sets of the encoding target block and the template region, in different sizes, is also effective to support different patterns in the image, as shown in Non-patent Document 1. In terms of intra-template matching prediction and inter-template matching prediction, improvement of the prediction efficiency can be expected if the block size of intra-template matching, of which redundancy of the template region and search range is generally low, is decreased.

The prediction according to the present invention can also be implemented using different block sizes for the prediction target block and encoding target block.

(5) Reproduced Signal of Template Region

So far the reproduced signal of the template region is comprised of the reproduced pixel of the encoding target frame, but other reproduced pixels on the reference frame, which are known to the decoding side, can also be used. For example, consider the case of dividing an 8 pixels×8 pixels block of a prediction target region into 4 pixels×4 pixels blocks, and a prediction signal is generated in 4×4 block units. If a region combining the template region and the prediction target region is a 6 pixels×6 pixels block, the 4×4 block of the template region at the upper left of the 8×8 block can be comprised of the reproduced pixels of the encoding target frame. But in the 4×4 block of the template region at the upper right of the 8×8 block, the 6 pixels×2 pixels in the upper side of the block can be comprised of the reproduced pixels of the encoding target frame, but 2×2 pixels at the left side of the block, which are not encoded, are substituted by the 4×4 block prediction signal at the upper left. In the same way, in the case of the 4×4 block at the lower left of the 8×8 block, the 2×2 pixels in the upper side of the block and the 4×4 block at the lower right, where reproduced pixels of the encoding target frame are not encoded for all the pixels of the template region, are substituted with the prediction signals. Also so far the reproduced signal of the template region is constructed by obtaining the reproduced pixels of a block adjacent to the encoding target block, but the reproduced signal of the template region may be generated by using a filter to remove noise for the reproduced signal. For example, if an image has considerable noise, motion detection not affected by noise can be implemented by performing filter processing on the reproduced signal of the template region and reference image.

(6) Value of Evaluation Criteria

So far the value of evaluation criteria for generating the prediction signal in the target region by template matching is a sum of the absolute differences (SAD) between the prediction signal in the template region and the target signal or a mean square error (MSE), but it is not limited to this. For example, a value, considering the size of the difference motion vector, can also be applied to the value of evaluation criteria of the present invention, as stated in T. Weigand et al, "Rate-Constrained Coder Control and Comparison of Video Coding Standards", IEEE Trans. Circuits and Systems for Video Technology, Vol. 13, No. 7, July 2003, pp. 688-703 (Non-patent Document 2).

It is also effective to weigh the absolute difference value or square error of each pixel. For example, if SAD is an evaluation value, a method of assigning a weight such as 4 to the absolute difference value of the pixels at the boundary of the template region and the prediction region and decreasing a weight such as 3, 2, 1 as moving away from the boundary is possible. By assigning priority to the pixels closer to the boundary in this way, an improvement of the prediction performance can be expected.

(7) Configuration of Inverse Transformation Section

In FIG. 1, input of the inverse transformation section 105 is output from the transformation section 103, but may be output from the encoding section 104. In this case, the processing of the decoding section 601 in FIG. 6 is performed before the processing of the inverse transformation section 105. The present invention can also be implemented by integrating the processings of the video encoding device and the video decoding device. In other words, a configuration where the output of the encoding section 104 is processed by the decoding section 601 in FIG. 6 and the decoded image is input to the storage section 107 is also possible.

Second Embodiment

The device configurations of a video encoding device and a video decoding device according to the second embodiment are the same as the device configurations according to the first embodiment, except for the configuration of the prediction generation section. The differences of the prediction generation section of the present embodiment and the prediction generation section 108, 605 of the first embodiment will now be described.

Figure 8:
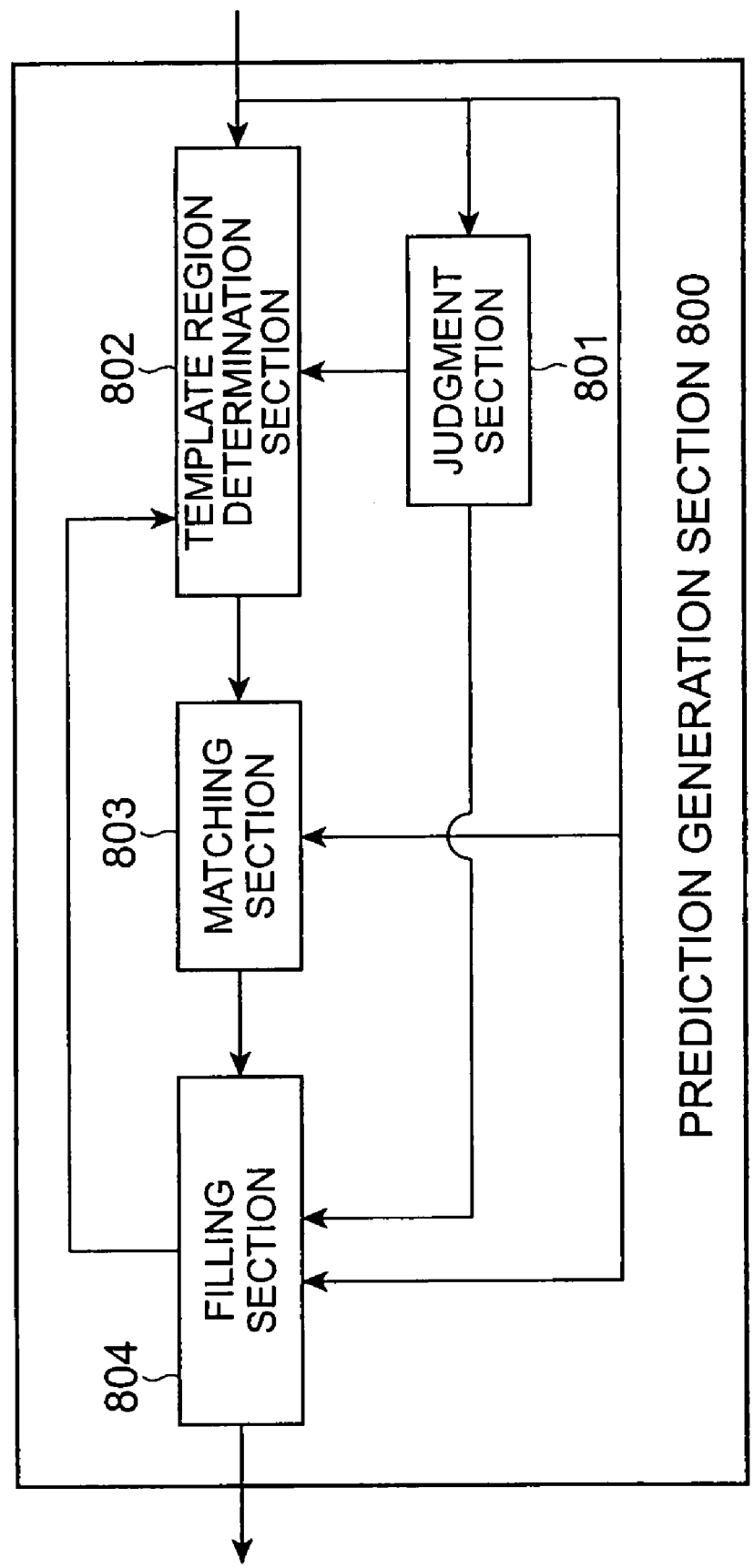
FIG. 8 is a diagram depicting a configuration of a prediction generation section according to the second embodiment.

As FIG. 8 shows, the prediction generation section 800 of the present embodiment is comprised of a judgment section 801, template region determination section 802, matching section 803 and filling section 804.

The judgment section 801 is estimation means for comparing a reproduced signal of a template region and a reproduced image stored in the storage section 107, 604, and estimating the spatial continuity of a signal of a region to be a target of encoding or decoding (prediction target block based on the compression result). The spatial continuity is an index to indicate the matching degree of motion characteristics, such as direction and size, in a space. In other words, if the characteristics of motion differ between the top half and bottom half of a region, then there is no spatial continuity. The judgment section 801 is also setting means for dividing a target region of encoding or decoding based on the estimated spatial continuity of the image, and setting this region obtained by division as a new encoding or decoding target region (prediction target region, filling region), and also setting a template region for this new encoding or decoding region. The judgment section 801 analyzes the reproduced image stored in storage section 107, 604, determines prediction parameters including the size of the template region and size of the prediction target region, and outputs this information to the template region determination section 802 and filling section 804. A concrete method for determining the prediction parameters will be described later.

The template region determination section 802 is a composing element of search means for setting the template region to be used for generating a prediction signal and image of this region based on the information on the size of the template region which is input from the judgment section 801. The template region determination section 802 corresponds to the template region determination section 201 according to the first embodiment, and has similar functions.

The matching section 803 is search means for performing template matching in the reproduced image stored in the storage section 107, 604 as a search region, using an image of the template region which is set by the template region determination section 802, and searching a region of which correlation to the pixel group of the template region is highest in the search region. The matching section 803 corresponds to the matching section 202 in the first embodiment, and has similar functions.

The filling section 804 is prediction signal determination means for setting and determining a prediction signal having the same size as the prediction target block, from the reproduced image, based on the region (high correlation region) searched by the matching section 803, and the positional relationship between the prediction target block and the template region. The size of the prediction target block in this case is one that was set by the judgment section 801. The filling section 804 corresponds to the filling section 203 according to the first embodiment, and has similar functions.

Figure 15:
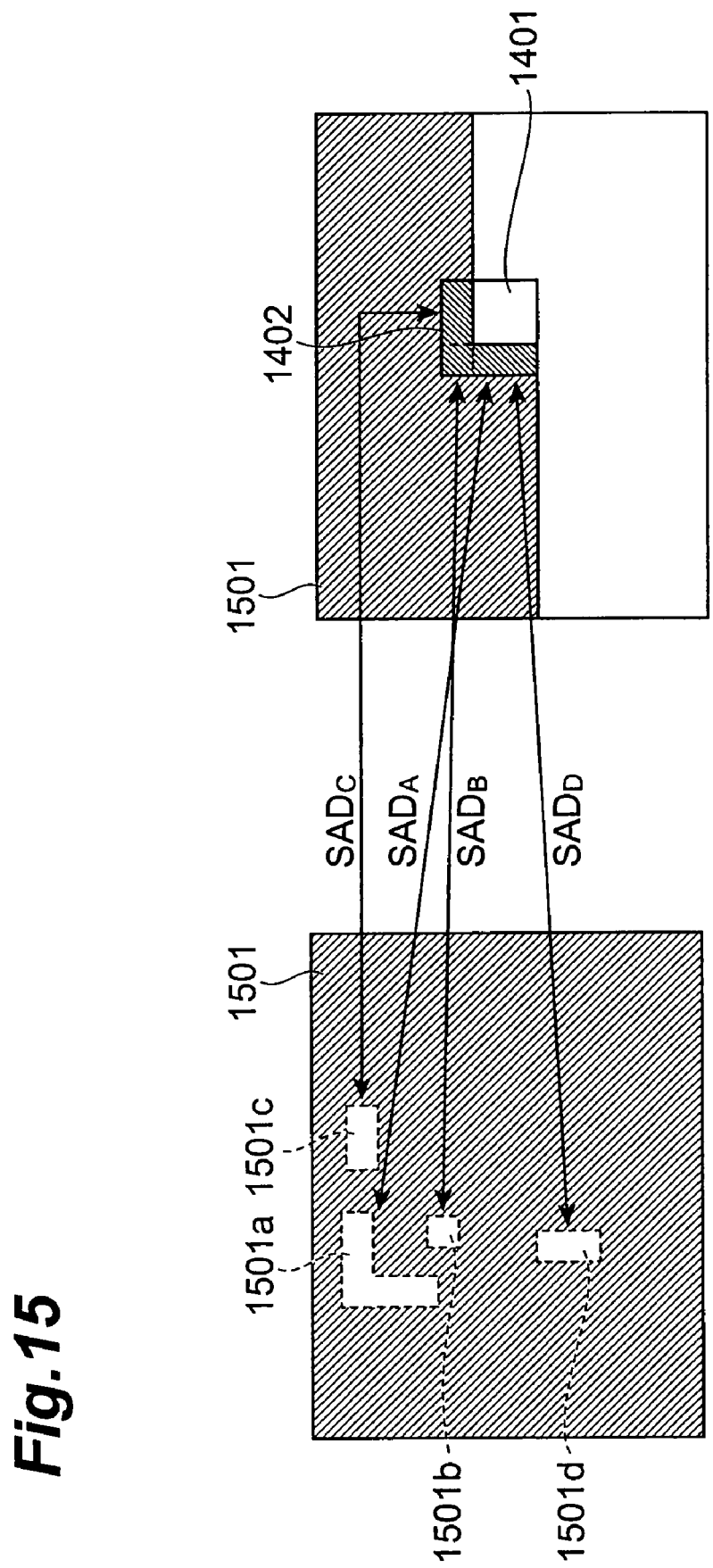
FIG. 15 are diagrams depicting a function of a judgment section in the second embodiment.

Now how to determine the size of the template region and the size of the prediction target region in the judgment section 801 will be described with reference to FIG. 14 and FIG. 15. To determine the size of the template region and the size of the prediction target region, reproduced pixels adjacent to the prediction target block are used. FIG. 14 shows the pixels of the prediction target block 1401 and reproduced pixels 1402 in the adjacent region. As (a) and (b) of FIG. 14 show, four regions: region A which covers an entire region 1402 adjacent to the prediction target block 1401, and regions B, C and D which divide the region 1402 and cover a part of the region 1402 respectively (regions B, C and D do not overlap with each other, and become the region 1402 if all combined) are prepared.

Then template matching is performed for a reproduced image stored in the storage section, where the template regions are the regions A, B, C and D, and a highly correlated region is determined respectively. In this case, SAD, for example, is used as the correlation value. An SAD for each region A, B, C and D is assumed to be $SAD_A$, $SAD_B$, $SAD_C$ and $SAD_D$, and $SAD_A$ and ($SAD_B+SAD_C+SAD_D$) are compared. If $SAD_A$ is much greater, it is estimated that there is no spatial continuity in region A, and there is no spatial continuity in prediction target 1401 either. In other words, as FIG. 15 shows, it is estimated that a region 1501a, which is highly correlated to region A, and regions 1501b, 1501c and 1501d, which are highly correlated to regions B, C and D, independently exist in the reproduced image region 1501. Based on this estimation, it is judged that prediction does not work well in the template matching in space A (dissociation of the determined prediction signal and encoding or decoding target image is high). Judgment that $SAD_A$ is much greater than $SAD_B+SAD_C+SAD_D$ can be performed by setting a threshold in advance. Once this judgment is performed, the size of the template region and the size of the prediction target region are set to be smaller than the block by further dividing the block. The size of the prediction target region in this case can be a size according to the division of regions B, C and D. The size of the template is a size according to the size of the prediction target region.

If the difference between $SAD_A$ and ($SAD_B+SAD_C+SAD_D$) is small, it is estimated that there is spatial continuity in region A, and there is a also spatial continuity in prediction target block 1401. Based on this estimation, it is judged that template matching by region A is effective, and the block size is used for the prediction target region (it is assumed that the prediction region is a region where a block is not divided). Regions dividing the region 1402 adjacent to the prediction target block 1401, which is used for the above judgment, are not only such patterns as regions B, C and D shown in (b) of FIG. 14, but may be further divided regions as shown in (c) of FIG. 14.

In the case of the prediction based on template matching, as in the case of the present invention, accurate prediction cannot be performed, unlike prediction based on a motion vector. Therefore a prediction error must be avoided as much as possible. A prediction error easily occurs when the size of the template region is small. In a portion where motion is fine and spatial continuity does not exist, on the other hand, fine movement cannot be handled and prediction errors increase. Hence it is effective to improve probably in matching fine movement by decreasing the size of the template region and the size of the prediction target region, as shown in the method of the present invention.

Figure 9:
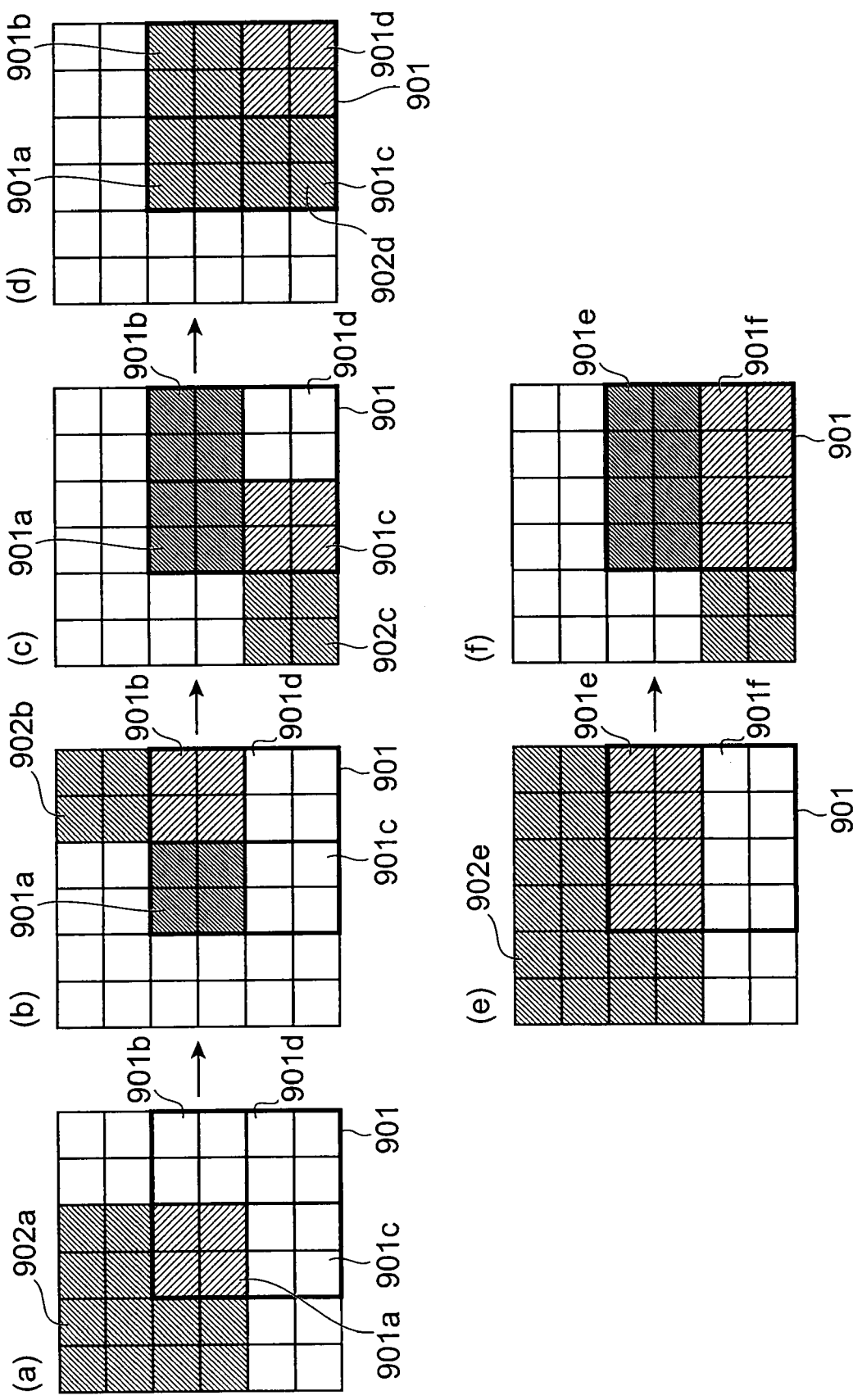
FIG. 9 are diagrams depicting a divided prediction target in the second embodiment.

The transition of a prediction when the size of the template region and the size of the prediction target region are changed will be described with reference to FIG. 9. If a spatial continuity exists in a region adjacent to a prediction target block 901, and the size of a prediction target region is an entire region of the prediction target block 901, processing is performed by one time template matching, just like the first embodiment. For example, the case when the prediction target block 901 is divided into four regions: regions 901a, 901b, 901c and 901d, to decrease the size of the prediction target region, and the size of the template region is also decreased, as shown in FIG. 9, will be described. It is assumed that the regions at the left and upper side of the prediction target block 901 are reproduced image regions.

First as (a) of FIG. 9 shows, the region at the left and upper side of 902a of the upper left region 901a of the prediction target block 901 is set to a template region, and a prediction signal is set by template matching. Then as (b) of FIG. 9 shows, the upper region 902b of the right region 901b of the region 901a is set to a template region, and a prediction signal is set by template matching. Then as (c) of FIG. 9 shows, the left region 902c of the lower region 901c of the region 901a, for which the prediction signal is set first, is set to a template region, and a prediction signal is set by template matching. Then as (d) of FIG. 9 shows, the region at the left and upper side 902d of the remaining region, which is the lower right region 901d, including regions 901a, 901b and 901c, is set to a template region, and a prediction signal is set by template matching, using the prediction signal as a target signal of the template region. By this, a prediction signal is set for all the regions of the prediction target block 901, and encoding and decoding become possible.

To change the size of the template region and the size of the prediction target region, the region may be divided only one of vertical or horizontal directions as shown in (e) and (f) of FIG. 9, instead of in both vertical and horizontal directions as shown in (a) to (d) of FIG. 9. For example, if the high correlation regions of regions B, C, D and E are included in the high correlation region in region A and only the high correlation region in region F is not included in (b) of FIG. 14, it is better to divide in the vertical direction, as shown in (e) and (f) of FIG. 9. This is because it can be judged that spatial continuity is discontinued between the upper half and the lower half of the prediction target block. In this case, as (e) of FIG. 9 shows, the regions at the left and upper side 902e of the upper half region 901e of the prediction target block 901 are set to a template region, and a prediction signal is set by template matching. Then as (f) of FIG. 9 shows, the left region 902f of the lower region 901f of the region 901e is set to a template region, and a prediction signal is set by template matching. By this, a prediction signal is set for all the regions of the prediction target block 901, and encoding and decoding become possible.

Figure 10:
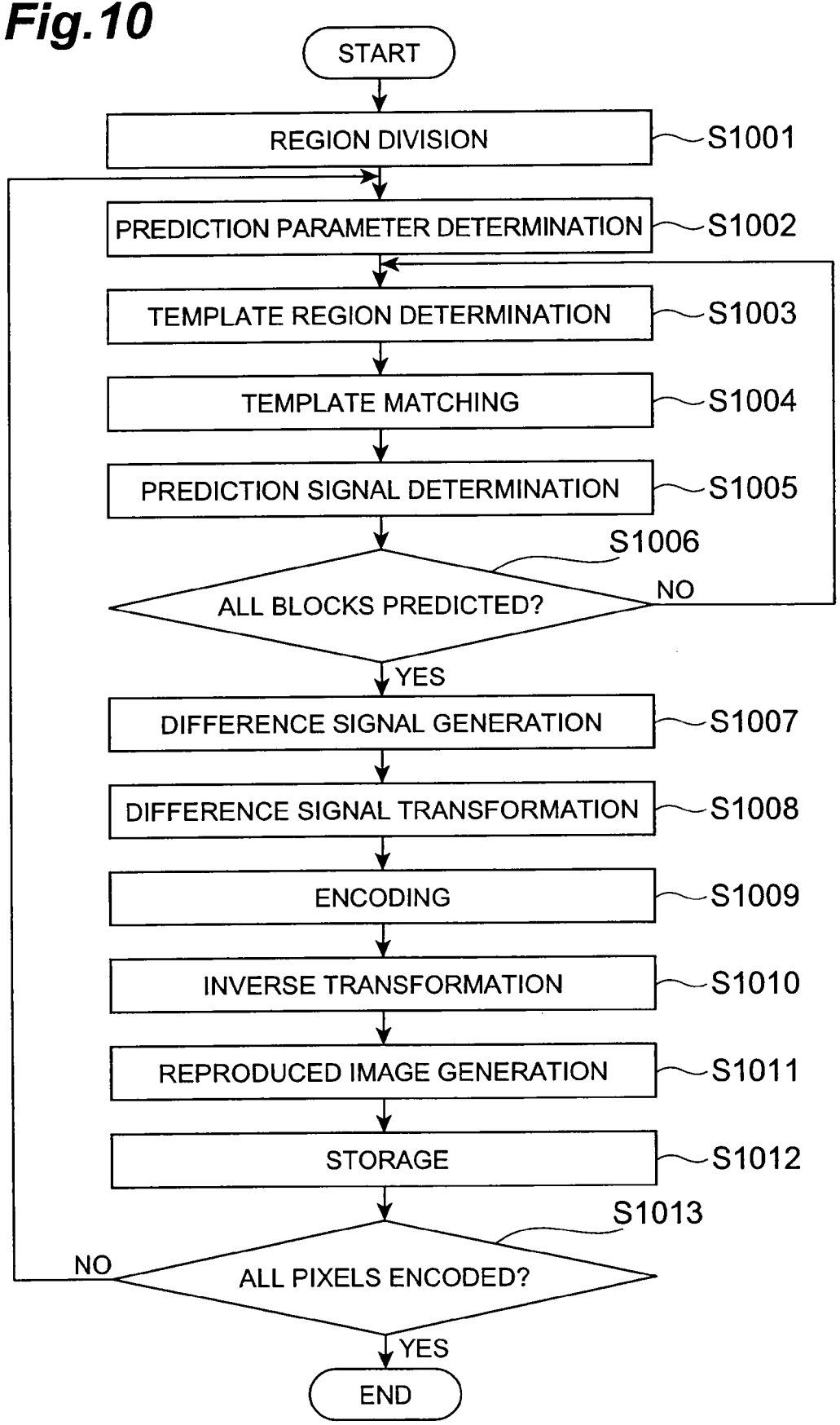
FIG. 10 is a flow chart depicting a processing executed in the video encoding device according to the second embodiment.

Now the encoding processing (video encoding method) in the video encoding device of the present embodiment will be described with reference to the flow chart in FIG. 10.

When encoding target video data is input to the video encoding device, each frame image constituting the video is input to the region division section 101. The frame image which was input is divided into a plurality of predetermined size blocks by the region division section 101 (S1001). Processings after this are all performed in block units. A block is input to the prediction generation section 800 and the subtraction section 102 as an image of the encoding target region.

Then a prediction signal of the encoding target block is generated by the prediction generation section 800 as follows. First, as mentioned above, the judgment section 801 determines a prediction parameter to be used for the encoding target block, using reproduced pixels adjacent to the encoding target block (S1002 estimation step and judgment step). The determined prediction parameter is input to the template region determination section 802. Based on the prediction parameter which was set, the template region determination section 802 sets an encoding target region, and sets a reproduced pixel group adjacent to this region on the reproduced pixel region (template region) as a template (S1003). In some cases, the encoding target region, which is set here, may be one resulting when the encoding target block is divided, as mentioned above. Then the matching section 803 performs template matching for a reproduced image in a same or different frame from the encoding target block, and a region highly correlated to the pixel group of the template region is searched (S1004). Then the filling section 804 sets a region the same size as the encoding target region, which is adjacent to the high correlation region obtained by template matching in a predetermined positional relationship, as a prediction signal (S1005).

Then it is judged whether a prediction signal is set for all the regions of the encoding target block (S1006). If a prediction signal is not set for all the regions, a series of processings in S1003 to S1005 is repeated until a prediction signal is set for all the regions of the encoding target block. The above judgment may be performed by one of the above composing elements, or may be performed by a means which is for controlling the encoding processing in the video encoding device.

Processings after this (S1007 to S1013) are the same as the corresponding processings (S505 to S511) of the first embodiment.

As described above, according to the video encoding device of the present embodiment, inter-frame prediction can be performed without using a motion vector, by using an encoded reproduced image when inter-frame prediction is performed, and therefore efficient encoding is enabled in the same manner as in the first embodiment. Since it is possible to select a size of the region of the prediction signal based on the spatial continuity of the reproduced signal, encoding efficiency improves even for encoding video data in which the change of the motion amount is major.

Figure 11:
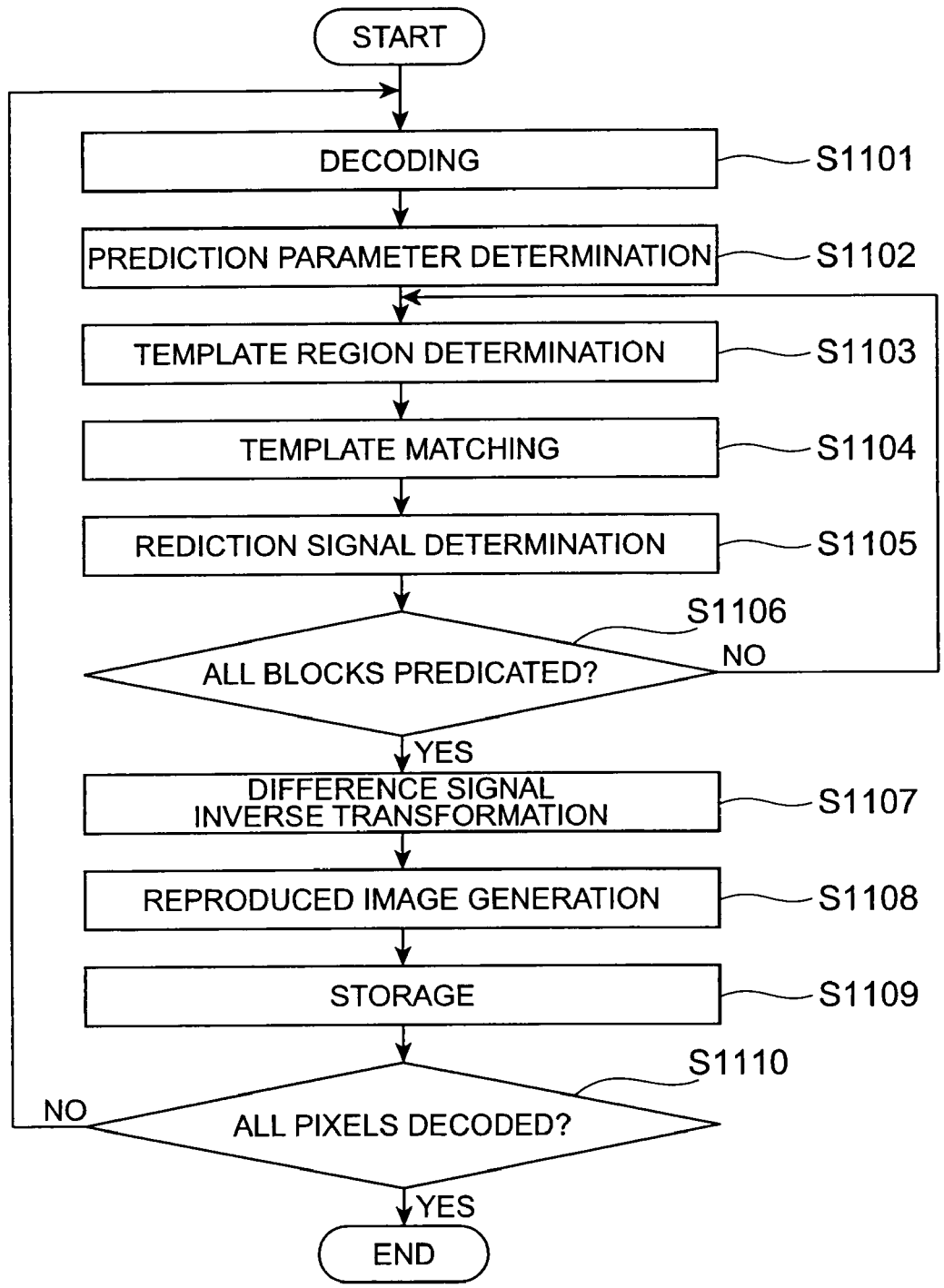
FIG. 11 is a flow chart depicting a processing executed in the video decoding device according to the second embodiment.

Now the decoding processing (video decoding method) in the video decoding device of the present embodiment will be described with reference to the flow chart in FIG. 11. It is assumed that the compressed encoding data to be decoded by the video decoding device of the present embodiment has been encoded by the video encoding device of the present embodiment.

When a decoding target compressed encoding data is input to the video decoding device, decoding is performed by the decoding section 601 (S1101). After decoding, transformation data is output in block units. This transformation data is input to the inverse transformation section 602 by the decoding section 601. The position information in the frame of the decoding target block is input to the prediction generation section 800 by the decoding section 601. The position of the decoding target block depends on the encoding order.

Then a prediction signal of the decoding target block is generated by the prediction generation section 800 as follows. First the judgment section 801 determines a prediction parameter to be used for the decoding target block, using a reproduced image adjacent to the decoding target block, as described above (S1102 estimation step and judgment step). The determined prediction parameter is input to the template region determination section 802. Based on the prediction parameter which was set, the template region determination section 802 sets a decoding target region, and sets a reproduced pixel group adjacent to this region as a template (S1103). In some cases, the decoding target region, which is set here, may be one resulting when the decoding target block is divided, as mentioned above. Then the matching section 803 performs template matching for a reproduced image in a same or different frame from the encoding target block, and a region highly correlated to the pixel group of the template region is searched (S1104). Then the filling section 804 sets a region the same size as the decoding target region, which is adjacent to the high correlation region obtained by the template matching in a predetermined positional relationship, as a prediction signal (S1105).

Then it is judged whether a prediction signal is set for all the regions of the decoding target block (S1106). If a prediction signal is not set for all the regions, a series of processings in S1103 to S1105 is repeated until a prediction signal is set for all the regions of the decoding target block. The above judgment may be performed by one of the above composing elements, or may be performed by a means which is for controlling the decoding processing in the video decoding device.

The processings after this (S1107 to S1110) are the same as the corresponding processings (S705 to S708) of the first embodiment. The series of processings in S1102 to S1106 and the processing in S1107 can be in reverse sequence since all that is required is that these processings are performed before the processings in S1108 or later, just like the case of the first embodiment.

As described above, according to the video decoding device of the present embodiment, a prediction signal is determined and the video can be decoded in the same way as the video encoding device of the present embodiment. In other words, according to the video decoding device of the present embodiment, the video data efficiently encoded by the video encoding device of the present embodiment can be correctly decoded, and a reproducing image can be generated.

For the present embodiment, the following variant forms are possible. The following variant forms are on the video encoding device and video decoding device, but can also be implemented for the video encoding processing and video decoding processing.

(1) Separation of Template Region and Prediction Target Region

In the above description, the judgment section 801 in FIG. 8 simultaneously determines the size and shape of the prediction target region and the template region, but the size and shape of one region may be fixed. Therefore the present invention can be applied to a case when the size and shape of the prediction target region are fixed, and the size or shape of the template region is adaptively switched. In this case, the output from the judgment section 801 to the filling section 804 is unnecessary. For example, in FIG. 14, it is possible to select a template for the prediction target region 1401 from region A, region B, region C and region D indicated in (a) and (b) of FIG. 14. The template for the prediction target region 1401 preferably has a continuity of pattern with the prediction target region 1401, and the number of pixels constituting the continuous pattern is as many as possible. Therefore region A is normally desirable, but if the pattern is not continuous in a certain direction, a small size template should be used. The judgment processing in the judgment section 801 is not limited to the above method. A possible method, for example, is comparing the prediction signal of the template region by template matching with a prediction signal of its region when its template region were actually encoded, and selecting a shape and size of the template of which averaged absolute difference is small. Instead of the prediction signal of template region by template matching at encoding, reproduced signal the prediction signal of the template region may be reproduced again using a reproduced signal of the encoding target block to which the template region belongs. Another possible method is selecting a shape and size of the template of which averaged absolute difference of the prediction signal of the template region and target signal (reproduced signal) is small.

A method of securing continuity of motion, rather than of pattern, is also effective. For example, a difference of a motion vector when region A is detected as a template region and a motion vector of an adjacent block or a predicted motion vector calculated from an adjacent block is calculated. And if the motion vector difference is smaller than a predetermined threshold, the detected motion vector is regarded as the motion vector of the prediction region. If the motion vector difference is greater than a predetermined threshold, a motion vector is detected for a different template shape (e.g. regions B, C and D in (b) of FIG. 14 or regions B, D and F in (c) of FIG. 14). And for each template region, the motion vector, when the pixels in the region were encoded, and the detected motion vector are compared, and a motion vector of which difference is small is selected as a motion vector of the predicted target region. Instead of the motion vector when the pixels in the region were encoded, the reproduced signal of the encoding target block, to which this region belongs, may be used to detect the motion vector again. Any of these methods can be implemented using a reproduced signal (information on the reproduced signal) or information derived from characteristic data (e.g. motion vector) belonging to the reproduced signal. It is also possible to compare the sizes of the motion vectors detected with a plurality of template shapes, and determine the shape of the template and size of the prediction region. It is also possible to compare the sizes of the motion vectors of adjacent blocks, and determine the shape of the template and size of the prediction region.

The shape and size of the template to be a candidate are not limited to those generated by the division of the template as shown in FIG. 14. For example, in the case of 8 pixels×8 pixels, selecting a size when the template region and the prediction target region are combined from 12 pixels×12 pixels, 10 pixels×10 pixels and 14 pixels×14 pixels, is included in the present variant form.

(2) Determining Sizes of Template Region and Prediction Target Region

In the above description, the judgment section 801 in FIG. 8 determines the sizes and shapes of the template region and the prediction target region, but information on the optimum sizes and shapes which is decided using the original signal of the prediction target region (encoding target block) may be encoded. This determination method can be implemented, for example, by outputting prediction signals of the prediction target regions which the prediction generation section 108 generated using a plurality of types of templates, selecting a size and shape of the template which makes the value of evaluation criteria (e.g. SAD, MSE) the minimum by the selection section, and entropy-encoding this information by the encoding section 104 as shown in FIG. 18. The determination method can also be implemented by a configuration where the processing of the selection section 109 is included in the prediction generation section 108.

In some cases, a target signal of a template region may not exist depending on the position of the prediction target region. In this case, a template is generated using only existing target signals. For example, the region C shown in (b) of FIG. 14 becomes a template region at the left end of the image, and the region D becomes a template region at the top end of the image.

Third Embodiment

In the case of motion prediction of the present invention which uses a template comprised of a reproduced signal, a motion with which the value of evaluation criteria of the difference signal between a target signal and a prediction signal of a template region, becomes the minimum, is detected in a search range. Therefore if the target signal (source) of the template region has distinct characteristics, appropriate motion prediction can be performed based on these characteristics. However, if a distinct characteristic does not appear in the target signal of the template region, such as the case of a flat region, then the possibility to detect a motion which is different from an actual motion becomes higher, even if the value of evaluation criteria is the minimum. In this case, as the difference between the prediction signal and the target signal in the prediction target region increases, the amount of coding bits thereof also increases. On the other hand, in a flat region which has no distinct characteristics, a signal has less high frequency components, and the spatial similarity between a signal and the lower resolution or decimated version of said signal is high. Hence even if the resolution of the target signal of the prediction target region is reduced (or the target signal of the prediction target region is decimated), the reduced signal which is the decimated version of said target signal is encoded, and at the decoding side the decoded reduced signal is enlarged to the original resolution by a simple method, degradation from the original signal can be suppressed. Therefore in the present embodiment, a difference encoding method appropriate for a flat region is shown, where the resolutions of the target signal and the prediction signal of the prediction target region are reduced, and the low resolution difference signal is encoded (method for reducing the encoding target block and prediction block, and encoding the reduced difference block).

In the present embodiment, a block comprised of the prediction signal is referred to as a prediction block, and a block comprised of a difference signal is referred to as a difference block, and a block comprised of a reproduced signal is referred to as a decoded block for convenience. The encoding target block refers to a block comprised of an original signal of an encoding target frame of video data.

Figure 21:
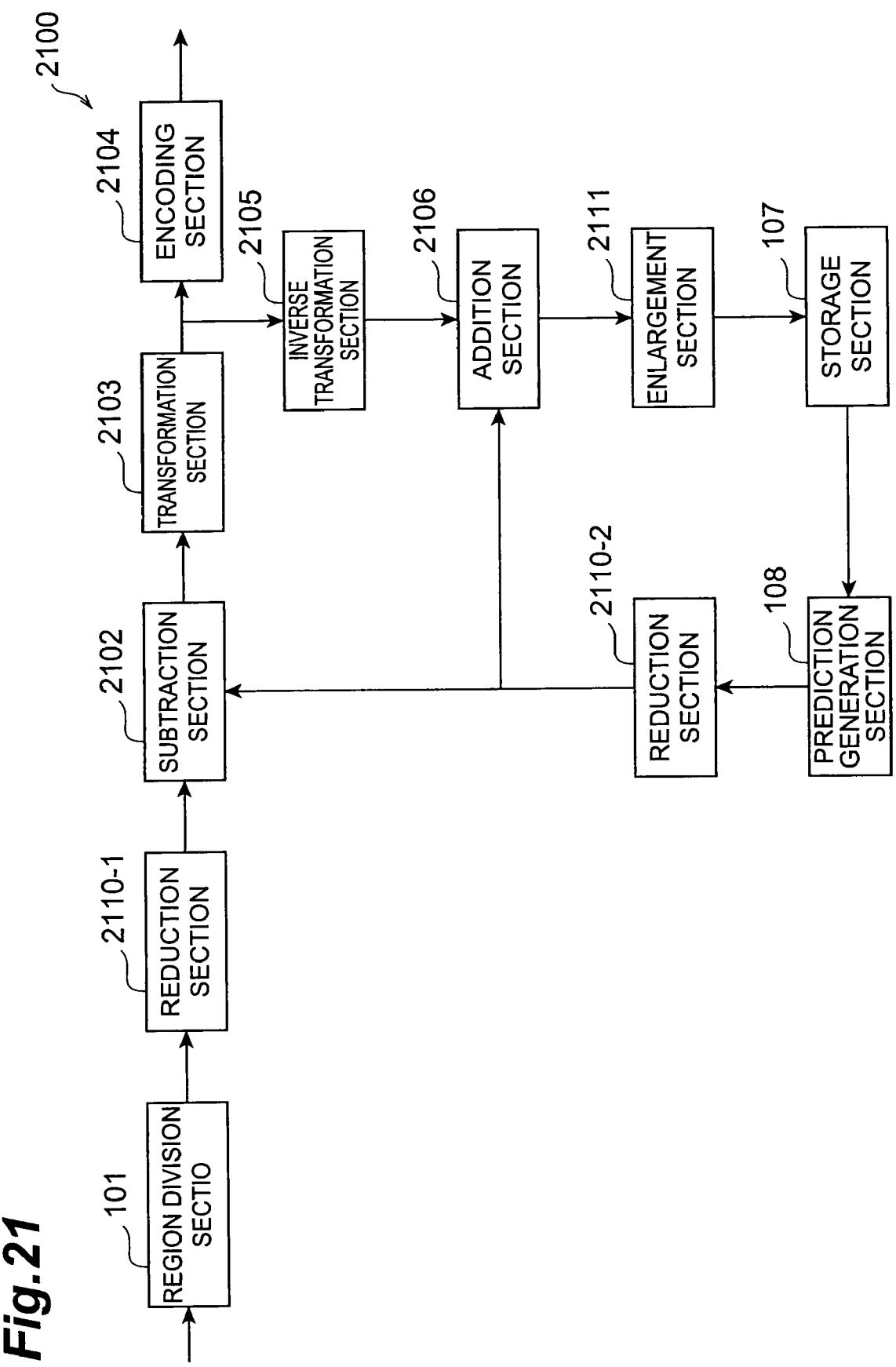
FIG. 21 is a diagram depicting a configuration of a video encoding device according to the third embodiment of the present invention.

FIG. 21 shows a video encoding device 2100 according to the third embodiment. The video encoding device 2100 can be implemented by installing a reduction section 2110 (generic term of reduction section 2110-1 and reduction section 2110-2), and an enlargement section 2111 in the video encoding device 100 in FIG. 1. The functions of a subtraction section 2102, transformation section 2103, encoding section 2104, inverse transformation section 2105 and addition section 2106 are the same as the functions of the subtraction section 102, transformation section 103, encoding section 104, inverse transformation section 105 and addition section 106 in FIG. 1 respectively, only a block size to be handled is smaller (e.g. 4 pixels×4 pixels). For the transformation section 2103 and inverse transformation section 2015, however, the transformation section 103 and inverse transformation section 105 in FIG. 1 can also be handled blocks in 4 pixel×4 pixel units, as shown in Non-patent Document 1. In this case, the difference of the transformation section 103 and inverse transformation section 105 in FIG. 1 and the transformation section 2103 and inverse transformation section 2105 in FIG. 21 is that the number of blocks to be processed decreases from 4 to 1.

The reduction section 2110-1 and reduction section 2110-2 reduce the resolution of an encoding target block obtained from a region division section 101 and the resolution of a prediction block obtained from a prediction generation section 108 into a reduced encoding target block and a reduced prediction block respectively and output them to the subtraction section 2102. The subtraction section 2102 calculates the difference of the two reduced blocks in pixel units, and outputs the reduced difference block to the transformation section 2103. The transformation section 2103 performs transformation (and quantization) processing, and the transformation data (quantization data) is encoded by the encoding section 2104. At the same time, the inverse transformation section performs (inverse quantization and) inverse transformation processing on the transformation data (quantization data), and outputs a decoded reduced difference block to the addition section 2106. The addition section 2106 adds the decoded reduced difference block and reduced prediction block in pixel units, and generates a decoded reduced block. The enlargement section 2111 enlarges the decoded reduced block into a decoded block the same size as the encoding target block, and outputs the result to a storage section 107. The processings of the reduction section 2110 and the enlargement section 2111 will be described later with reference to FIG. 23.

Figure 22:
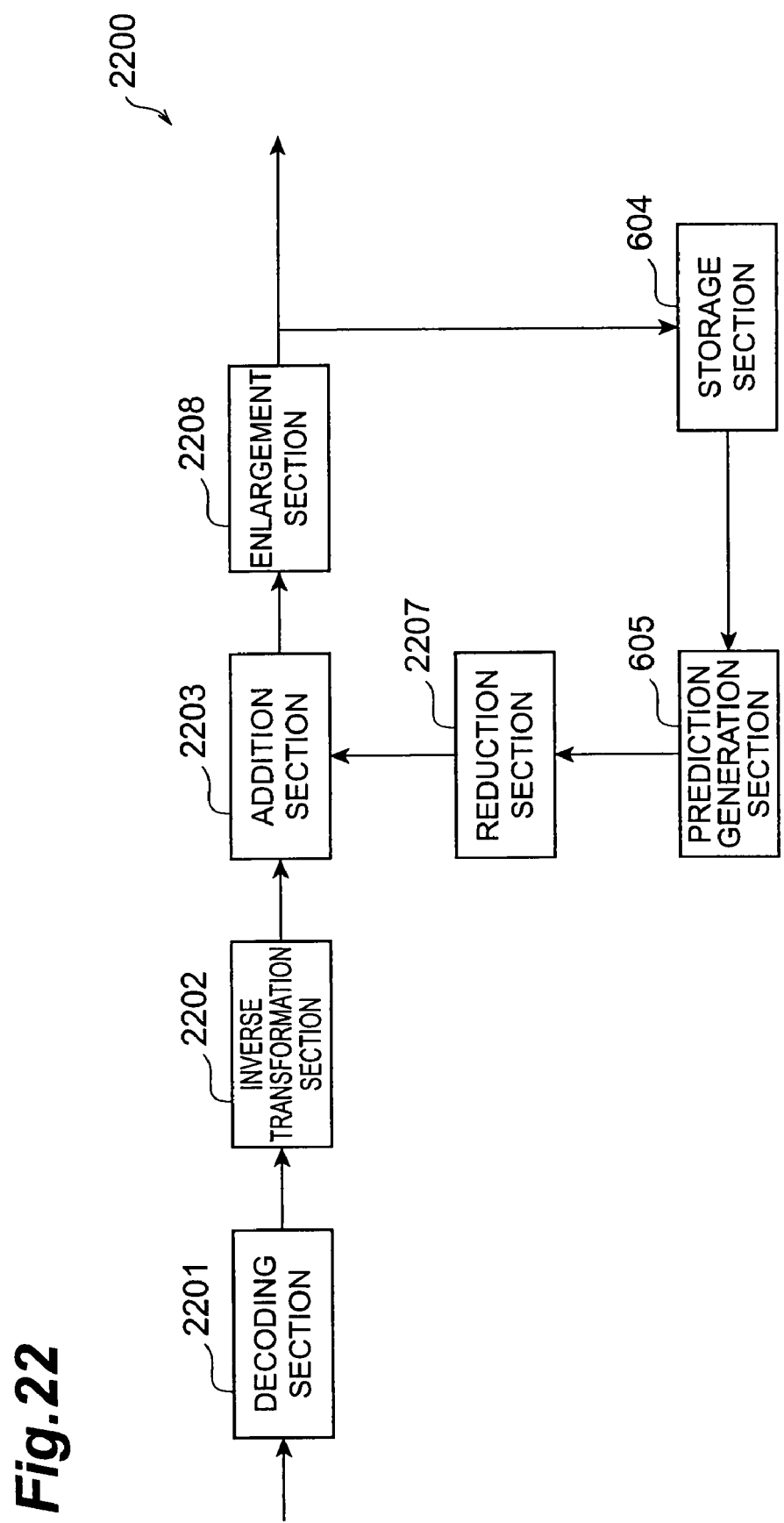
FIG. 22 is a diagram depicting a configuration of a video decoding device according to the third embodiment of the present invention.

FIG. 22 shows a video decoding device 2200 according to the third embodiment. The video decoding device 2200 can be implemented by installing a reduction section 2207 and an enlargement section 2208 in the video decoding device 600 in FIG. 6. The processing of the reduction section 2207 and the enlargement section 2208 have the same functions as the reduction section 2110 and the enlargement section 2111 in FIG. 21 respectively. The functions of a decoding section 2201, inverse transformation section 2202 and addition section 2203 are the same as the functions of the decoding section 601, inverse transformation section 602 and addition section 603 in FIG. 6 respectively, only a block size to be handled is smaller (e.g. 4 pixels×4 pixels). For the inverse transformation section, however, the inverse transformation section 602 in FIG. 6 can also handle blocks in 4 pixel×4 pixel units, as shown in Non-patent Document 1, just like the encoding device in FIG. 1. In this case, the difference of the inverse transformation section 602 in FIG. 6 and the inverse transformation section 2202 in FIG. 22 is that the number of blocks to be processed decreases from 4 to 1.

The reduction section 2207 reduces a prediction block obtained from a prediction generation section 605 to a reduced prediction block, and outputs it to the addition section 2203. The addition section 2203 adds the decoded reduced block decoded by the processings of the decoding section 2201, the inverse transformation section 2202 and reduced prediction block in pixel units, and generates a decoded reduced block. Just like the case of the encoding device in FIG. 22, the inverse transformation section 2202 may include quantization processing. The enlargement section 2208 enlarges the decoded reduced block into a decoded block the same size as the decoding block, and outputs the result to a storage section 604.

Figure 23:
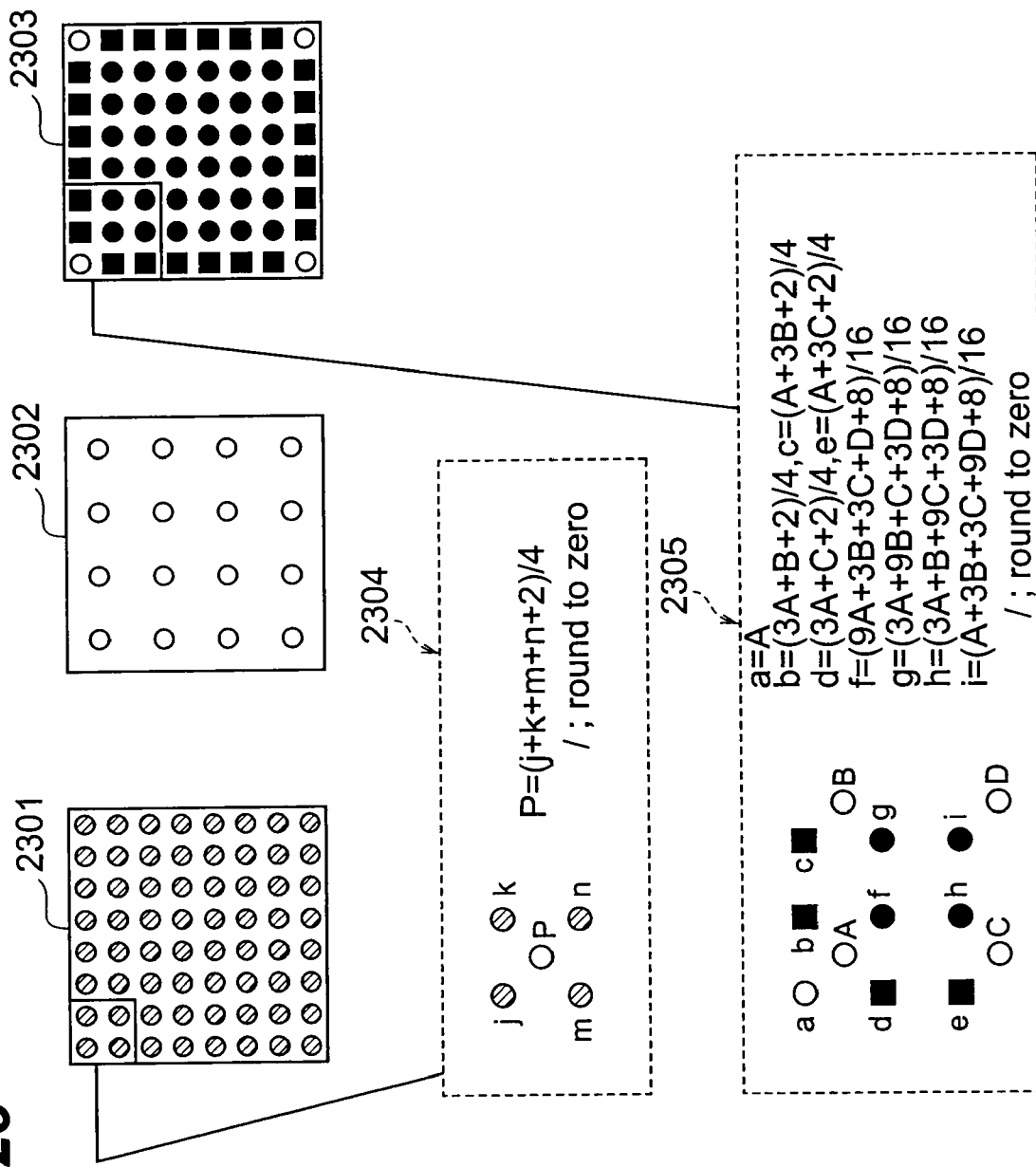
FIG. 23 are diagrams depicting a reduction/enlargement processing of blocks according to the third embodiment.

FIG. 23 shows the reduction/enlargement processings in the reduction section 2110, 2207 and the enlargement section 2111, 2208. A block 2301 shows a block before reduction. A processing 2304 describes a pixel generation method on a reduction block in the reduction processing. j, k, m and n are pixels on a reduction block where a pixel P, which is a pixel on a block 2301, is generated. In the processing 2304, a pixel averaging processing is performed in 4 pixel units, and the pixel on the reduction block is calculated. A block 2302 shows the reduced block obtained by the reduction processing.

A processing 2305 shows a pixel generation method on an enlarged block in the enlargement processing. Pixels A to D are pixels on the block 2302, and pixels a to i are pixels on the enlarged image. In the processing 2305, interpolation/extrapolation processing of pixels are performed using different methods depending on the pixel position. For pixel a, where a pixel on an adjacent reproduced block is only A, pixel A is directly used as pixel a. In the same way, a pixel indicated by a white circle in block 2303 is calculated by copying the adjacent pixel on the reduced block. For pixels b to e, two pixels exist in the adjacent reduced block. Therefore these pixels are calculated by extrapolation using the adjacent two pixels on the reduced block. In the same way, pixels indicated by a black square in block 2303 are calculated by extrapolation using the adjacent two pixels on the reduced block. For pixels f to i, four pixels exist on the adjacent reduced block. Therefore these pixels are calculated by linear interpolation processing using the adjacent four pixels on the reduced block. In the same way, pixels indicated by a black circle in the block 2303 are calculated by linear interpolation processing using the adjacent four pixels on the reduced block.

Figure 24:
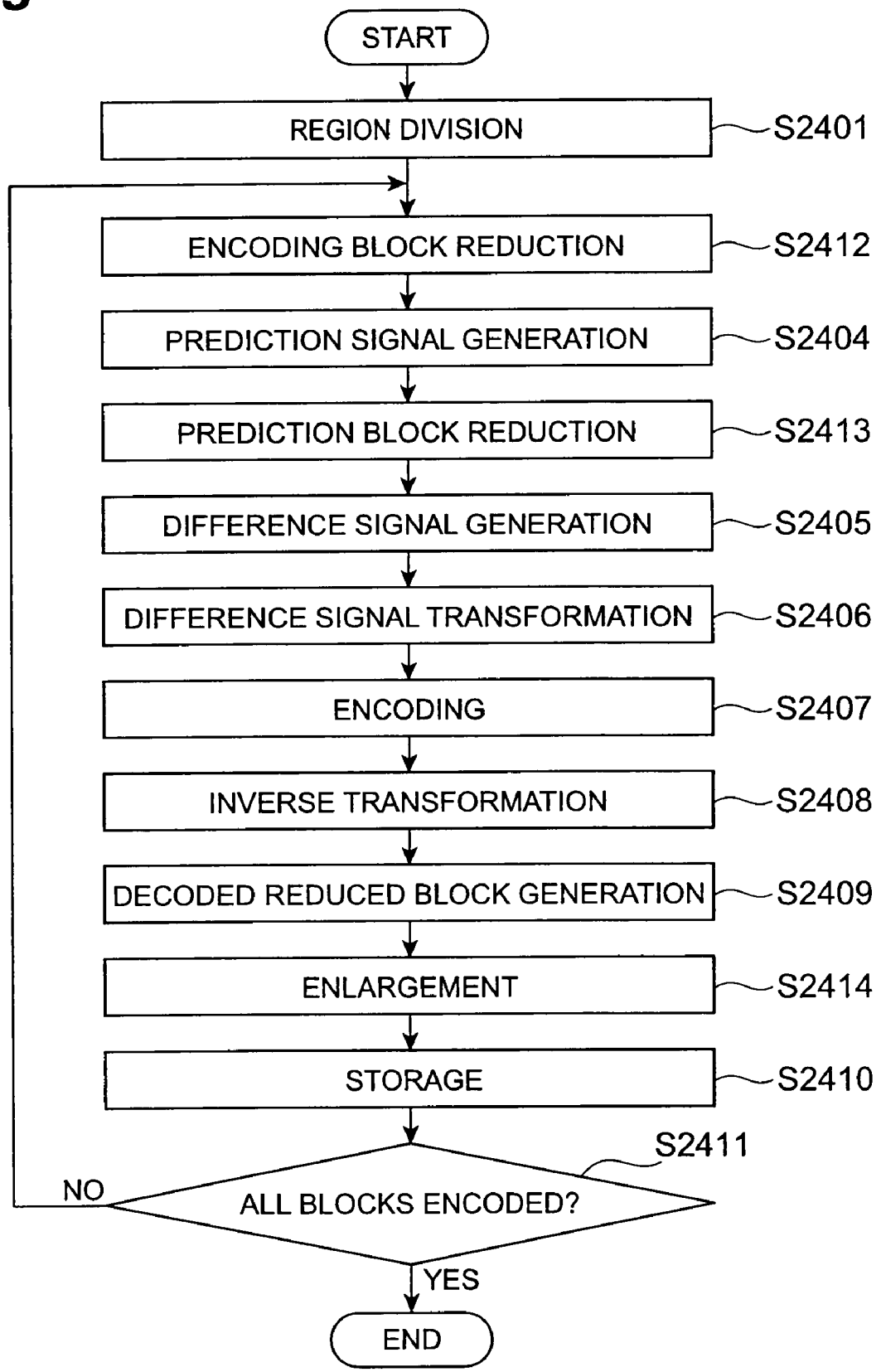
FIG. 24 is a flow chart depicting a processing executed by the video encoding device according to the third embodiment of the present invention.
Figure 25:
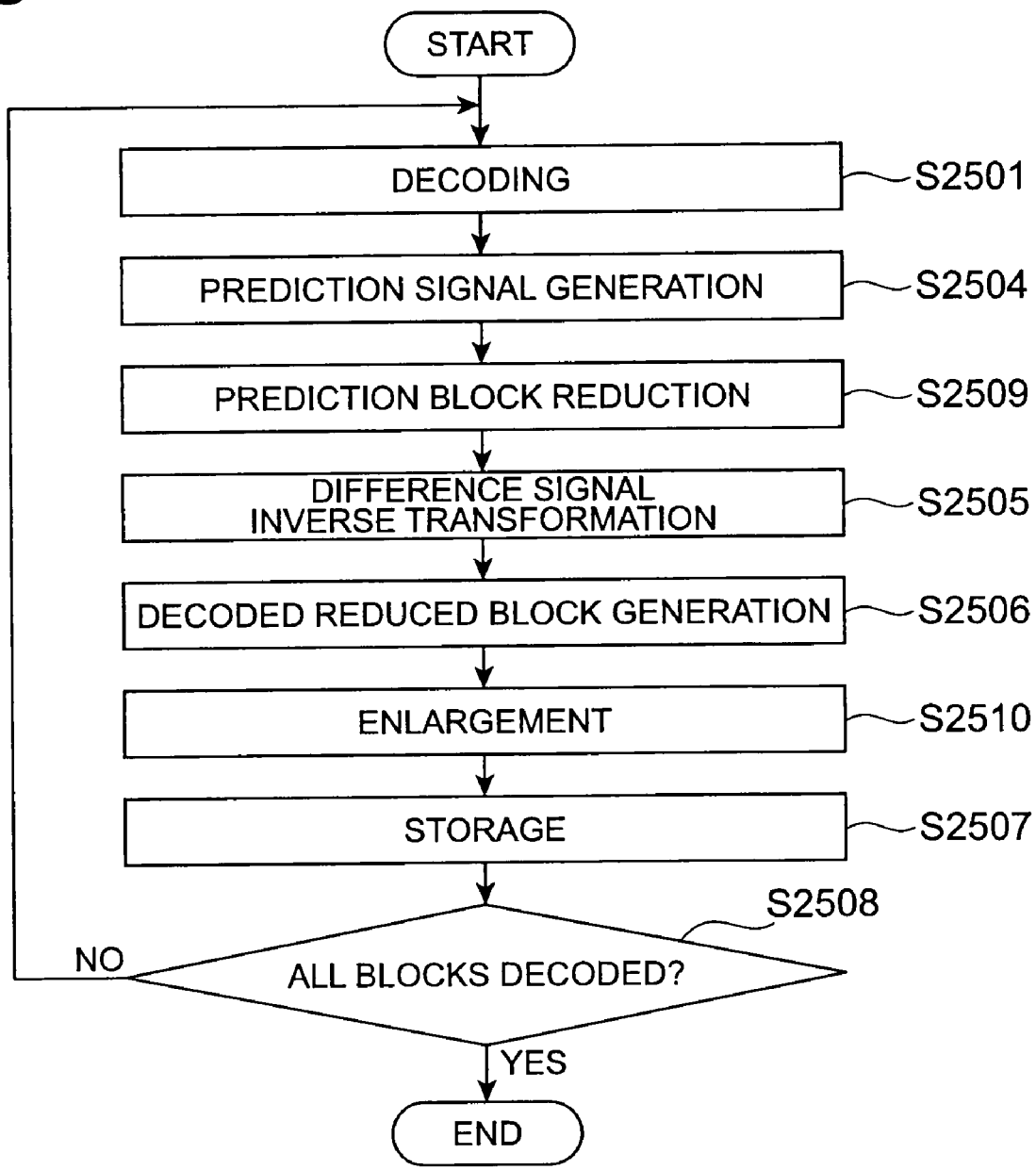
FIG. 25 is a flow chart depicting a processing executed by the video decoding device according to the third embodiment of the present invention.

FIG. 24 and FIG. 25 show the video encoding processing and the video decoding processing to implement the third embodiment respectively. FIG. 24 and FIG. 25 correspond to FIG. 5 and FIG. 7 of the first embodiment respectively. In FIG. 24 and FIG. 25, the template region determination processing (S502, S702), template matching processing (S503, S703), prediction signal determination processing (S504) and prediction signal generation processing (S704) in FIG. 5 and FIG. 7 are collectively referred to as prediction signal generation processing (S2404, S2504). S2401, S2405, S2406, S2407, S2408, S2410 and S2411 in FIG. 24 correspond to S501, S505, S506, S507, S508, S510 and S511 in FIG. 5 respectively. These processings are essentially the same respectively, only the block size to be handled is different, therefore the description thereof is omitted here. S2501, S2505, S2507 and S2508 in FIG. 25 correspond to S701, S705, S707 and S708 in FIG. 7 respectively. These processings as well are essentially the same respectively, only the block size to be handled is different, therefore the description thereof is omitted here.

In the encoding block reduction processing in S2412 in FIG. 24, the reduction section 2110-1 reduces an encoding target block to be input to the region division section 101 to a reduced encoding target block, and outputs the reduced block to the subtraction section 2102. In the prediction block reduction processing in S2313, the reduction section 2110-2 reduces a prediction block, which is input from the prediction generation section 108, to the reduced prediction block, and outputs the reduced block to the subtraction section 2102 and the addition section 2106. By the subsequent processings S2405 to S2408, encoding and decoding processings of the reduced difference block are executed, and a decoded reduced difference block is generated. In the decoded reduced block generation processing in S2409, the addition section 2106 adds the reduced prediction block and the decoded reduced difference block in pixel units, and generates a decoded reduced block. In the enlargement processing in S2414, the enlargement section 2111 enlarges the decoded reduced block into a decoded block.

In the prediction reduction processing in S2509 in FIG. 25, the reduction section 2207 reduces the prediction block, which is input from the prediction generation section 605, to a reduced prediction block, and outputs the reduced block to the addition section 2203. In S2505, the decoding processing of the reduced difference block is executed, and a decoded reduced difference block is generated. In the decoded reduced block generation processing in S2506, the addition section 2203 adds the reduced prediction block and the decoded reduced difference block in pixel units, and generates a decoded reduced block. In the enlargement processing in S2510, the enlargement section 2208 enlarges the decoded reduced block into a decoded block.

For the present embodiment, the following variant forms are possible. The following variant forms are on the video encoding device and video decoding device, but can also be implemented for the video encoding processing and video decoding processing.

(1) Prediction Method Using Template Matching

In the present embodiment, a method of template matching in the prediction generation section is not limited to the method in FIG. 2. In other words, in the present embodiment and variant forms as well, the prediction signal generation method using the template matching described in the first embodiment, second embodiment and variant forms thereof can be used. The selection section may be added, just like FIG. 18 and FIG. 19, and the prediction generation section 108, 605 may be replaced with the prediction generation section 1108 shown in FIG. 20. The prediction generation sections 108, 605 may also be replaced with the prediction generation section 800 shown in FIG. 8, since the input/output flow of the signal is the same.

So far the method of generating a prediction block from the reproduced video data stored in the storage section 107, 604 using the template was used as the prediction method using template matching. However a method of generating a prediction signal from a reproduced signal of a template by a predetermined procedure, such as intra-prediction stated in Non-patent Document 1, is also possible. This method as well is effective, since the encoding/decoding processing using the reduction/enlargement processing of the present embodiment has an effect to decrease the amount of coding bits.

Figure 36:
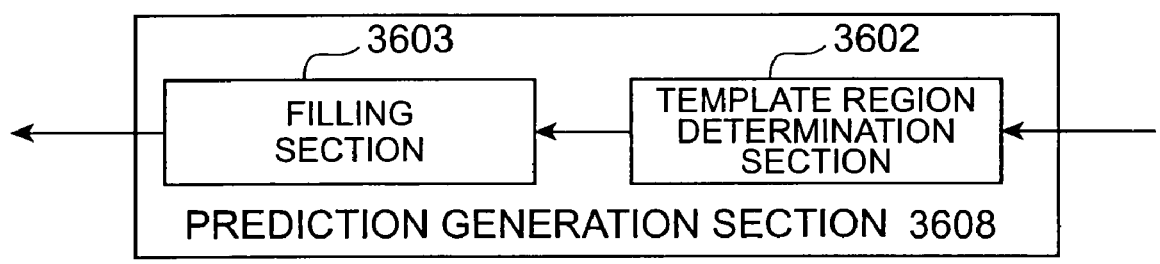
FIG. 36 is a diagram depicting a configuration of a variant form of the prediction generation section according to the third embodiment.
Figure 37:
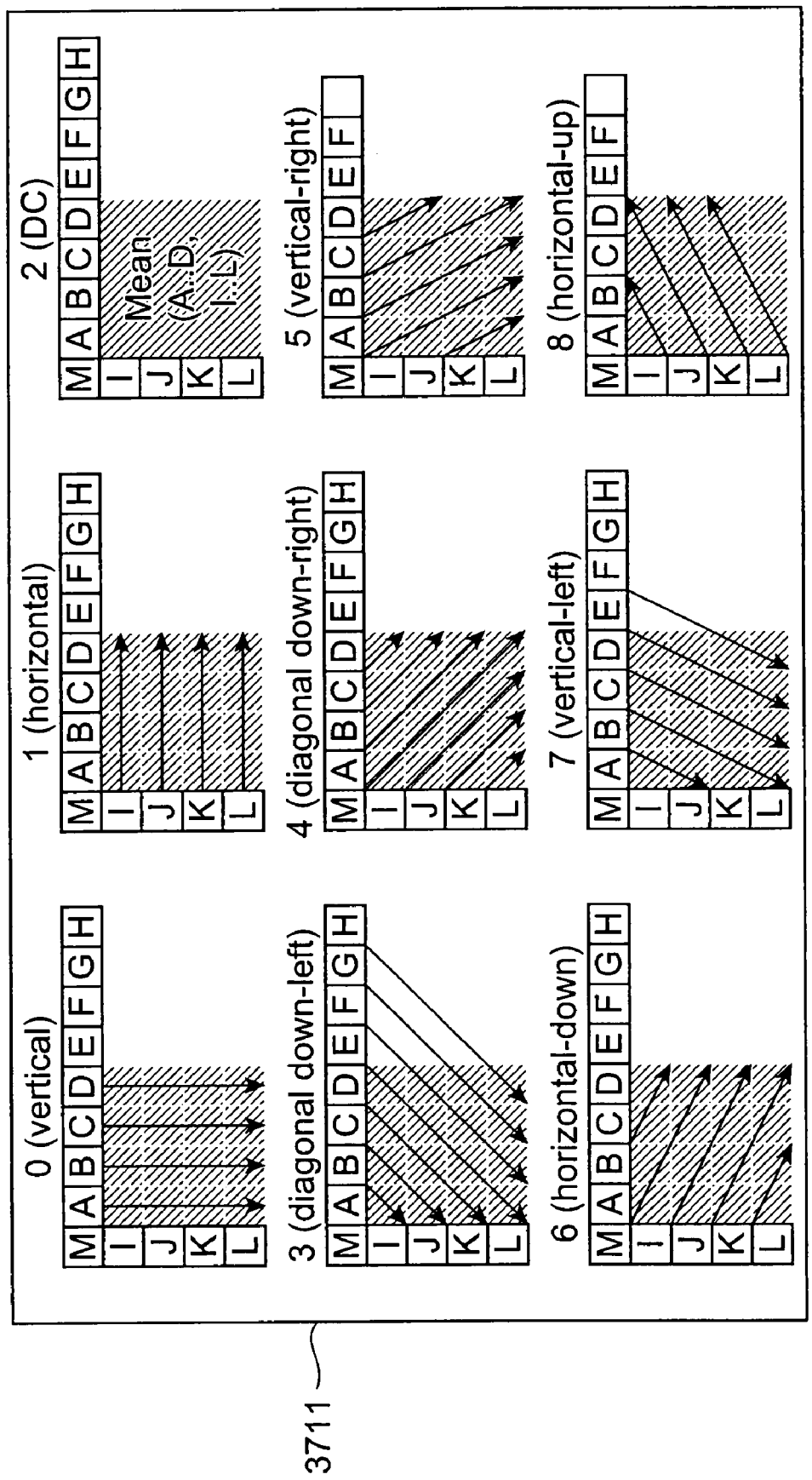
FIG. 37 are diagrams depicting an example of prediction processing according to the third embodiment.

FIG. 36 shows a configuration of a prediction generation section according to this variant form. FIG. 36 is an example of an intra-prediction which generates a prediction signal from a signal of the template. The method for generating a prediction signal from a reproduced signal of a template can be implemented by replacing the prediction generation section 108 in FIG. 21 and FIG. 22 with a prediction generation section 3608 in FIG. 36. A template region determination section 3602 constructs a template by 13 reproduced pixels adjacent to an encoding target block. A filling section 3603 generates a prediction block from the pixels in the template by a method shown in processing 3711 in FIG. 37. In FIG. 37, 9 types of filling methods are shown, but the present invention can be implemented by defining at least one type of method, of these 9 types, in advance. One type of method may be selected from the plurality of filling methods in the filling section, and a prediction block generated by the selected filling method may be output. The method of selecting the filling method in this case is not limited in the present invention. Information of the selected filling method may be transmitted or only data shared by an encoder (video encoding device) and a decoder (video decoding device) may be used to determine the method.

The shape of the template is not limited to the one shown in FIG. 37. The present invention can be implemented not only by a template comprised of pixels on the block boundary, but also by a template comprised of pixels distant from the block boundary only if the pixels are in the reproduced region of a frame to which the encoding target block belong.

(2) Configuration of Reduction/Enlargement Processing

Figure 32:
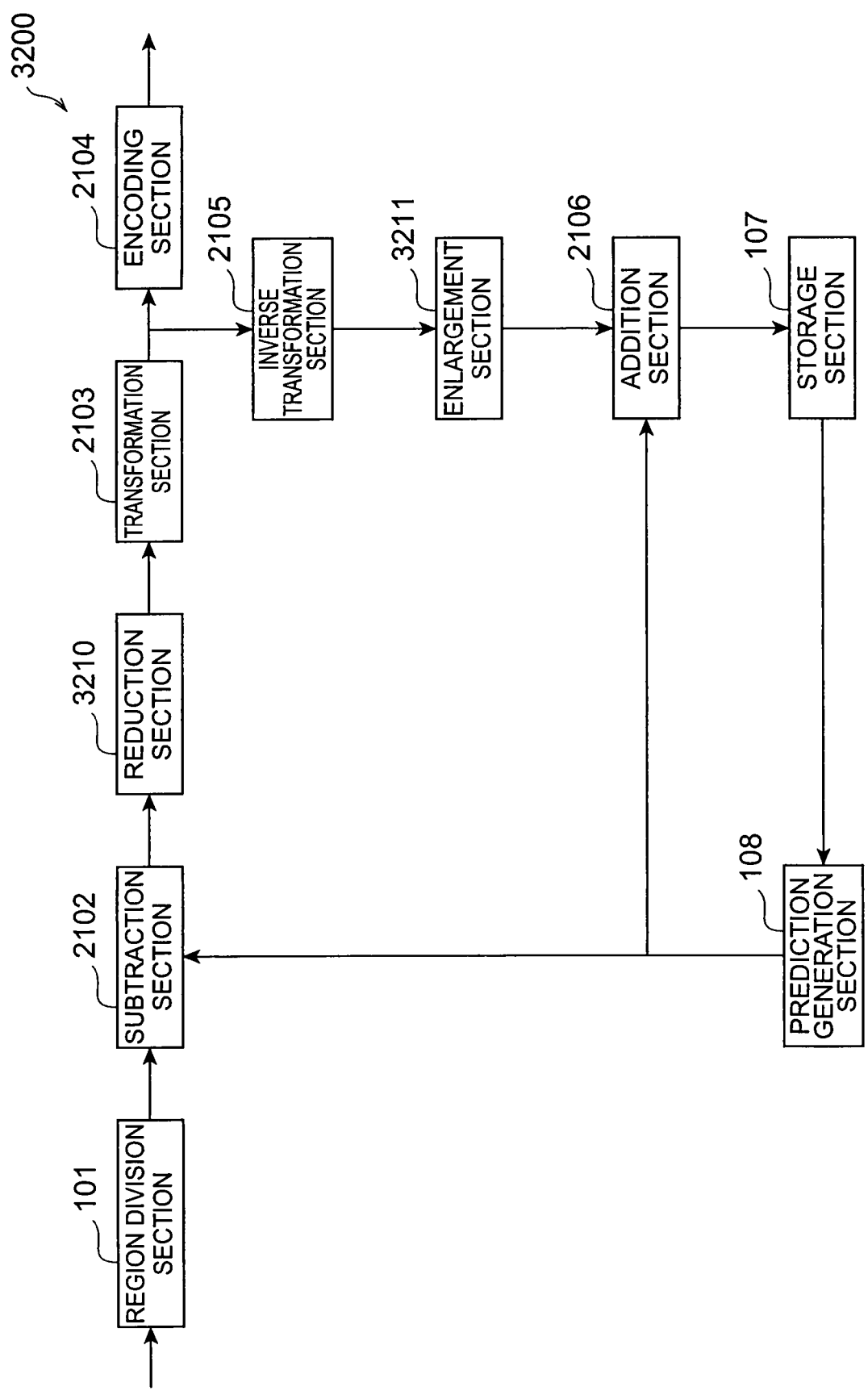
FIG. 32 is a diagram depicting a configuration of a variant form of the video encoding device according to the third embodiment.
Figure 34:
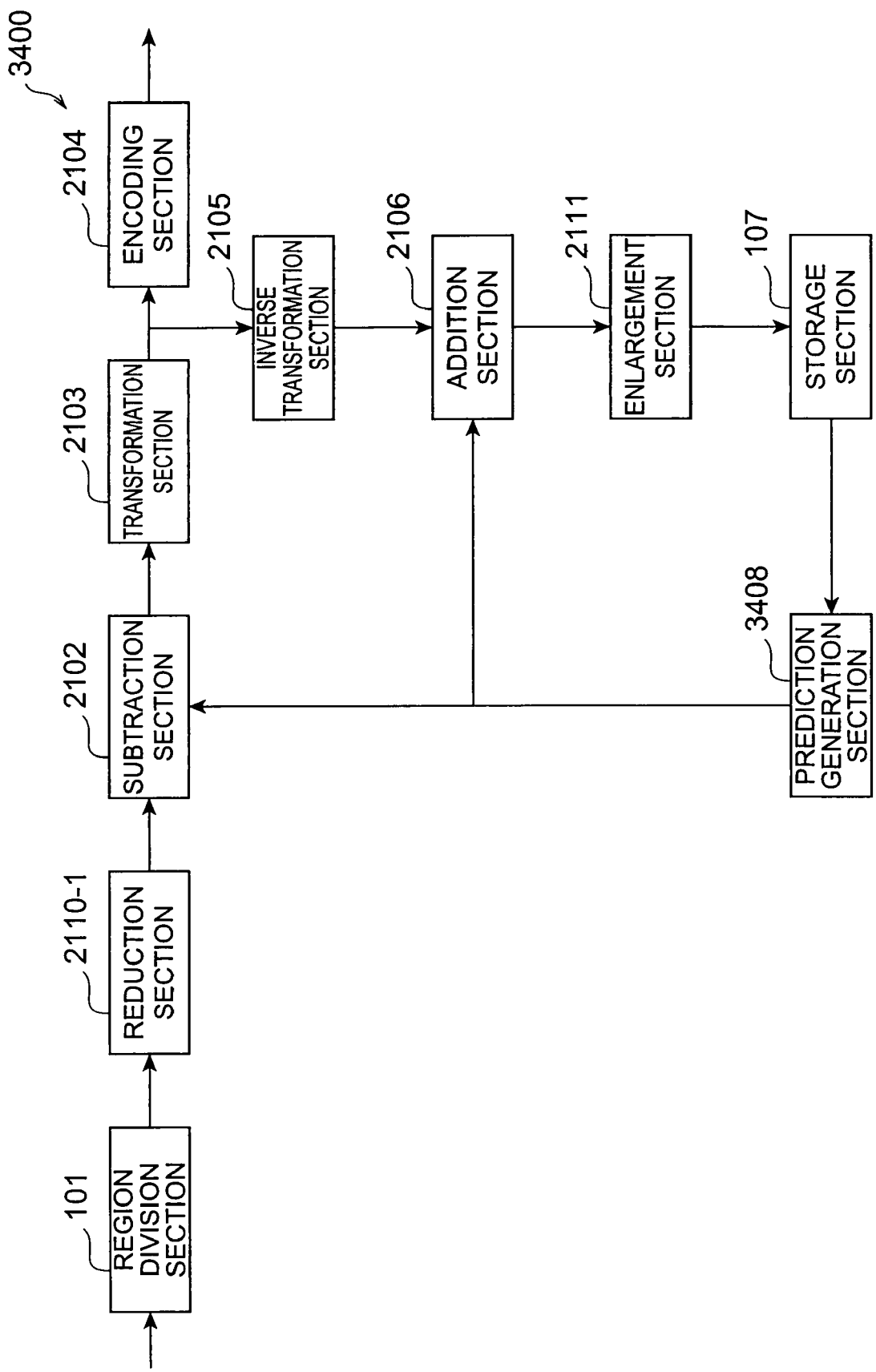
FIG. 34 is a diagram depicting a configuration of a variant form of the video encoding device according to the third embodiment.
Figure 35:
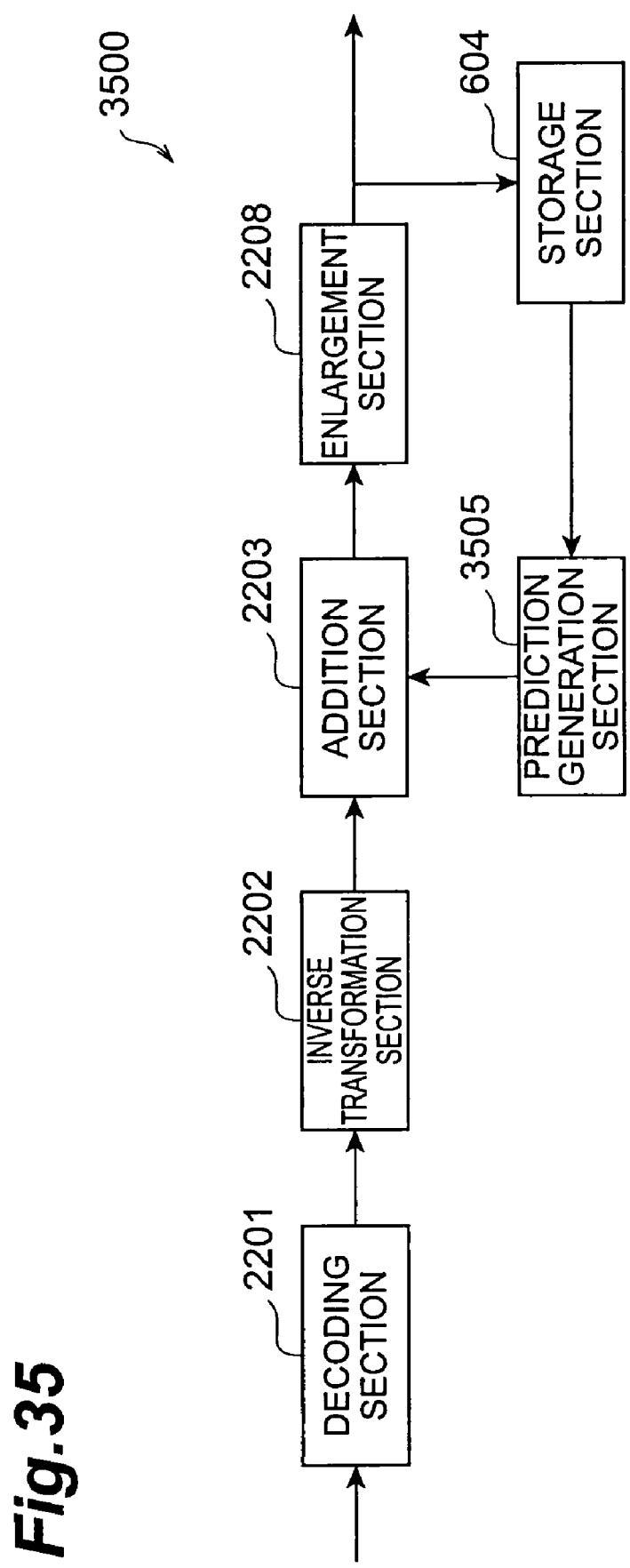
FIG. 35 is a diagram depicting a configuration of a variant form of the video decoding device according to the third embodiment.

In the video encoding device 2100 shown in FIG. 21 and the video decoding device 2200 shown in FIG. 22, a decoded block is generated by reducing the resolution of the encoding target block and a prediction block to encode the difference them, and enlarging the decoded reduced block. However decreasing the amount of coding bits using the reduction/enlargement processing can also be implemented by a different configuration, and is not limited to this method. FIG. 32 and FIG. 34 show another example of the video encoding device, and FIG. 33 and FIG. 35 show another example of the video decoding device.

In a video encoding device 3200 in FIG. 32, not a prediction block but a difference block generated by subtracting a prediction block from an encoding target block in pixel units, is decimated by a reduction section 3210. A decoded reduced difference block is enlarged by an enlargement section 3211, and the enlarged block and prediction block are added in pixel units to generate a decoded block.

Figure 33:
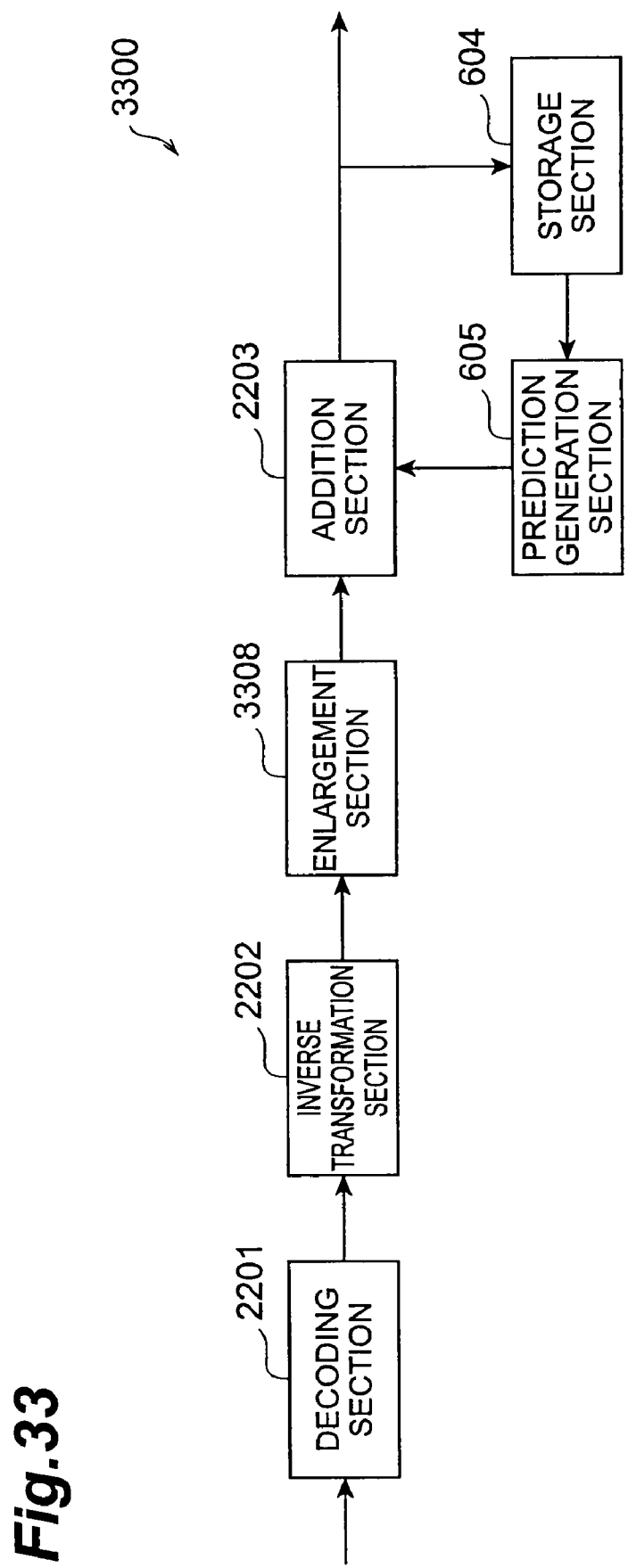
FIG. 33 is a diagram depicting a configuration of a variant form of the video decoding device according to the third embodiment.

A video decoding device 3300 in FIG. 33 is a decoding device corresponding to the video encoding device 3200 shown in FIG. 32. A prediction block is not reduced, and a decoded reduced difference block is enlarged by an enlargement section 3308, and the enlarged block and the prediction block are added in pixel units to generate a decoded block.

A video encoding device 3400 in FIG. 34 has a configuration where the functions of the reduction section 2110-2 in FIG. 21 is included in a filling section in a prediction generation section 3408. In the same way, a video decoding device 3500 in FIG. 35 has a configuration where the reduction section 2207 in FIG. 22 is included in a filling section in a prediction generation section. In this case, the filling section could perform a combination of reduction processing and filling processing so as to generate the reduced prediction block directly. In the filling section 203 shown in FIG. 2, FIG. 8 or FIG. 20, the memory of the filling section 203 has a size that can store the reduced prediction block, but cannot store the prediction block, and obtains only necessary information directly from the reproduced video data in the storage section 107, and generates the reduced prediction block. In this case, the template region determination section and the matching section may obtain all the pixels in the template region from the reproduced video data in the storage section 107, as mentioned above, or may also perform reduction processing for the template region and obtain only necessary information and perform matching processing. In the video decoding device 3500 in FIG. 35, on the other hand, the template region determination section can also obtain only necessary information directly from the reproduced video data in the storage section 604.

The configuration of the prediction generation section in the video encoding device 3200, 3400 and video decoding device 3300, 3500 may be the one shown in FIG. 2 or the one shown in FIG. 36. To include a selection section, just like the case of the video encoding device 1800 and the video decoding device 1900 shown in FIG. 18 and FIG. 19, the selection section can be added, so the prediction generation section can be replaced with the prediction generation section shown in FIG. 2 and FIG. 20. The prediction generation section in FIG. 2 may be replaced with the prediction generation section in FIG. 8, since the input/output flow of the signal is the same.

In FIG. 21, the decoded reduced block may be stored in the frame memory directly, without performing enlargement processing. In another frame, template matching is performed with a reduced image obtained by putting the decoded reduced block together, and the reduced prediction block is generated. Then difference encoding of the reduced encoding target block and the reduced prediction block is performed. Or the reduced prediction block may be enlarged, and difference encoding of this prediction block and the encoding target block may be performed. In the same way, in FIG. 22, the decoded reduced block may be stored in the frame memory without performing enlargement processing. In another frame, template matching is performed with a reduced image obtained by putting the reduced block together, and the reduced prediction block is generated. Then the reduced block is reproduced by adding the decoded reduced difference block and reduced prediction block. Or the reduced prediction block may be enlarged, and the decoded block may be reproduced by adding the decode difference block and enlarged block. In this way, the effect of decreasing the amount of coding bits can be implemented even if the application method of the reduction processing and the enlargement processing is changed.

A method for the reduction processing and enlargement processing may be the method shown in FIG. 23, or may be another example to be described later.

(3) TMP-E, TMP-L Selection Method

Figure 26:
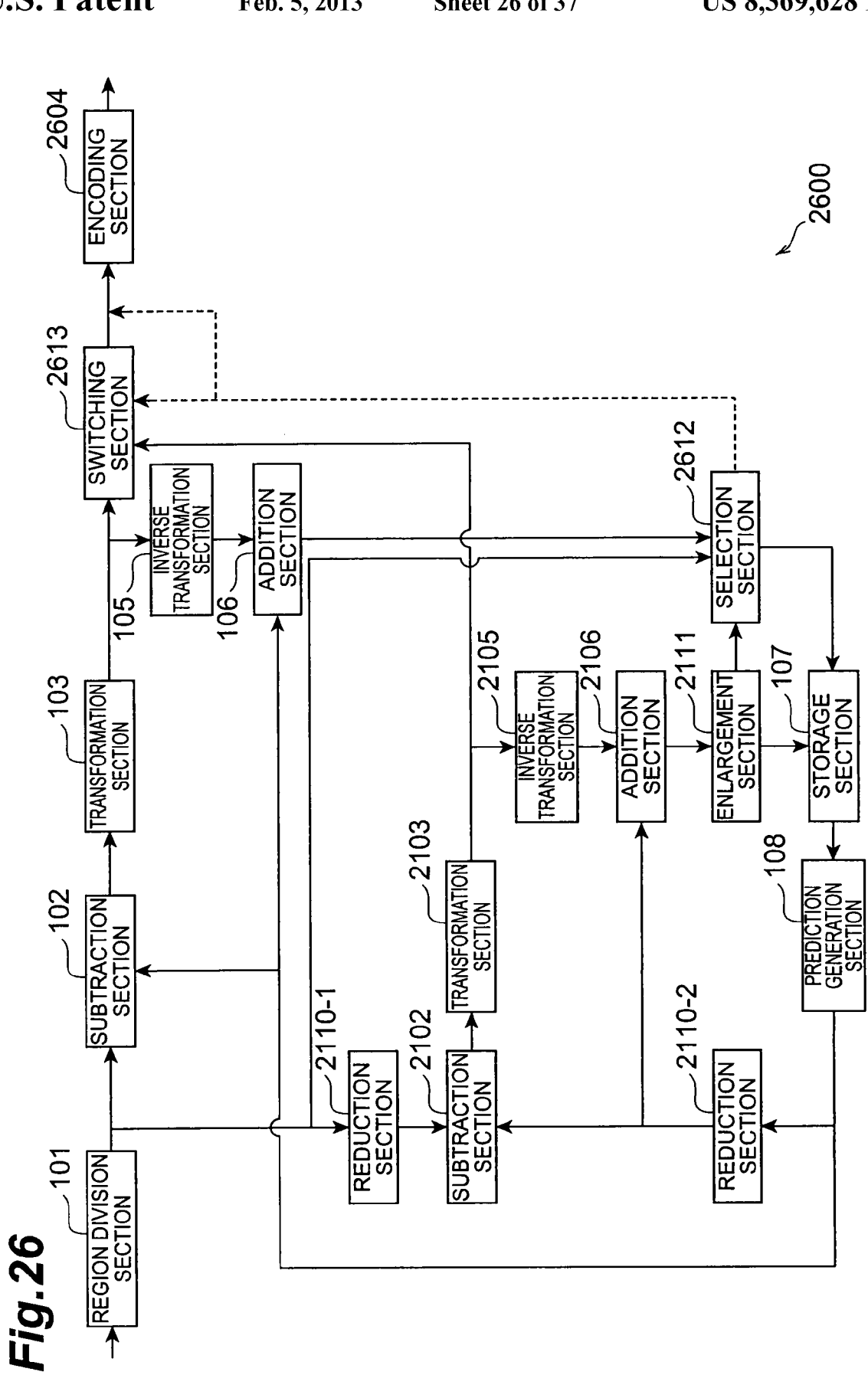
FIG. 26 is a diagram depicting a configuration of a variant form of the video encoding device according to the third embodiment.
Figure 27:
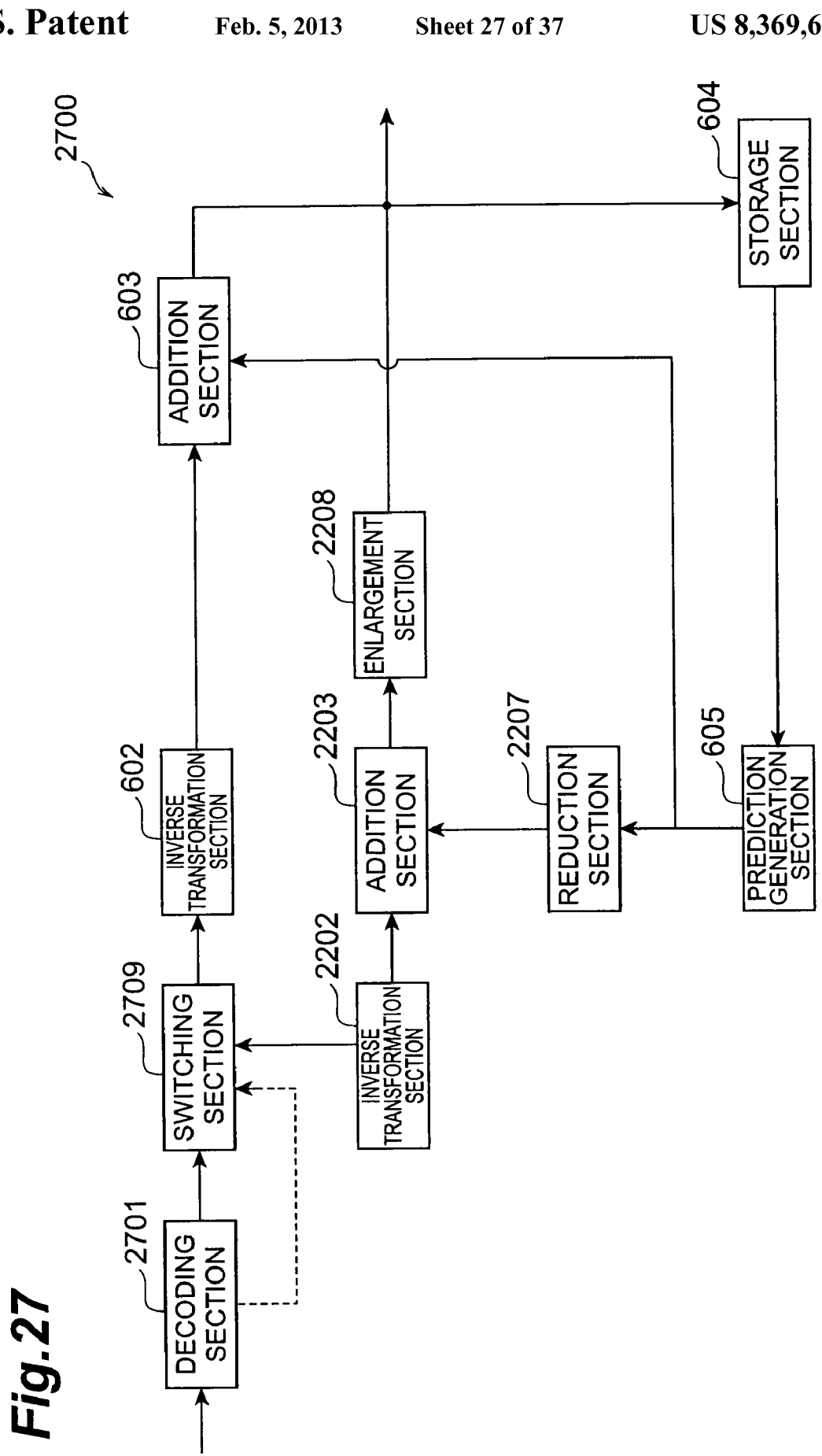
FIG. 27 is a diagram depicting a configuration of a variant form of the video decoding device according to the third embodiment.

The video encoding device 2100 and the video decoding device 2200 shown in FIG. 21 and FIG. 22 are configurations of devices which involve block reduction/enlargement processing assuming that patterns of the template region are all flat. In practical terms, however, a flat portion and a characteristic portion coexist in patterns of images, so the configuration which is described in the first embodiment without doing the block reduction/enlargement processing, is combined with the present configuration. FIG. 26 shows a video encoding device 2600 where the video encoding devices 100 and 2100 in FIG. 1 and FIG. 21 are combined, and FIG. 27 shows a video decoding device 2700 where the video decoding devices 600 and 2200 in FIG. 6 and FIG. 22 are combined. In FIG. 26 and FIG. 27, blocks having the same functions as FIG. 1, FIG. 6, FIG. 21 and FIG. 22 are denoted with the same numbers, so detailed description thereof is omitted here.

In FIG. 26, the encoding target blocks obtained by division by an region division section 101 are input to a subtraction section 102 and a reduction section 2110-1 respectively. The encoding target block is encoded by two types of prediction encoding methods (TMP-E mode: encoding method of the video encoding device 100 in FIG. 1; TMP-L mode: encoding method of the video encoding device 2100 in FIG. 21), and two types of transformation data (quantization data) are output from a transformation section 103 and the transformation section 2103 to a switching section 2613. Two types of decoding blocks, which were locally decoded by two types of methods, are output to a selection section 2612. The selection section 2612 selects one type out of the two types of decoding blocks, and outputs the selection information to a switching section 2613 and an encoding section 2604. The switching section 2613 outputs the transformation data (quantization data) to the encoding section 2604 according to the selection information. The encoding section entropy-encodes the selection information and the transformation data (quantization data) together.

An TMP-E and TMP-L mode selection method by the selection section 2612 is, for example, a method of comparing difference signals of the encoding target block, which is input separately, and two types of decoding blocks, and selecting one of which sum of the square of the difference is smaller. With this method, however, the amount of coding bits is not included, so an encoding method of which encoding efficiency is high is not selected. A selection method, considering the encoding efficiency, is a method stated in Non-patent Document 2, for example. According to this method, transformation data (quantization data) generated by two types of prediction encoding methods are virtually encoded respectively. Then total distortion between the decoded block and the encoding target block (e.g. sum of square of the difference) and the weighted value of evaluation criteria of the amount of coding bits are calculated respectively, and an encoding method of which value of evaluation criteria is small is selected. According to this method, a prediction encoding method of which encoding efficiency is high can be selected. To encode the transformation data (quantization data), the data may be input to the selection section 2612 and encoded in the selection section 2612, or may be encoded in the encoding section 2604 and information on the amount of coding bits is input to the selection section.

In the case of the video decoding device 2700 shown in FIG. 27, a decoding section 2701 entropy-decodes TMP-E mode/TMP-L mode selection information and transformation data (quantization data) based on the selected prediction encoding method. Based on the selection information, a switching section 2709 outputs the transformation data (quantization data) to an inverse transformation section 602 if the selection information indicates TMP-E mode, and outputs the transformation data (quantization data) to an inverse transformation section 2202 if the selection information indicates TMP-L mode. The transformation data (quantization data) is decoded according to the decoding method indicated by the selection information.

In the above description, TMP-E and TMP-L are handled as different prediction encoding methods, and this selection information is encoded at the encoding side. However, the two types of prediction encoding methods may be handled as one type, where one is automatically selected using decoding information (information derived from the reproduced image or characteristic data belonging to the reproduced image) shared by the encoding side and the decoding side. For characteristic data, target signals in the template region can be used. For example, a possible method is using the variance of target signals of the template region. In other words, setting a threshold in advance, and selecting TMP-E if the variance value is greater than the threshold, and selecting TMP-L if smaller. Another possible method, other than using a variance value, is calculating the pixel gradient (difference values between adjacent pixels) of the target signals of the template region, and selecting TMP-E if the number of pixels, of which difference value exceeds a threshold, is greater than a predetermined value, and selecting TMP-L if smaller. Another possible method is comparing a motion vector detected in template matching and a motion vector when the pixel group of the template region is decoded (may be searched again using the signal of the decoding block), and selecting TMP-E if this difference is smaller than a predetermined threshold, and selecting TMP-L if greater. TMP-E/TMP-L may be selected based on the size of the detected motion vector or the motion vectors of adjacent blocks. These selections, based on variance value, pixel gradient and motion vector, may be combined. If methods used for selection are different, a final selection may be determined by majority decision, or a method of transmitting selection information, only when the selected methods are different, is also possible, where a stable selection result can be obtained.

In this case, in the video decoding device 2700 in FIG. 27, where the selection information is not decoded, a selection section must be added. This selection section performs the same operations as the selection section of the encoding device, and outputs the selection information to the switching section 2709.

The prediction generation section in each device 2600, 2700 shown in FIG. 26 and FIG. 27 is not limited to the configuration shown in FIG. 2, as mentioned in the above variant form (1). It is also possible to apply the configuration shown in FIG. 8, FIG. 20 or FIG. 36.

In the prediction generation section 3608 shown in FIG. 36, it is possible to apply reduction/enlargement processing, such as TMP-L, only in the case of a predetermined filling method, and apply only differential encoding, such as TMP-E, in the case of other filling methods. Another possible method is applying such encoding methods as TMP-L and TMP-E to prediction blocks generated using a filling method selected by the filling section, and selecting one encoding method adaptively.

(4) Adaptation to Conventional Prediction Encoding Method

The above-mentioned prediction encoding methods TMP-E and TMP-L can be selectively used in combination with a plurality of prediction encoding methods stated in Non-patent Document 1 (inter-prediction mode and intra-prediction mode for encoding motion vectors). In this case, a plurality of block sizes may be provided for each prediction encoding method. An optimum selection of a prediction encoding method and block size can be implemented by a method shown in Non-patent Document 2, for example. In other words, this can be implemented by combining conventional prediction encoding methods with each device 2600 and 2700 shown in FIG. 26 and FIG. 27 (the prediction generation method can be modified as shown in variant form (1)), and adding the selection section. It is also possible to adapt only TMP-L to conventional prediction encoding methods. In this case, conventional prediction encoding methods are combined with the device 2100, 2200 shown in FIG. 21 and FIG. 22, the device 3200, 3300 shown in FIG. 32 and FIG. 33, or the device 3400, 3500 shown in FIG. 34 and FIG. 35.

(5) Reduction/Enlargement Processing

Figure 28:
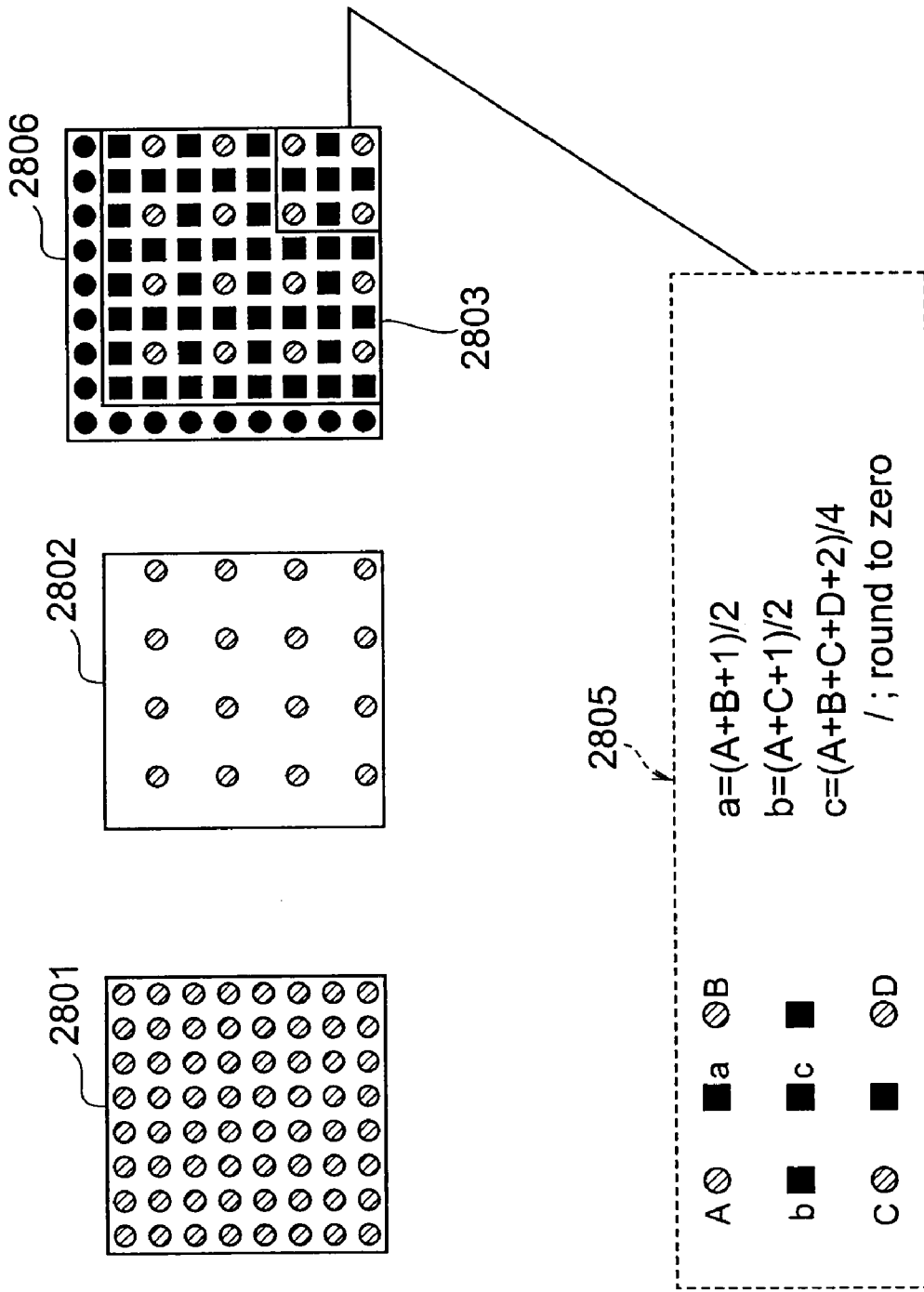
FIG. 28 are diagrams depicting another example of the reduction/enlargement processing of blocks according to the third embodiment.
Figure 29:
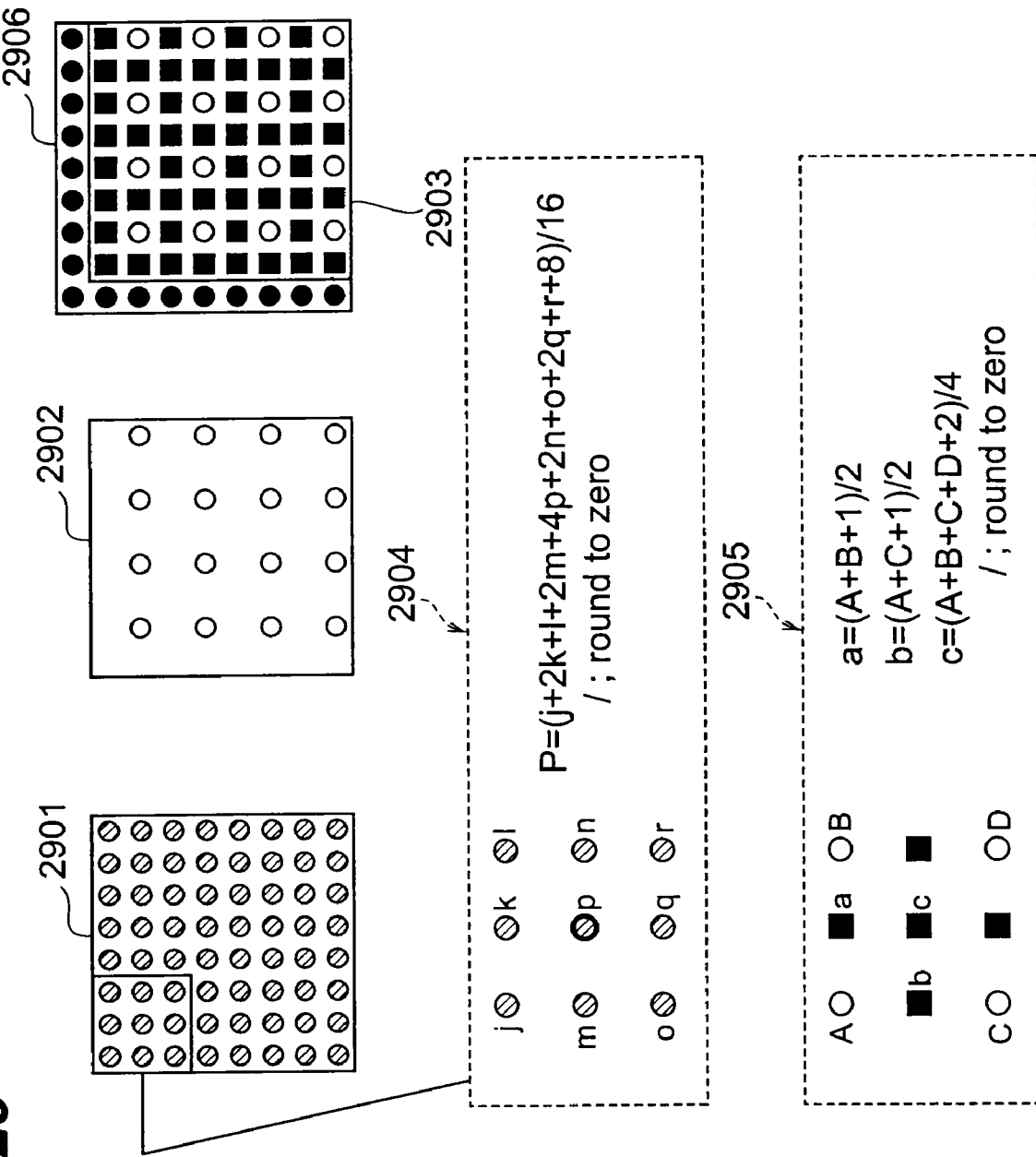
FIG. 29 are diagrams depicting another example of the reduction/enlargement processing of blocks according to the third embodiment.

The block reduction processing by the reduction section and the block enlargement processing by the enlargement section are not limited to the method in FIG. 23. FIG. 28 and FIG. 29 show other examples.

In FIG. 28, a block 2801 shows a block before reduction, and a block 2802 shows a reduced block. In this example, the reduced block is generated by simple pixel sampling, without involving filter processing, such as that used for processing 2304. A processing 2805 shows a pixel generation method on an enlargement block in the enlargement processing. Pixels A to D show pixels on the block 2802, and pixels a to c show pixels on the enlarged image. Pixels A to D, which are original pixels before reduction processing, are directly copied to the enlarged block 2803. The pixels removed by the reduction processing are calculated by simple linear interpolation, as seen in the pixel a to c in the processing 2305. Pixels indicated by a square in the block 2803 are also calculated by linear interpolation processing using adjacent pixels. For the pixel indicated by a black square in the upper end and left end of the enlarged block 2803, only one or two adjacent pixels, indicated by a circle, exist. In this case, decoded pixels in the adjacent block, shown in a pixel group 2806, are used. Since the pixel group 2806 is stored in the storage section, an input path from the storage section to the enlargement section is required in each device shown in FIG. 21, FIG. 22, FIG. 26 and FIG. 27.

In FIG. 29, a block 2901 shows a block before reduction, and a block 2902 shows a reduced block, and a processing 2904 shows a method of reduction processing. In this reduction method, pixels P on the reduced block are generated by a filter processing using eight pixels (j, k, l, m, n, o, q, r) adjacent to pixels p, as shown in the processing 2904. A processing 2905 shows a pixel generation method on an enlarged block 2903 in the enlarged processing. Since this processing is the same as 2805 in FIG. 28, description thereof is omitted. In this case as well, the pixel group 2906 is stored in the storage section, so an input path from the storage section to the enlargement section is required in FIG. 21, FIG. 22, FIG. 26 and FIG. 27, in order to implement this processing.

In these examples, the vertical and horizontal reduction ratios of the reduced block size are ½ respectively, but the reduction ratio is not limited to this. For example, the reduction ratio may be ¼, and the vertical and horizontal reduction ratios may differ.

The reduction/enlargement method need not be one type, but one may be selected out of a plurality of methods. A possible selection method is to select a method, whereby the sum of absolute values, or the sum of a square of the encoding error becomes the minimum, may be selected in frame units or block units at the encoding side, and to encode the selection information, or to select one automatically from a plurality of decoding candidate blocks. For the decision method, it is sufficient if the information derived from a characteristic data belonging to the reproduced image and reproduced image is used, such as a method for calculating an average value in pixels units, or a method for selecting a center value in pixel units.

The reduction method for an encoding target block is not limited for a decoding device. Therefore a different reduction method may be used for a prediction block and for an encoding target block only if the number of pixels of the reduced block is the same. For a decoding device and decoding processing, a reduction method for the encoding target block is not specified.

(6) Re-Encoding of Enlarged Block

In each device, 2600 and 2700, shown in FIG. 26 and FIG. 27, a block enlarged by the enlargement sections 2111 and 2208 is a candidate of a decoding block, but it is also possible to handle this block as a candidate of a prediction block, and selecting an appropriate one from this candidate block and a prediction block generated by the prediction generation sections 108 and 605. In the case of a block enlarged by the enlargement section, high frequency components are limited by filter processing, so re-encoding this block improves image quality with less additional information.

Figure 30:
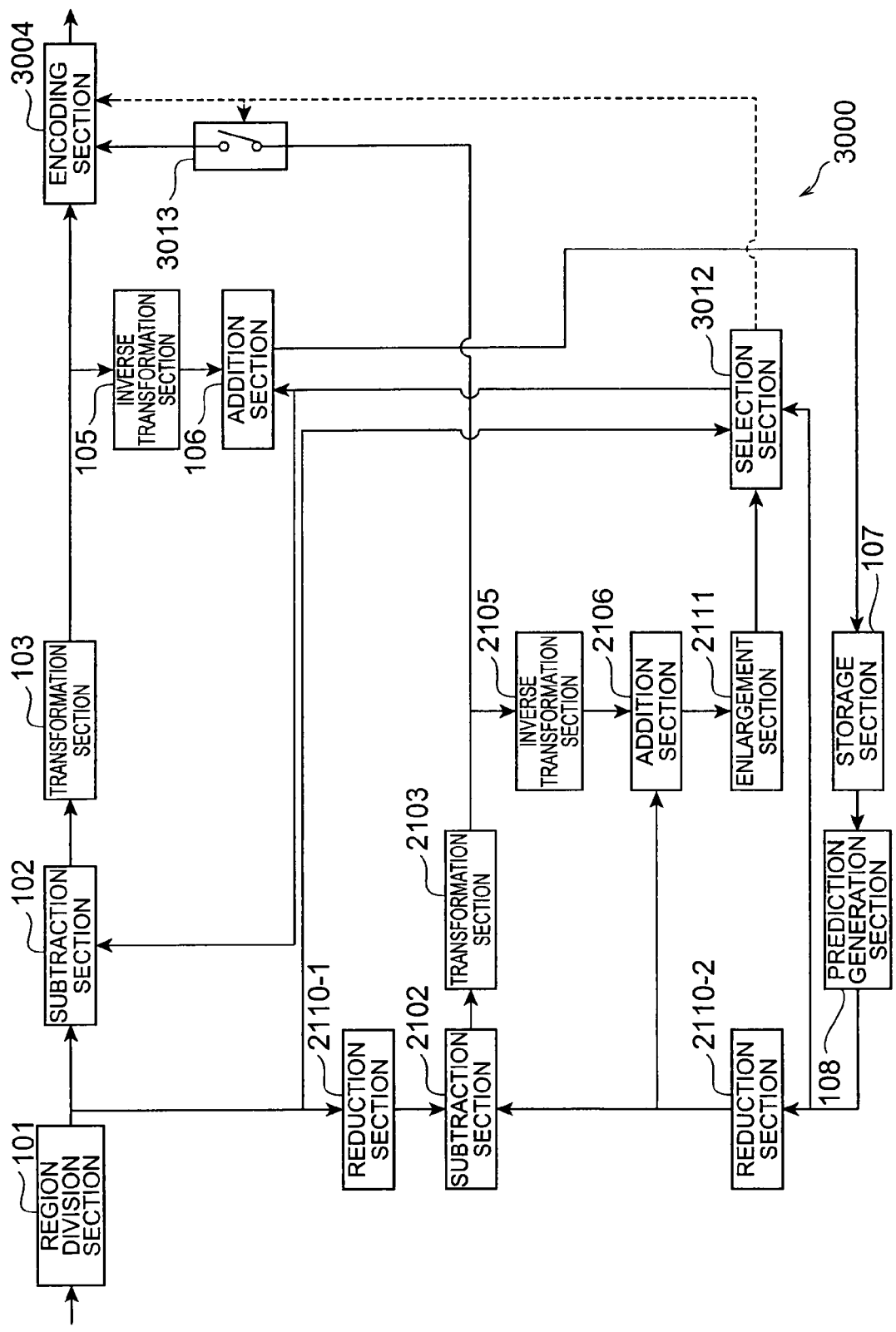
FIG. 30 is a diagram depicting a configuration of a variant form of the video encoding device according to the third embodiment.
Figure 31:
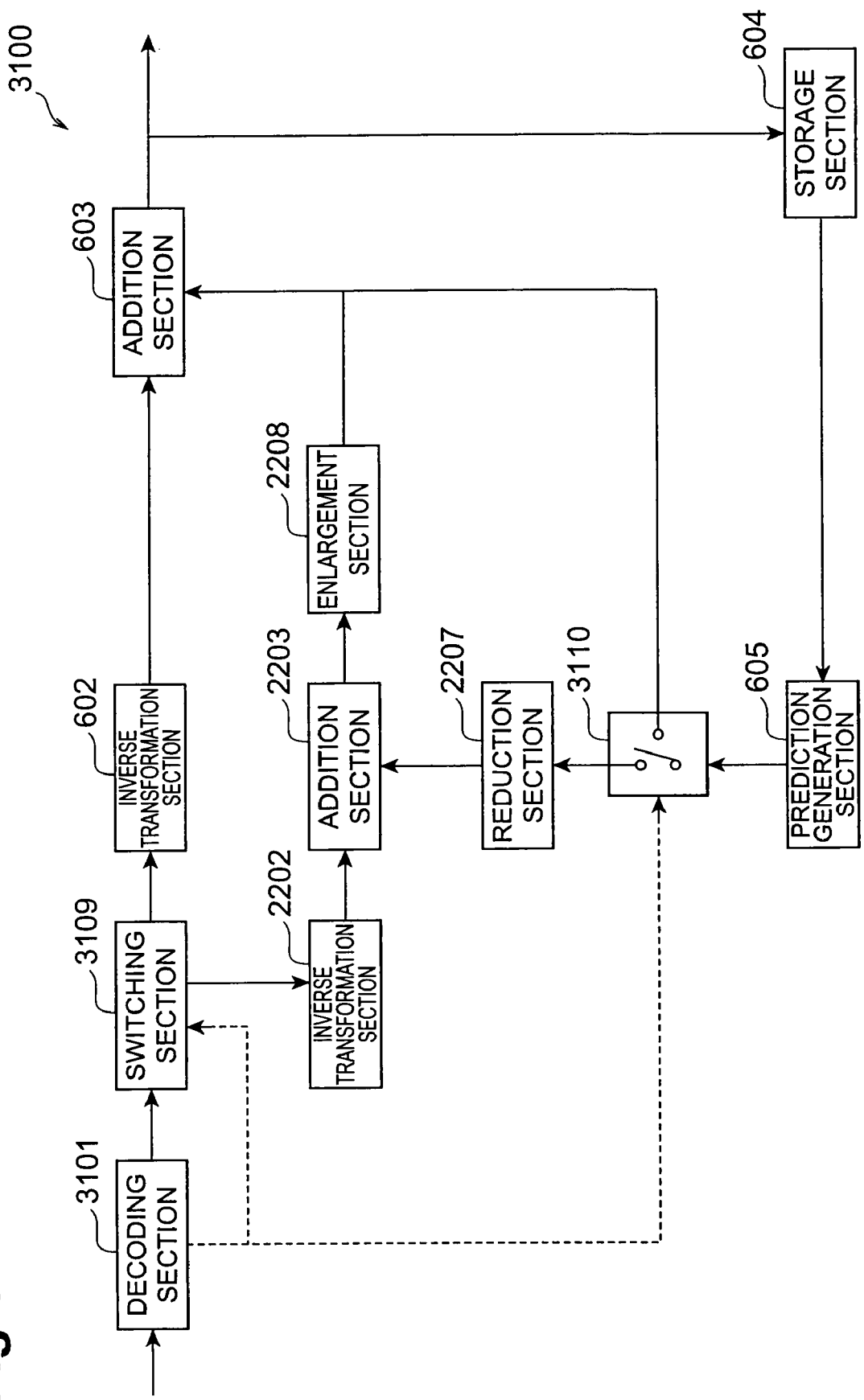
FIG. 31 is a diagram depicting a configuration of a variant form of the video decoding device according to the third embodiment.

FIG. 30 and FIG. 31 show a video encoding device 3000 and a video decoding device 3100 according to the present variant form.

Differences of the video encoding device 3000 in FIG. 30, from FIG. 26, are the functions of a selection section 3012 and encoding section 3004, and the handling of transformation data (quantization data) which is output from a transformation section 2103. In the case of the selection section 2612 in FIG. 26, two types of decoding candidate blocks are input, but in the case of the selection section 3012 of the present variant form, two types of prediction candidate blocks are input from a prediction generation section 108 and an enlargement section 2111. For the selection method, a method shown in the description of FIG. 26 can be used. However if the method in Non-patent Document 2 is used, two types of prediction candidate blocks must be virtually encoded/decoded in order to calculate the total distortion and amount of coding bits. For TMP-L, the transformation data (quantization data), which is output from the transportation section 2103, must also be virtually encoded to convert it into the amount of coding bits. A selected prediction block is output to an addition section 106 and subtraction section 102, and is transformed and encoded. If TMP-L is selected by the selection section, a switch 3013 is turned ON so as to output the transformation data (quantization data), which is output from the transformation section 2103, to the encoding section 3004. The encoding section 3004 encodes all the data from the transformation section 103, transformation section 2103 (in the case of TMP-L) and data from the selection section (if necessary).

In the case of performing quantization in the transformation sections 103 and 2103, encoding efficiency improves if the quantization accuracy of the transformation section 2103 is set to be higher than the quantization accuracy of the transformation section 103. Since a reduced block can be encoded with an amount of coding bits smaller than that of an encoding target block, increasing the quantization accuracy of the reduced block does not increase the amount of coding bits very much. Hence image quality can be improved without dropping the encoding efficiency.

The differences of the video decoding device 3001 in FIG. 31, from FIG. 27, are the functions of a decoding section 3101, a switching section 3109, and the handling of a prediction block, which is output from a prediction generation section 605. In the decoding section 3101, selection information is entropy-decoded. If the prediction encoding method is TMP-L mode, transformation data (quantization data) of a reduced block is entropy-decoded. The transformation data (quantization data) of the reduced block is output to an inverse transformation section 2202 by control of the switching section 3109. The transformation data (quantization data) of the enlarged block is entropy-decoded and is output to an inverse transformation section 602 by control of the switching section 3109. By control of a switch 3110 based on the selection information, a prediction block generated by template matching in the prediction generation section 605 is output to a reduction section 2207. An addition section 603 adds a difference block obtained from the inverse transformation section 602 and a prediction block obtained from an enlargement section 2208, and generates a decoding block. If the prediction encoding method is TMP-E mode, the entropy-decoded transformation data (quantization data) is output to the inverse transformation section 602 by control of the switching section 3109. Also by control of the switch 3110 based on the selection information, a prediction block generated by template matching in the prediction generation section 605 is output to the addition section 603. The addition section 603 adds the difference block obtained from the inverse transformation section 602 and the prediction block obtained from the prediction generation section 605 via the switch 3110, and generates a decoded block.

In this variant form as well, the template prediction method shown in variant form (1) of the present embodiment and the mode selection method shown in variant forms (3) and (4) can be applied.

Figure 16:
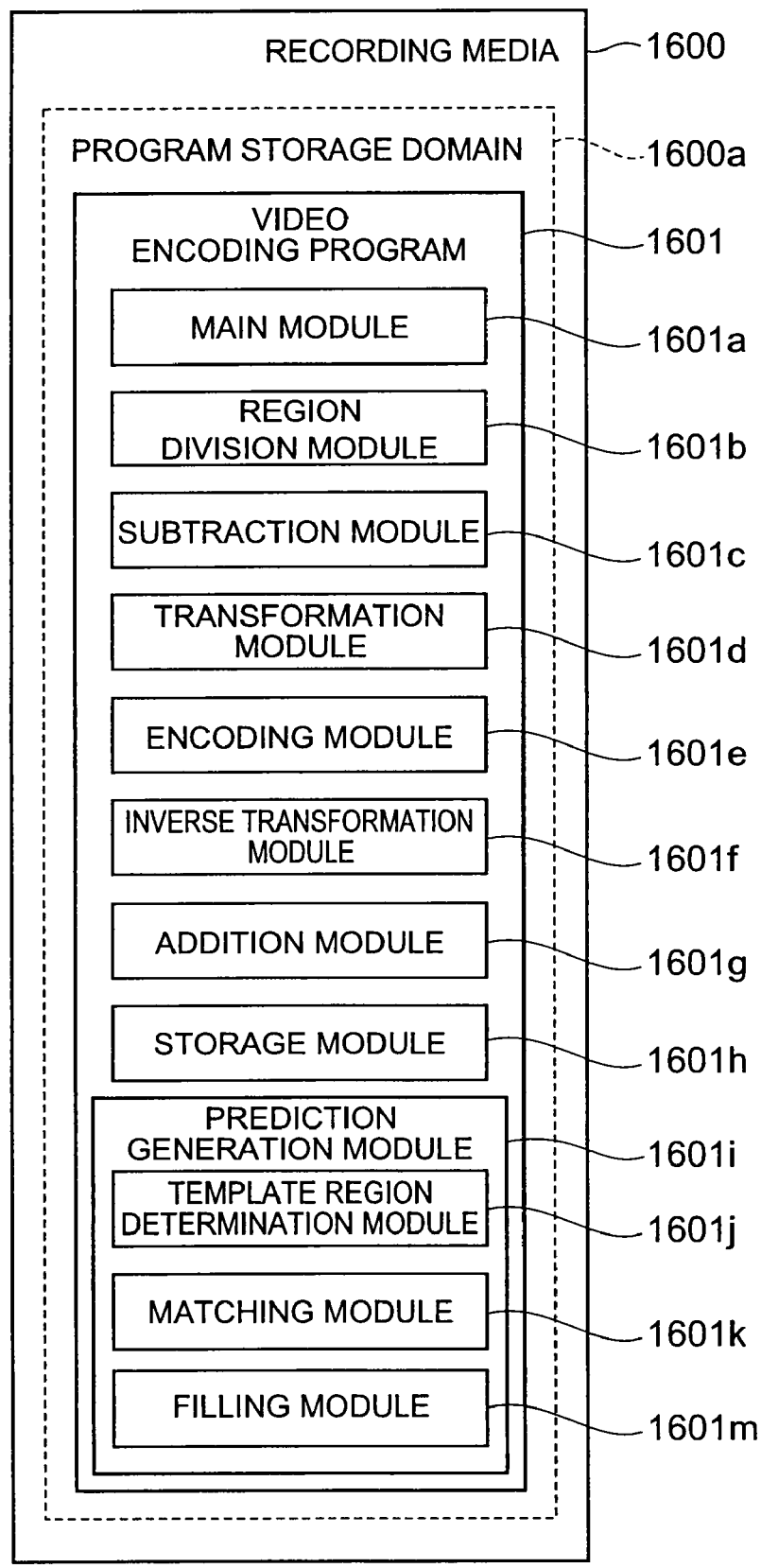
FIG. 16 is a diagram depicting a configuration of a video encoding program according to an embodiment of the present invention.

Now a video encoding program for having the video encoding device execute the above-mentioned series of encoding processing will be described. As FIG. 16 shows, a video encoding program 1601 is stored in a program storage domain 1600a created in a recording media 1600, which can be read or installed in the video encoding device.

The video encoding program 1601 comprises a main module 1601a for comprehensively controlling the video encoding processing, region division module 1601b, subtraction module 1601c, transformation module 1601d, encoding module 1601e, inverse transformation module 1601f, addition module 1601g, storage module 1601h, and prediction generation module 1601i. The prediction generation module 1601i further comprises a template region determination module 1601j, matching module 1601k and filling module 1601m.

Functions implemented by the execution of each module are the same as the above-mentioned functions of each composing element of the video encoding device 100. In other words, functions implemented by the execution of each module of the region division module 1601b, subtraction module 1601c, transformation module 1601d, encoding module 1601e, inverse transformation module 1601f, addition module 1601g, storage module 1601h and prediction generation module 1601i are the same as the functions of the region division section 101, subtraction section 102, transformation section 103, encoding section 104, inverse transformation section 105, addition section 106, storage section 107 and prediction generation section 108 in the video encoding device 100 of the above-mentioned embodiments. Functions implemented by the execution of each module of the template region determination module 1601j, matching module 1601k and filling module 1601m are the same as the functions of the template region determination section 201, matching section 202 and filling section 203 in the video encoding device 100 of the above-mentioned embodiments.

Figure 17:
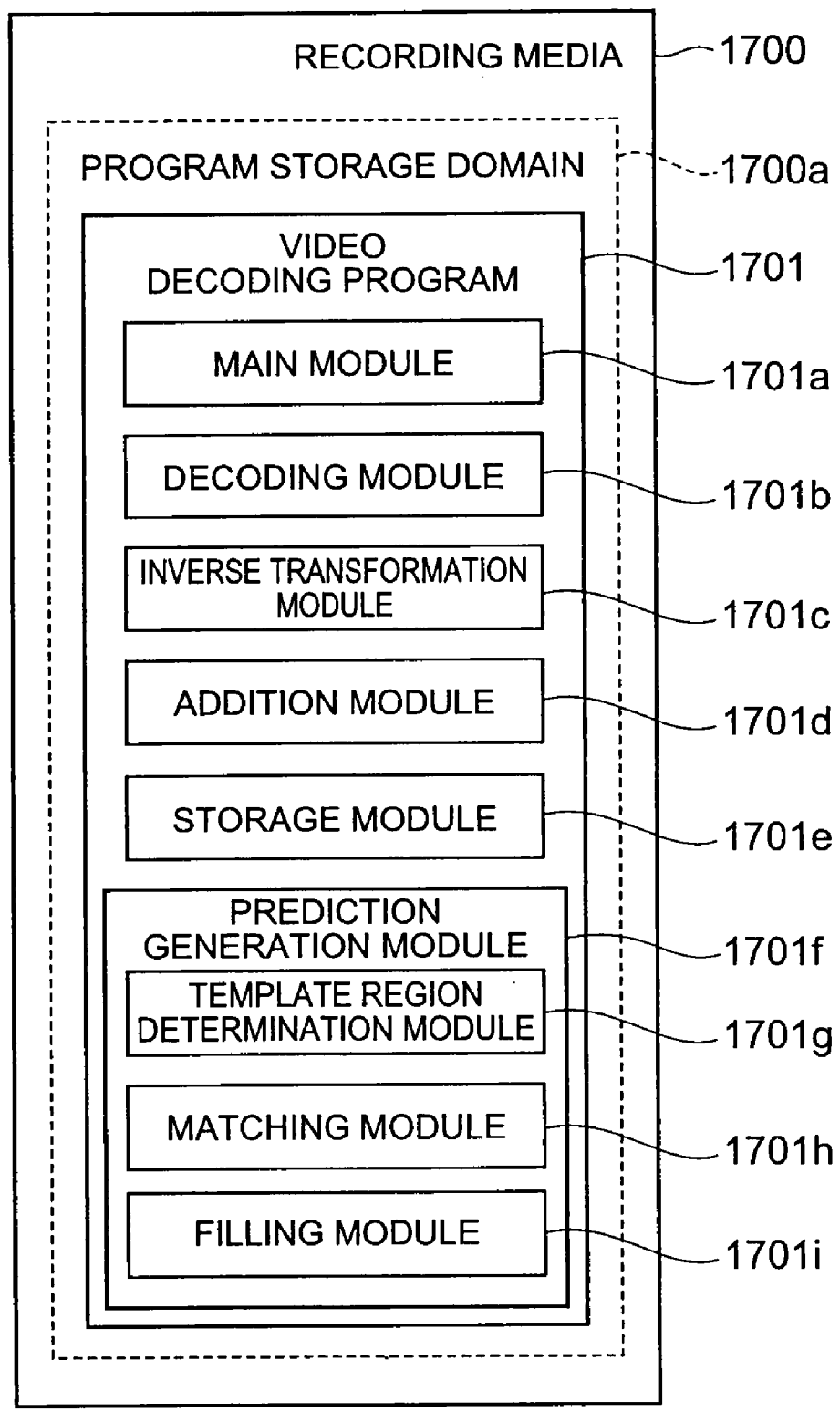
FIG. 17 is a diagram depicting a configuration of a video decoding program according to an embodiment of the present invention.

Now a video decoding program for having the video decoding device execute the above-mentioned series of decoding processings will be described. As FIG. 17 shows, a video decoding program 1701 is stored in a program storage domain 1700a created in a recording media 1700, which can be read by or installed in the video decoding device.

The video decoding program 1701 comprises a main module 1701a for comprehensively controlling the video decoding processing, decoding module 1701b, inverse transformation module 1701c, addition module 1701d, storage module 1701e and prediction generation module 1701f. The prediction generation module 1701f further comprises a template region determination module 1701g, matching module 1701h and filling module 1701i.

Functions implemented by the execution of each module are the same as the above-mentioned functions of each composing element of the video decoding device 600. In other words, functions implemented by the execution of each module of the decoding module 1701b, inverse transformation module 1701c, addition module 1701d, storage module 1701e and prediction generation module 1701f are the same as the functions of the decoding section 601, inverse transformation section 602, addition section 603, storage section 604 and prediction generation section 605 in the video decoding device 600 of the above-mentioned embodiments. Functions implemented by the execution of each module of the template region determination module 1701g, matching module 1701h and filling module 1701i are the same as the functions of the template region determination section 201, matching section 202 and filling section 203 in the video encoding device 100 or video decoding device 600 in the above-mentioned embodiments.

A part or all of the video encoding program 1601 and video decoding program 1701 may be transmitted via a transmission media, such as a communication line, and received and recorded (including installation) by other equipment.

The video encoding program 1601 and video decoding program 1701, corresponding to the video encoding device 100 and video decoding device 600 shown in FIG. 1 and FIG. 6 according to the first embodiment, were described here, but the video encoding program and video decoding program can also be constructed by providing modules to implement the functions of the video encoding device and video decoding device for the variant form of the first embodiment, second embodiment and third embodiment and variant forms thereof, and these video encoding programs and video decoding programs are therefore included in the present invention.

The invention claimed is:

1. A video encoding device for encoding video data in block units, comprising:
    division means for dividing a frame image constituting said video data into a plurality of encoding target blocks;
    encoding means for encoding said encoding target block;
    reproduced image generation means for generating a decoded block, which is a reproduced signal of said encoding target block;
    storage means for storing reproduced video data generated from said reproduced signal; and
    prediction signal generation means for generating a prediction block, which is a prediction signal of said encoding target block, using a template generated from a reproduced signal, which is adjacent to said encoding target block in a predetermined positional relationship and belongs to the reproduced video data stored in said storage means, wherein
    said encoding means generates a difference block, which is a difference signal of said encoding target block, by subtracting said prediction block from said encoding target block in pixel units, and encodes said difference block, and
    said reproduced image generation means generates a decoded difference block, which is a reproduced signal of the difference block encoded by said encoding means, and generates a decoded block by adding said decoded difference block and said prediction block in pixel units.

2. A video encoding device for encoding video data in block units, comprising:
    division means for dividing a frame image constituting said video data into a plurality of encoding target blocks;
    encoding means for encoding said encoding target block;
    reproduced image generation means for generating a decoded block, which is a reproduced signal of said encoding target block;
    storage means for storing reproduced video data generated from said reproduced signal;
    search means for searching a pixel group, which is highly correlated to a template generated from a reproduced signal, which is adjacent to said encoding target block in a predetermined positional relationship and belongs to the reproduced video data stored in said storage means, from the reproduced video data stored in said storage means; and
    prediction signal determination means for determining a prediction block which is a prediction signal of said encoding target block, from the reproduced video data stored in said storage means, based on the pixel group searched by said search means and said predetermined positional relationship, wherein
    said encoding means generates a difference block, which is a difference signal of said encoding target block, by subtracting said prediction block from said encoding target block in pixel units, and encodes said difference block, and
    said reproduced image generation means generates a decoded difference block, which is a reproduced signal of the difference block encoded by said encoding means, and generates a decoded block by adding said decoded difference block and said prediction block in pixel units.

3. The video encoding device according to claim 2, further comprising:
    estimation means for comparing said template and the reproduced video data stored in said storage means, to estimate a spatial continuity of an image of said encoding target block based on the comparison result; and setting means for further dividing said encoding target block, setting the divided encoding target block obtained by division as a new encoding target block and setting a template for said new encoding target block, based on the spatial continuity of the image estimated by said estimation means.

4. A video decoding device for reproducing encoded data of video data into reproduced video data in block units, comprising:
   decoding means for decoding encoded data required for reproducing a decoding target block to be decoded;
   reproduced image generation means for generating a decoded block, which is a reproduced signal of said decoding target block, from the encoded data decoded by said decoding means;
   storage means for storing reproduced video data generated from said reproduced signal; and
   prediction signal generation means for generating a prediction block, which is a prediction signal of said decoding target block, using a template generated from a reproduced signal, which is adjacent to said decoding target block in a predetermined positional relationship and belongs to the reproduced video data stored in said storage means, wherein
   said decoding means generates a decoded difference block, which is a difference signal of said decoding target block, and
   said reproduced image generation means generates a decoded block by adding said decoded difference block and said prediction block in pixel units.

5. A video decoding device for reproducing encoded data of video data into reproduced video data in block units, comprising:
   decoding means for decoding encoded data required for reproducing a decoding target block to be decoded;
   reproduced image generation means for generating a decoded block, which is a reproduced signal of said decoding target block, from the encoded data decoded by said decoding means;
   storage means for storing reproduced video data generated from said reproduced signal;
   search means for searching a pixel group, which is highly correlated to a template generated from a reproduced signal, which is adjacent to said decoding target block in a predetermined positional relationship and belongs to the reproduced video data stored in said storage means, from the reproduced video data stored in said storage means; and
   prediction signal determination means for determining a prediction block, which is a prediction signal of said decoding target block, from the reproduced video data stored in said storage means, based on the pixel group searched by said search means and said predetermined positional relationship, wherein
   said decoding means generates a decoded difference block, which is a difference signal of said decoding target block, and
   said reproducing image generation means generates a decoded block by adding said decoded difference block and said prediction block in pixel units.

6. The video decoding device according to claim 5, further comprising:
   estimation means for comparing said template and the reproduced video data stored in said storage means, to estimate a spatial continuity of images of said decoding target block based on the comparison result; and setting means for further dividing said decoding target block, setting the divided decoding target block obtained by division as a new decoding target block and setting a template for said new decoding target block, based on the spatial continuity of the image estimated by said estimation means.

7. The video encoding device according to claim 2, wherein
   said encoding means generates a reduced difference block, of which number of pixels is smaller than said difference block, by a reduction processing which decreases the number of pixels of said difference block by a predetermined method, and encodes said reduced difference block, and
   said reproduced image generation means generates a decoded reduced difference block, which is a reproduced signal of said reduced difference block, and generates a decoded block from said decoded reduced difference block by an enlargement processing which increases the number of pixels by a predetermined method.

8. The video decoding device according to claim 5, wherein
   said decoding means generates a decoded reduced difference block, of which number of pixels is smaller than said difference block, by decoding said encoded data, and
   said reproduced image generation means generates a decoded block from said decoded reduced difference block by an enlargement processing which increases the number of pixels by said predetermined method.

9. The video encoding device according to claim 3, wherein said prediction signal determination means selects one template out of a plurality of the templates having different shapes.

10. The video encoding device according to claim 9, wherein said prediction signal determination means selects said one template by referring to a reproduced signal of the reproduced video data stored in said storage means or information on said reproduced signal.

11. The video encoding device according to claim 9, wherein said encoding means encodes information for identifying the template selected by said prediction signal determination means.

12. The video decoding device according to claim 6, wherein said prediction signal determination means selects one template out of a plurality of the templates having different shapes.

13. The video decoding device according to claim 12, wherein said prediction signal determination means selects said one template by referring to a reproduced signal of the reproduced video data stored in said storage means or information on said reproduced signal.

14. The video decoding device according to claim 12, wherein
   said decoding means decodes the information for identifying the selected template, and
   said prediction signal determination means selects one template out of said plurality of templates having different shapes by referring to the information for identifying the selected template decoded by said decoding means.

15. A video encoding method for a video encoding device for encoding video data in block units, comprising:
   a division step of dividing a frame image constituting said video data into a plurality of encoding target blocks;

an encoding step of encoding said encoding target block;
a reproduced image generation step of generating a decoded block, which is a reproduced signal of said encoding target block;
a storage step of storing reproduced video data generated from said reproduced signal; and
a prediction signal generation step of generating a prediction block, which is a prediction signal of said encoding target block, using a template generated from a reproduced signal which is adjacent to said encoding target block in a predetermined positional relationship and belongs to the reproduced video data stored in said storage step, wherein
in said encoding step, a difference block, which is a difference signal of said encoding target block, is generated by subtracting said prediction block from said encoding target block in pixel units, and said difference block is encoded, and
in said reproduced image generation step, a decoded difference block, which is a reproduced signal of the difference block encoded in said encoding step, is generated, and a decoded block is generated by adding said decoded difference block and said prediction block in pixel units.

16. A video encoding method for a video encoding device for encoding video data in block units, comprising:
a division step of dividing a frame image constituting said video data into a plurality of encoding target blocks;
an encoding step of encoding said encoding target block;
a reproduced image generation step of generating a decoded block, which is a reproduced signal of said encoding target block;
a storage step of storing reproduced video data generated from said reproduced signal;
a search step of searching a pixel group, which is highly correlated to a template generated from a reproduced signal which is adjacent to said encoding target block in a predetermined positional relationship and belongs to the reproduced video data stored in said storage step, from the reproduced video data stored in said storage step; and
a prediction signal determination step of determining a prediction block, which is a prediction signal of said encoding target block, from the reproduced video data stored in said storage step, based on the pixel group searched in said search step and said predetermined positional relationship, wherein
in said encoding step, a difference block, which is a difference signal of said encoding target block, is generated by subtracting said prediction block from said encoding target block in pixel units, and said difference block is encoded, and
in said reproduced image generation step, a decoded difference block, which is a reproduced signal of the difference block encoded in said encoding step, is generated, and a decoded block is generated by adding said decoded difference block and said prediction block in pixel units.

17. A video decoding method for a video decoding device for reproducing encoded data of video data into reproduced video data in block units, comprising:
a decoding step of decoding encoded data required for reproducing a decoding target block to be decoded;
a reproduced image generation step of generating a decoded block, which is a reproduced signal of said decoding target block, from the encoded data decoded in said decoding step;
a storage step of storing reproduced video data generated from said reproduced signal; and
a prediction signal generation step of generating a prediction block, which is a prediction signal of said decoding target block, using a template generated from a reproduced signal, which is adjacent to said decoding target block in a predetermined positional relationship and belongs to the reproduced video data stored in said storage step, wherein
in said decoding step, a decoded difference block, which is a difference signal of said decoding target block, is generated, and
in said reproduced image generation step, a decoded block is generated by adding said decoded difference block and said prediction block in pixel units.

18. A video decoding method for a video decoding device for reproducing encoded data of video data into reproduced video data in block units, comprising:
a decoding step of decoding encoded data required for reproducing a decoding target block to be decoded;
a reproduced image generation step of generating a decoded block, which is a reproduced signal of said decoding target block, from the encoded data decoded in said decoding step;
a storage step of storing reproduced video data generated from said reproduced signal;
a search step of searching a pixel group, which is highly correlated to a template generated from a reproduced signal, which is adjacent to said decoding target block in a predetermined positional relationship and belongs to the reproduced video data stored in said storage step, from the reproduced video data stored in said storage step; and
a prediction signal determination step of determining a prediction block, which is a prediction signal of said decoding target block, from the reproduced video data stored in said storage step, based on the pixel group searched in said search step and said predetermined positional relationship, wherein
in said decoding step, a decoded difference block, which is a difference signal of said decoding target block, is generated, and
in said reproduced image generation step, a decoded block is generated by adding said decoded difference block and said prediction block in pixel units.

19. A non-transitory computer readable medium storing a video encoding program for controlling a video encoding device for encoding video data in block units, the program causing said video encoding device to function as:
division means for dividing a frame image constituting said video data into a plurality of encoding target blocks;
encoding means for encoding said encoding target block;
reproduced image generation means for generating a decoded block, which is a reproduced signal of said encoding target block;
storage means for storing reproduced video data generated from said reproduced signal; and
prediction signal generation means for generating a prediction block, which is a prediction signal of said encoding target block, using a template generated from a reproduced signal, which is adjacent to said encoding target block in a predetermined positional relationship and belongs to the reproduced video data stored in said storage means, wherein
said encoding means generates a difference block, which is a difference signal of said encoding target block, by subtracting said prediction block from said encoding target block in pixel units, and encodes said difference block, and said reproduced image generation means generates a decoded difference block, which is a reproduced signal of the difference block encoded by said encoding means, and generates a decoded block by adding said decoded difference block and said prediction block in pixel units.

20. A non-transitory computer readable medium storing a video encoding program for controlling a video encoding device for encoding video data in block units, the program causing said video encoding device to function as:

division means for dividing a frame image constituting said video data into a plurality of encoding target blocks;

encoding means for encoding said encoding target block;

reproduced image generation means for generating a decoded block, which is a reproduced signal of said encoding target block;

storage means for storing reproduced video data generated from said reproduced signal;

search means for searching a pixel group, which is highly correlated to a template generated from a reproduced signal, which is adjacent to said encoding target block in a predetermined positional relationship and belongs to the reproduced video data stored in said storage means, from the reproduced video data stored in said storage means; and prediction signal determination means for determining a prediction block, which is a prediction signal of said encoding target block, from the reproduced video data stored in said storage means, based on the pixel group searched by said search means and said predetermined positional relationship, wherein said encoding means generates a difference block, which is a difference signal of said encoding target block, by subtracting said prediction block from said encoding target block in pixel units, and encodes said difference block, and said reproduced image generation means generates a decoded difference block, which is a reproduced signal of the difference block encoded by said encoding means, and generates a decoded block by adding said decoded difference block and said prediction block in pixel units.

21. A non-transitory computer readable medium storing a video decoding program for controlling a video decoding device for reproducing encoded data of video data into reproduced video data in block units, the program causing said video decoding device to function as:

decoding means for decoding encoded data required for reproducing a decoding target block to be decoded;

reproduced image generation means for generating a decoded block, which is a reproduced signal of said decoding target block, from the encoded data decoded by said decoding means;

storage means for storing reproduced video data generated from said reproduced signal; and prediction signal generation means for generating a prediction block, which is a prediction signal of said decoding target block, using a template generated from a reproduced signal, which is adjacent to said decoding target block in a predetermined positional relationship and belongs to the reproduced video data stored in said storage means, wherein said decoding means generates a decoded difference block, which is a difference signal of said decoding target block, and said reproduced image generation means generates a decoded block by adding said decoded difference block and said prediction block in pixel units.

22. A non-transitory computer readable medium storing a video decoding program for controlling a video decoding device for reproducing encoded data of video data into reproduced video data in block units, the program causing said video decoding device to function as:

decoding means for decoding encoded data required for reproducing a decoding target block to be decoded;

reproduced image generation means for generating a decoded block, which is a reproduced signal of said decoding target block, from the encoded data decoded by said decoding means;

storage means for storing reproduced video data generated from said reproduced signal;

search means for searching a pixel group, which is highly correlated to a template generated from a reproduced signal, which is adjacent to said decoding target block in a predetermined positional relationship and belongs to the reproduced video data stored in said storage means, from the reproduced video data stored in said storage means; and prediction signal determination means for determining a prediction block, which is a prediction signal of said decoding target block, from the reproduced video data stored in said storage means, based on the pixel group searched by said search means and said predetermined positional relationship, wherein said decoding means generates a decoded difference block, which is a difference signal of said decoding target block, and said reproduced image generation means generates a decoded block by adding said decoded difference block and said prediction block in pixel units.

23. A video encoding device for encoding video data, comprising:

division means for dividing a frame image constituting said video data into a plurality of regions as encoding target regions;

encoding means for encoding an image of each region obtained by division by said division means;

reproduced image generation means for generating a reproduced image of the image encoded by said encoding means;

storage means for storing reproduced image generated by said reproduced image generation means;

search means for searching an region of an image highly correlated to a reproduced image in a template region, which is adjacent to an region of an encoding target image by said encoding means in a predetermined positional relationship and is a part of the reproduced image stored in said storage means, from the reproduced image stored in said storage means; and prediction signal determination means for determining a prediction signal in the region to be encoded from the reproduced image stored in said storage means, based on the region searched by said search means and said predetermined positional relationship, wherein said encoding means generates a difference signal between the prediction signal determined by said prediction signal determination means and the image of the region to be encoded, and encodes said difference signal.

24. A video decoding device for decoding video data in which a frame image divided into a plurality of regions is encoded, comprising:

decoding means for decoding the encoded data in each of said regions;
reproduced image generation means for generating reproduced image from the difference image decoded by said decoding means;
storage means for storing the image generated by said reproduced image generation means;
search means for searching an region of an image highly correlated to a reproducing image in a template region which is adjacent to a region of a decoding target image by said decoding means in a predetermined positional relationship and is a part of the reproduced image stored in said storage means, from the reproduced image stored in said storage means; and
prediction signal determination means for determining a prediction signal in the region to be decoded from the reproduced image stored in said storage means, based on the region searched by said search means and said predetermined positional relationship, wherein
said reproduced image generation means generates a sum signal of the prediction signal determined by said prediction signal determination means and a signal of said difference image decoded by said decoding means to generate a signal of a reproduced image.

* * * * *